US011672256B2

(12) United States Patent
Nicholas

(10) Patent No.: US 11,672,256 B2
(45) Date of Patent: Jun. 13, 2023

(54) OYSTER SHUCKING CLAMP APPARATUS AND METHOD

(71) Applicant: EAST HAMPTON SHUCKER COMPANY, Inc., East Hampton, NY (US)

(72) Inventor: John Nicholas, East Hampton, NY (US)

(73) Assignee: EAST HAMPTON SHUCKER COMPANY, Inc., East Hampton, NY (US)

( * ) Notice: Subject to any disclaimer, the term of this patent is extended or adjusted under 35 U.S.C. 154(b) by 3 days.

(21) Appl. No.: 17/366,300

(22) Filed: Jul. 2, 2021

(65) Prior Publication Data

US 2022/0046935 A1 Feb. 17, 2022

Related U.S. Application Data

(60) Provisional application No. 63/064,211, filed on Aug. 11, 2020.

(51) Int. Cl.
*A22C 29/00* (2006.01)
*A22C 29/04* (2006.01)

(52) U.S. Cl.
CPC .................. *A22C 29/046* (2013.01)

(58) Field of Classification Search
CPC .................................................. A22C 29/046
USPC ........................................ 452/12, 13, 16, 17
See application file for complete search history.

(56) References Cited

U.S. PATENT DOCUMENTS

| 299,756 A | 6/1884 | Drake | |
|---|---|---|---|
| 4,059,870 A * | 11/1977 | Finkelman | B23K 1/0056 452/17 |
| 4,255,835 A * | 3/1981 | Demulder | A47G 21/062 452/16 |
| D358,307 S * | 5/1995 | Plamann | D7/693 |
| 6,244,948 B1 * | 6/2001 | LiRosi | A22C 29/046 452/16 |
| 7,033,263 B2 * | 4/2006 | Frieswick | A47G 21/062 452/17 |
| 7,393,270 B2 | 7/2008 | Cross | |
| 7,488,244 B2 * | 2/2009 | Tyler | A22B 5/16 452/132 |
| 7,785,176 B1 * | 8/2010 | Le | A22C 29/046 452/16 |

(Continued)

FOREIGN PATENT DOCUMENTS

| CA | 2968068 A1 | 7/2018 |
| WO | 2004100730 A2 | 11/2004 |
| WO | 2018124966 A1 | 7/2018 |

*Primary Examiner* — Richard T Price, Jr.
(74) *Attorney, Agent, or Firm* — David Postolski; Gearhart Law LLC

(57) ABSTRACT

An oyster clamp comprising a base element having an indentation for receiving an oyster to be opened. A lip coupled to the base element hangs over and impinges upon an edge of a work surface on which the oyster clamp is placed, and a plurality of rubber feet are coupled to the underside of the base element. A backstop is affixed to the base element to prevent the oyster from exiting the back of the oyster clamp when in use. An oyster clamping element is operatively coupled to a handle and to the base element, such that operating the handle causes the clamping element to push the oyster down against the base element.

34 Claims, 67 Drawing Sheets

(56) References Cited

U.S. PATENT DOCUMENTS

| | | |
|---|---|---|
| 9,138,009 B1 | 9/2015 | Frusco |
| 9,461,216 B2 * | 10/2016 | Yoneda ................. H01L 33/502 |
| 9,462,816 B2 | 10/2016 | Lee, Jr. |
| D923,435 S * | 6/2021 | Fiocchi .......................... D7/693 |
| 2007/0042695 A1 | 2/2007 | Chong |
| 2020/0237128 A1 | 7/2020 | Fiocchi |

* cited by examiner

FIG. 5A  Backstops

Handles

OYSTER SHUCKING CLAMP APPARATUS AND METHOD

This application claims priority of U.S. Provisional Application No. 63/064,211, filed Aug. 11, 2020, which is hereby incorporated by reference in its entirety as if fully set forth herein.

BACKGROUND

The process of opening an oyster or other bivalve shellfish is commonly referred to as "shucking". Oysters and similar shellfish typically have two half-shells, called valves, held together at a hinge, with a visible seam where the two valves meet. Typically, a knife or thin blade is inserted in the seam and used to pry open the oyster by separating each of is opposing valves. However, since an oyster may be shucked while alive, it may resist and prevent easy insertion and division of its valves. The knife blade may therefore need to be forcefully inserted between the valves. In such cases, the use of knives being forcefully applied to open oysters can lead to injuries. In the prior art, various tools have been developed to help the user avoid injury while shucking oysters and other bivalves.

Prior art improvements in the shucking apparatus may result in fewer injuries, or tools that might be easier to use or clean, or adapt to various oyster sizes. Improvements have also been made to secure the clamp to a surface, better protect a user's hand from slippage and injury, provide means for better securing the device on a counter or table and/or provide a hinge between the rear ends of the base and top part.

The prior art includes the following:

US 299756 A—This reference describes an "oyster clamp" for use in shucking oysters. The clamp consists of two parts, which may be made of wood or metal. One of the parts is the bottom part, which is longer than the top, the two parts being connected at their rear ends by a hinge. The bottom has a recess rounded at its inner end, and gradually increasing in depth from the open front side, so as to form an inclined bottom. The top has a similar horseshoe shaped recess, with inclined sides. The recesses conform to the shape of that part of the oyster which is inserted into the clamp.

US 2007/0042695 A1—This reference describes an "oyster shucking block", having a base with a planar first surface, and an arcuate bulkhead attached to the base. The base and bulkhead define an oyster receptacle that secures an oyster while a user pries the oyster shell.

US 2020/0237128 A1—This reference describes an "oyster shucker apparatus" having a base with a first indentation, a cover connected at an angle to an end of the base, either removably connected or hinged thereto. The cover has a second indentation, the first and second indentations sized and configured to hold an oyster. A user holds the oyster therein and is able to open the oyster using a knife with lower risk of injury.

WO 2018/124966 A1—This reference describes an "oyster opening apparatus" having an oyster support channel connected to a stanchion. A connecting rod with notches on its lower edge is pivotally coupled to the stanchion at a select one of the notches. A lever is pivotably coupled at an upper lobe to the end of the connecting rod, and a shucking blade is connected to a lower lobe of the lever. In use, an oyster is securely placed in the support channel, and a user applies a controlled force to a handle at the free end of the lever, forcing the shucking blade to pry open the oyster.

WO 2004/100730 A2—This reference describes a handheld "clam and oyster opener", similar in form and function to a nut cracker. The opener includes a pair of pivotably coupled members, one with a handle and a curved toothed portion to hold a clam or oyster in position, and the other with a handle and a smooth bar along which a protruding wedge can slid into position and secured. A user's hand holds a bivalve in place against the curved toothed portion, while the other hand squeezes both members' handles together to force the wedge between the shell halves and push them apart. A scoop is mounted to the outside of the toothed portion to scrape the meat from the shell.

U.S. Pat. No. 9,462,816 B2—This reference describes an "oyster opening device". A handle is pivotably coupled to a spike, which passes through a stationary positioning cylinder. A force applied to the handle forces the spike into an oyster hinge held on a grooved surface by a user. The motion of the spike guided by the positioning cylinder can accommodate a wide range of oyster sizes without having to reconfigure or adjust the setup of the device.

U.S. Pat. No. 7,785,176 B1—an apparatus which manually forces open shells during the downward stroke of a reciprocating plunger. At the tip of the plunger is a long inclined wedge shaped blade. The shell is placed on a non-slip base with its seam parallel to the angle of taper of the tip. When the plunger comes down it exerts a frictional shearing force on the shell which causes the halves to separate and open, providing access to the meat.

U.S. Pat. No. 7,393,270 B2—This reference describes a "reconfigurable shellfish opener", which includes a base and a reconfigurable handle pivotably connected to the base. The device also includes various blades that are securely coupled with the handle such that a select blade may be positioned in an operative orientation to open shellfish.

In spite of such improvements, various shortcomings remain. For example, by placing a hinge between the rear of the top portion of the clamp and the rear of the base, the oyster is not secured as well as it could be when positioned between the top and the base. Moreover, means may not be provided to hold the various parts of a shucker in place to provide uncompromised structural stability. Further, securing means may not be provided to prevent the apparatus from slipping on a work surface on which the apparatus is placed during use. Further, a user's hand (the one not holding a knife or other shucking tool) typically holds the entire top portion of the apparatus, thereby exposing the user's non-knife wielding hand to possible injury should the knife slip.

SUMMARY

An oyster clamp comprising a base element having an indentation for receiving an oyster to be opened. A lip coupled to the base element hangs over and impinges upon an edge of a work surface on which the oyster clamp is placed, and a plurality of rubber feet are coupled to the underside of the base element. A backstop is affixed to the base element to prevent the oyster from exiting the back of the oyster clamp when in use. An oyster clamping element is operatively coupled to a handle and to the base element, such that operating the handle causes the clamping element to push the oyster down against the base element.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate disclosed embodiments and/or aspects and, together with the description, serve to explain the principles of the invention, the scope of which is determined by the claims.

In the drawings:

FIGS. 5A, 5B show exemplary variations in the configuration and construction of the backstop and handle, respectively.

Figure 1:
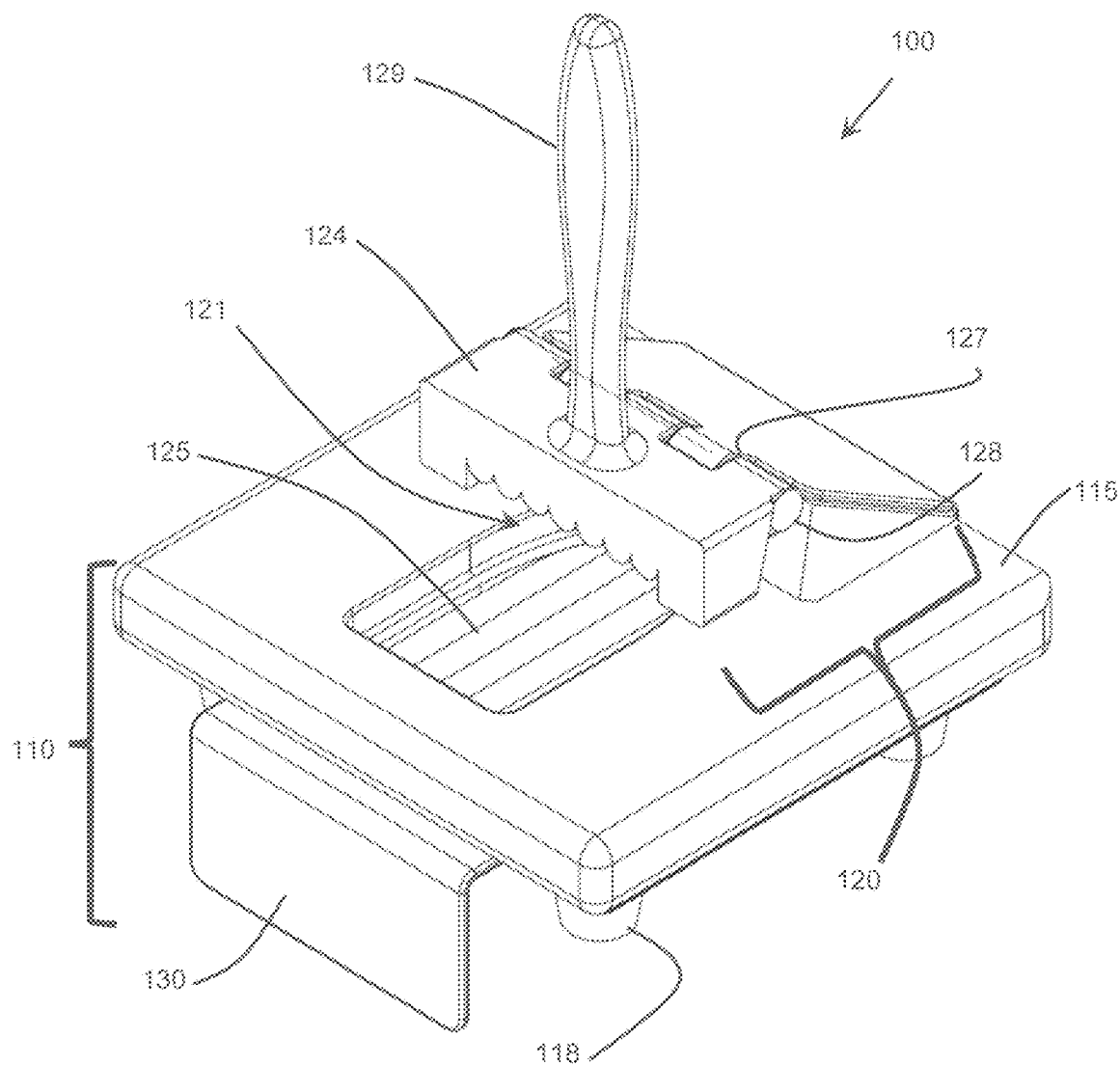
FIG. 1 is a perspective view of an illustrative embodiment of an oyster clamp.

Although a plurality of exemplary embodiments are illustrated, it is understood that other embodiments are possible, including the same, similar, or different components. Of course, all such embodiments are deemed to be within the scope of the claimed invention provided they are covered by the claim language.

DETAILED DESCRIPTION

It is to be understood that the figures and descriptions provided herein may have been simplified to illustrate aspects that are relevant for a clear understanding of the herein described processes, machines, manufactures, and/or compositions of matter, while eliminating for the purpose of clarity other aspects that may be found in typical devices, systems, and methods. Those of ordinary skill in the pertinent art may recognize that additional and/or other elements and/or steps may be desirable and/or necessary to implement the devices, systems, and methods described herein. Because such elements and steps are well known in the art, and because they do not facilitate a better understanding of the present disclosure, a discussion of such elements and steps may not be provided herein. However, all such elements, variations, and modifications to the described aspects that would be known to those of ordinary skill in the pertinent art are deemed to be inherently included in the present disclosure.

It will be readily understood that the components of the present invention, as generally described and illustrated in the figures herein, may be realized in a variety of different configurations. Thus, the exemplary embodiments described and/or shown in the attached figures are not intended to limit the scope of the invention as claimed, but is merely representative of selected illustrative embodiments of the invention. The usage of the phrases "example embodiments", "some embodiments", or other similar language, refers to the fact that a particular feature, structure, or characteristic described in connection with the embodiment may be included in at least one embodiment of the present invention, and do not necessarily all refer to the same embodiment or group of embodiments.

One aspect of the described embodiments that may be modified is the construction material(s) making up the various elements of the embodiments. In general, any suitable material may be used to make any part of any embodiment, in any combination. It is noted however that currently preferred but non-limiting exemplary materials may include, for the handle, any sufficiently rigid and strong wood, plastic, high density polyethylene (PE), or the like. For knobs, natural or artificial stone, metal or wood, plastic, polyethylene (PE), high density PE, low density PE, ceramic, polished cement, or the like, may be appropriate. For the base, wood, natural or artificial stone, plastic, polyethylene, high density PE, low density PE, or the like, may be appropriate. Further, various decorative finishes may also be used, such as matte, smooth, polished, mottled, or the like.

A variety of embodiments will now be described. These embodiments are provided as teaching examples and do not limit the scope of the invention. Although specific details of the embodiments are presented, these embodiments may be modified by changing, supplementing, or eliminating many of these details.

Turning now to FIG. 1, an exemplary embodiment of an Oyster Clamp (100) is shown for safely opening ("shucking") oysters and other bivalve shellfish (hereinafter collectively referred to as "oysters" for convenience). The Oyster Clamp (100) comprises a metal frame (105) formed of a single sheet of stainless steel or other rigid metal, bent into a frame to which other elements are secured and that provides greater stability than is found in the prior art. The Oyster Clamp (100) can be characterized as comprising a lower portion (110) and an upper portion (120). The lower portion (110) comprises a base element (115) having an indentation (125) for receiving an oyster to be opened. The lower portion (110) further comprises a lip (130) for securing the Oyster Clamp (100) along the edge of a work surface, such as a counter top or table top. In use, the lip (130) hangs over and abuts an edge of the work surface to prevent the Oyster Clamp (100) from sliding backwards when a user applies force, using an oyster opening tool such as a knife, to an oyster secured in the Oyster Clamp (100). In embodiments, the lower portion (110) may further comprise or be configured to accommodate at least one securing mechanism (610, FIG. 6B) such as a securing clamp, which may be an adjustable bar clamp or F-clamp for example. In embodiments, such securing clamps may be disposed on one or both sides of the lip (130) to more firmly secure the Oyster Clamp (100) to the work surface.

In embodiments, an upper end of the securing clamp(s) may be permanently or removably coupled directly to the base element (115). A bottom end of the securing clamp may then be adjusted to press firmly on the underside of the work surface to hold the Oyster Clamp (100) securely in place thereon. A plurality of rubber feet (118) may be coupled to the underside of the base (115) to prevent marring the work surface, and to inhibit the Oyster Clamp (100) from sliding in any direction. The rubber feet (118) may be coupled to the underside of base (115) with adhesive, screws, or the like. In a currently preferred embodiment, the rubber feet (118) are coupled to screws that pass through holes in the frame 105 and screw into the bottom of base element 115, thereby securely mounting the base element (115) to the frame (105).

The upper portion (120) of the Oyster Clamp comprises a wedge (122) coupled to the center of the top rear of the base element (115) as a backstop to aid in properly positioning an oyster to be opened, and to prevent the oyster from exiting the back of the Oyster Clamp (100). In embodiments, the wedge (122) may have an indentation (123) to aid in positioning and securing the oyster. In a currently preferred embodiment, a surface defining the indentation is disposed in a plane parallel to the top surface of the wedge (122). A clamping element (124) is rotatably coupled to the wedge (122) with a hinge (127) that allows the clamping element (124) to rotate about a hinge pin (128). Preferably, part of the hinge is formed by bending flat pieces of the frame extending from the top of the frame (105) into circles (127) through which hinge pin (128) passes. In embodiments, the clamping element (124) has an indentation (126) in the center of its underside to aid in properly positioning the oyster, and to hold it in place during shucking. The indentations in the base element (indentation 125), the wedge (indentation 123), and the clamping element (indentation 126) define a cavity (121) for firmly holding the oyster. In embodiments, one or more of the indentations (123), (125), (126) may have notched, spiked, or otherwise adapted surfaces to further aid in controlling the position of the oyster. The center of indentation (123) is disposed directly above the center of indentation (125) in the base element, which narrows gradually to a point under indentation (123). Thereby, small oysters are held firmly in place between indentation (123) and the narrowing part of indentation (125), while larger oysters are positioned in indentation (125) against the front surface of the backstop (122).

In embodiments, the top surface of the backstop (122) and the portion of the frame laying adjacent to that top surface may be configured to meet the rear of the top surface of the base element (115) to form an angle in a range of 10-50 degrees. In a currently preferred embodiment, the angle between the top surface of the backstop (122) where it meets the rear of the base element (115), is 30 degrees, and the bottom of indentation (123) is disposed in a plane parallel to the plane of the top surface of the backstop (122). The clamping element (124) further comprises a handle (129) that a user pulls forward to press the clamping element (124) down onto an oyster (or other shellfish). The handle (129) may be permanently coupled to the clamping element (124) using adhesive, screws, or the like, or may be incorporated directly into the hinged element (124) in a single piece. In a currently preferred embodiment, the hinged element (124) is removably coupled to the handle (129) so it can be replaced in the event it become excessively worn or deformed from use.

Figure 2:
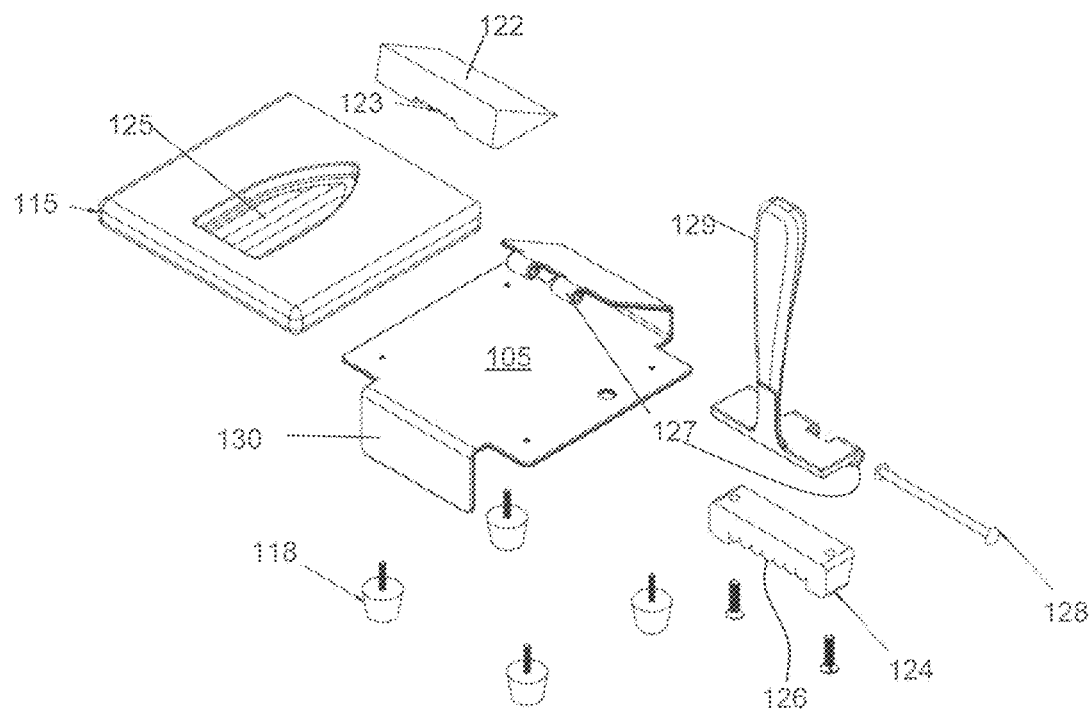
FIG. 2 is an exploded perspective view of the oyster claim shown in FIG. 1.

FIG. 2 is an exploded perspective view of the Oyster Clamp shown in FIG. 1, in which the same parts are indicated by the same reference numerals. It is to be understood the configuration of the parts shown are merely illustrative, and other configurations of one or more of the parts may be used without departing from the scope of the invention.

In use, the Oyster Clamp (100) is placed on a work surface, such as a table top or countertop, so that the lip (130) impinges on an edge of the work surface. In embodiments, one or more securing devices such as bar- or F-clamps (FIG. 6B, 610) or the like may be used to firmly secure the Oyster Clamp (100) to the work surface. An oyster is then placed in the indentation (125) of the base element (115), preferably also resting against the indentation (123) of the backstop (122) at the rear of base element indentation (125). The user holds the oyster in the cavity (121), and pulls the handle (129) down. This causes the clamping element (124) to rotate about the hinge pin (128) of hinge (127) to apply pressure to the oyster, firmly holding it in the cavity (121). Preferably, the backstop (122) and clamping element (124) are configured such that when securing an oyster, the bottom of the clamping element (124) slopes slightly downward toward the front of the Oyster Clamp (100), creating a force having components that push the oyster in the direction of both the base element (115) and the backstop (122).

While applying continuous downward pressure to the handle (129) with one hand (a "handle hand") to secure the oyster within cavity (121), the user holds an oyster opening tool with the other hand (a "tool hand"), such as a knife or the like. The user then inserts the oyster opening tool between the two valves of the oyster's shell to separate the valves and open the shell. Advantageously, if the knife slips during the shell opening process, the user's handle hand is disposed on the handle, well above the shell and out of harm's way.

It is again noted that various materials, and combinations of materials, may be used as appropriate for different aspects of the Oyster Clamp (100). In particular, materials that may be used for the handle may include various metals, woods, and plastics such as high density polyethylene (PE), or combinations of these. Similarly, materials that may be used for knobs may include natural or artificial stone, various metal(s) or woods, plastic/polyethylene (PE), high or low density PE, ceramic, polished cement, or the like, or combinations of these. And, appropriate materials for use in the base may include wood, stone, artificial stone, plastic/polyethylene, high or low density PE, or the like, or combinations of these.

Moreover in general, the described oyster clamp embodiments may be configured or adapted to work with a variety of oysters and other bivalves of all types and sizes, provided they can fit inside the oyster clamp. For example, the oyster clamp may be used to shuck not only oysters, but other bivalve mollusks as well, such as clams, scallops, mussels, and the like, disposed in any orientation that presents the seam between valves to the user to insert a knife or the like between the valves.

Figure 3:
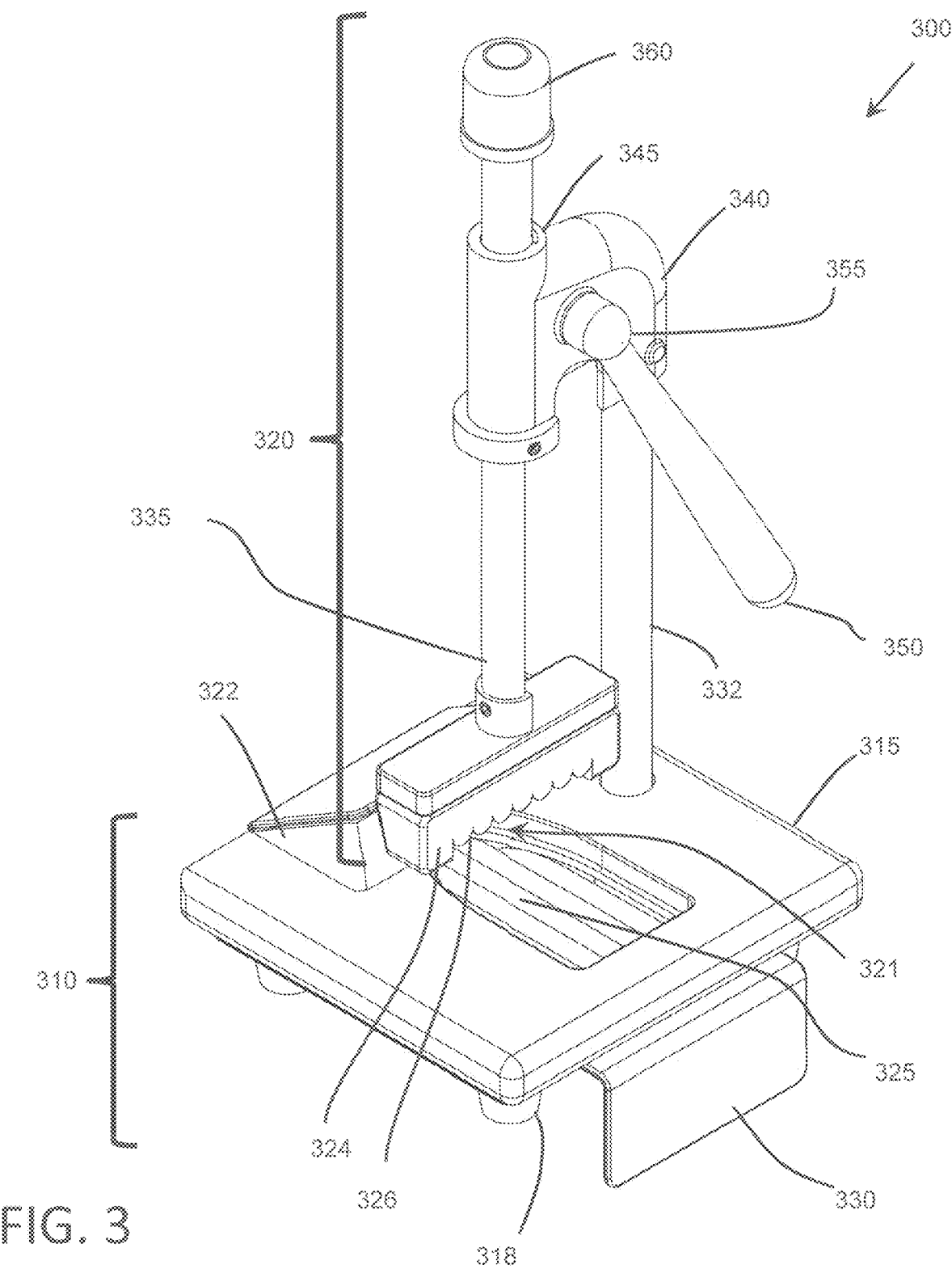
FIG. 3 is a perspective view of another illustrative embodiment of an oyster clamp.

FIG. 3 is a perspective view of another exemplary embodiment of an Oyster Clamp (300). The Oyster Clamp (300) again comprises a metal frame (305) formed of a single sheet of stainless steel or other rigid metal, bent into a frame to which other elements are secured and that provides greater stability than is found in the prior art. However, bracket (305) does not have a hinge portion, because this embodiment does not use a hinge. As before, the Oyster Clamp (300) can be characterized as comprising a lower portion (310) and an upper portion (320). The lower portion (310) is substantially similar to the lower portion (110) of the Oyster Clamp shown in FIG. 1. It comprises a base element (315) having an indentation (325) for receiving an oyster (or other bivalve shellfish) to be opened. The lower portion (310) further comprises a lip (330) for securing the Oyster Clamp (300) along the edge of a work surface, such as a countertop or table top. In use, the lip (330) hangs over and butts up against an edge of the work surface to prevent the Oyster Clamp (300) from sliding backwards when a user applies force to an oyster secured in the Oyster Clamp (300), for example using an oyster opening tool such as a knife. In embodiments, the lower portion (310) may further comprise or be configured to accommodate at least one securing mechanism (FIG. 6B, 610) such as a securing clamp, which may be an adjustable bar clamp or F-clamp, for example. In embodiments, such securing clamp(s) may be disposed proximate one or both sides of the lip (330) to more firmly secure the Oyster Clamp (300) to the work surface. The securing clamp is operated in the normal way to secure the Oyster Clamp to the work surface.

In embodiments, an upper end of the securing clamp(s) may be permanently or removably coupled to the base element (315). A bottom end of the securing clamp may then be adjusted to press firmly on the underside of the work surface to hold the Oyster Clamp (300) securely in place thereon. A plurality of rubber feet (318) may be coupled to the underside of the base (315) to prevent marring the work surface, and to inhibit the Oyster Clamp (300) from sliding in any direction. The rubber feet (318) may be coupled to the underside of the base element (315) with adhesive, screws, or the like. In a currently preferred embodiment, the rubber feet (318) are coupled to screws that pass through holes in the frame 305 and screw into the bottom of base element 315, thereby securely mounting the base element (315) to the frame (305).

The upper portion (320) of the Oyster Clamp (300) comprises a backstop (322) affixed to the center of the top rear of the base element (315) to aid in properly positioning an oyster to be opened, and to prevent the oyster from exiting the back of the Oyster Clamp (300). In embodiments, the backstop (322) may have an indentation (327) to aid in positioning and securing the oyster. In a currently preferred embodiment, a surface defining the indentation is disposed in a plane parallel to the top surface of the wedge (322). A clamping element (324) is fixedly coupled to the bottom end of a piston (335). In embodiments, the clamping element (324) has an indentation (326) in the center of its underside to aid in properly positioning the oyster, and to hold the oyster in place during shucking. The indentations (325, 326, 327) in the base element, the clamping element, and the backstop respectively, define a cavity (321) for firmly holding the oyster. In embodiments, one of more of the indentations (325, 326, 327) may have notched, spiked, or otherwise adapted surfaces to further aid in controlling the position of the oyster. In embodiments, the rear of the backstop (322) and the rear of the top of the base element (315) may form an angle in a range of 10-50 degrees. In a currently preferred embodiment, the angle between the top surface of the backstop (322) where it meets the rear of the base element (315), is 30 degrees, and the bottom of indentation (323) is disposed in a plane parallel to the plane of the top surface of the backstop (322).

The upper portion (320) of the Oyster Clamp (300) further comprises a shaft (332) fixedly coupled to and extending vertically from the base element (315) that provides structural support for much of the rest of the upper portion (320). A top end of shaft (332) is rigidly coupled to a bottom end of elbow (340). The top end of elbow (340) comprises a tubular guide (345) through which slides the shaft of a piston (335). This embodiment utilizes a rack and pinion system to apply vertical pressure to the top of an oyster secured in the Oyster Clamp. In particular, the piston (335) has regularly spaced notches (337) on one side as the rack. In the figure, two views of the same piston are shown (as indicated by dashed lines), the view of the piston to the left being rotated to show the notches (337), which are not visible in the view of the piston to the right. The bottom end of the piston (335) is fixedly coupled to the clamping element (324). The upper portion (320) also comprises a handle (350) mounted via a pivot assembly (355) to elbow 340. The pivot assembly (355) includes a gear with teeth (357) as a pinion that engages the notches (337) on the piston (335). When the handle is pushed around the pivot assembly (355), the rack and pinion cause the piston (335), with the clamp element (324), to move up and down. A cap (360) may be coupled to the top end of piston (335).

In use, the Oyster Clamp 300 is placed on a work surface, such as a table top or countertop, such that the lip 330 abuts an edge of the work surface. In embodiments, one or more securing devices such as bar- or F-clamps (610, FIG. 6B) or the like may be used to secure the Oyster Clamp (300) to the work surface. The handle 350 is rotated to raise the clamp element (324). Preferably, the rotated handle is disposed to extend in an upward direction for ease of operation. An oyster is placed on the base element (315), toward the rear of indentation (325), preferably also resting against the indentation (326) of the backstop (322) at the rear of base element indentation (325). The user holds the oyster in the cavity (321), and pulls on the handle (350) to cause the clamp element (324) to be lowered, thereby applying pressure to the oyster and firmly holding it in the cavity (321). While applying continuous pressure to the handle (350) with one hand (a "handle hand") thereby pushing the clamping element (324) downward, the user holds an oyster opening tool with the other hand (a "tool hand"), such as a knife or the like. The user inserts the tool into the oyster between the two valves of its shell to separate the valves and open the shell. Advantageously, if the knife slips during the shell opening process, the user's handle hand is disposed on the handle, well above the cavity and out of harm's way. In embodiments, the indentations (325, 326, 327) in the base element (315), clamp element (324), and backstop (322), respectively, may comprise grooves, spikes, or the like to further secure the oyster and prevent it from slipping. In embodiments, the bottom of the clamping element (324) is arranged to slope downward toward the front of the Oyster Clamp (300), creating a force having components that push the oyster in the direction of both the base element (315) and the backstop (322).

Figure 4:
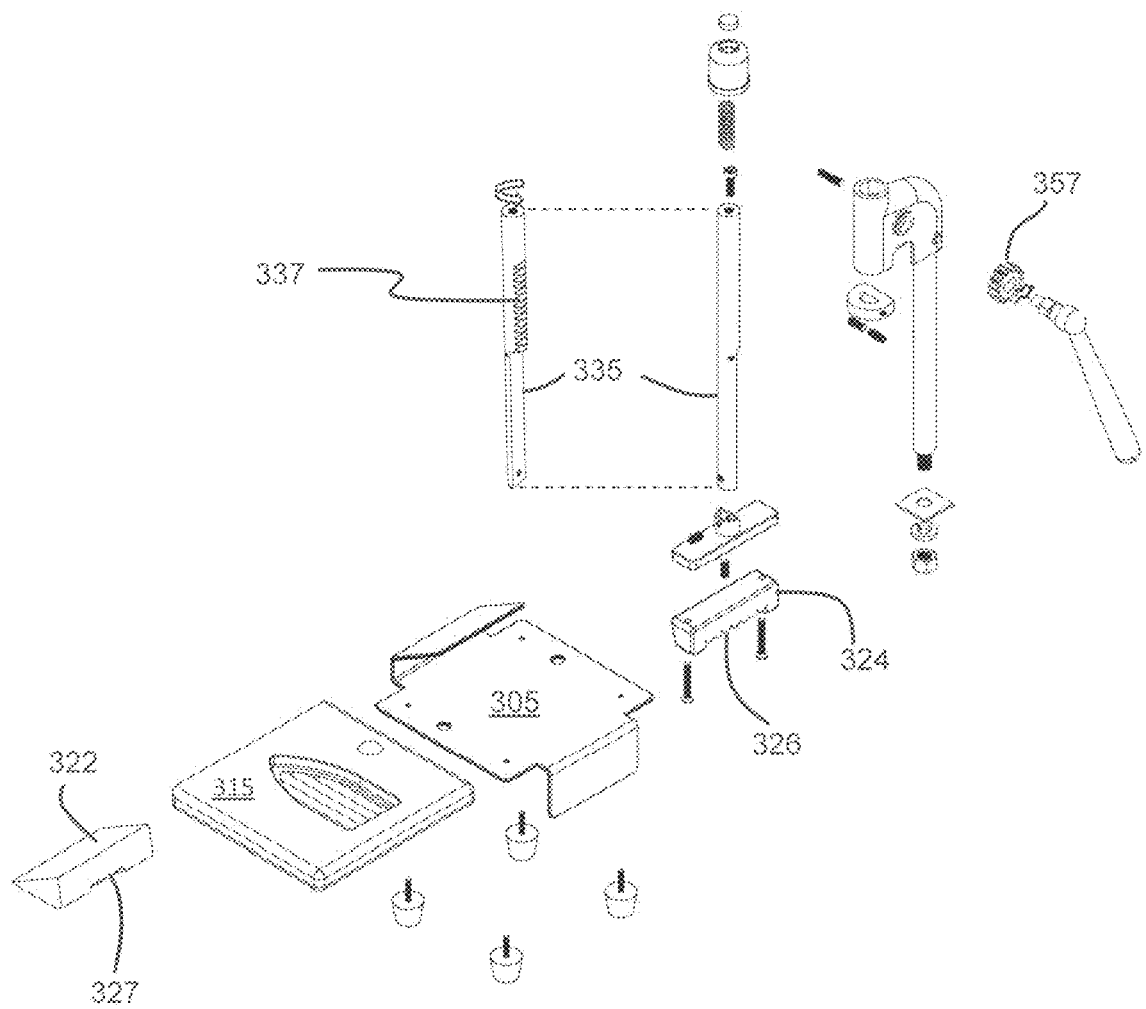
FIG. 4 is an exploded perspective view of the oyster claim shown in FIG. 3.

FIG. 4 is an exploded perspective view of the Oyster Clamp (300) shown in FIG. 3, in which the parts and their relation to each other, as well as their purpose and function, should be apparent by inspection in view of the foregoing description. It is to be understood the configuration of the parts shown are merely illustrative, and other configurations of one or more of the parts may be used without departing from the scope of the invention.

Figure 5B:
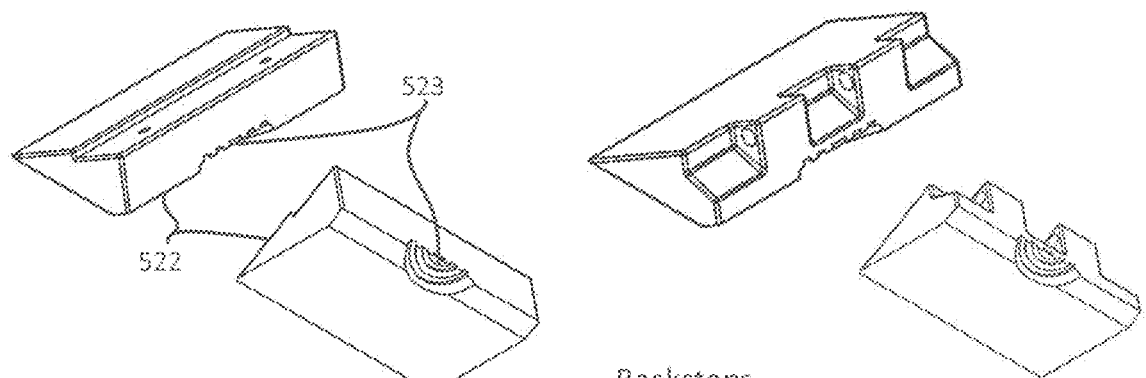
Figure 5B:
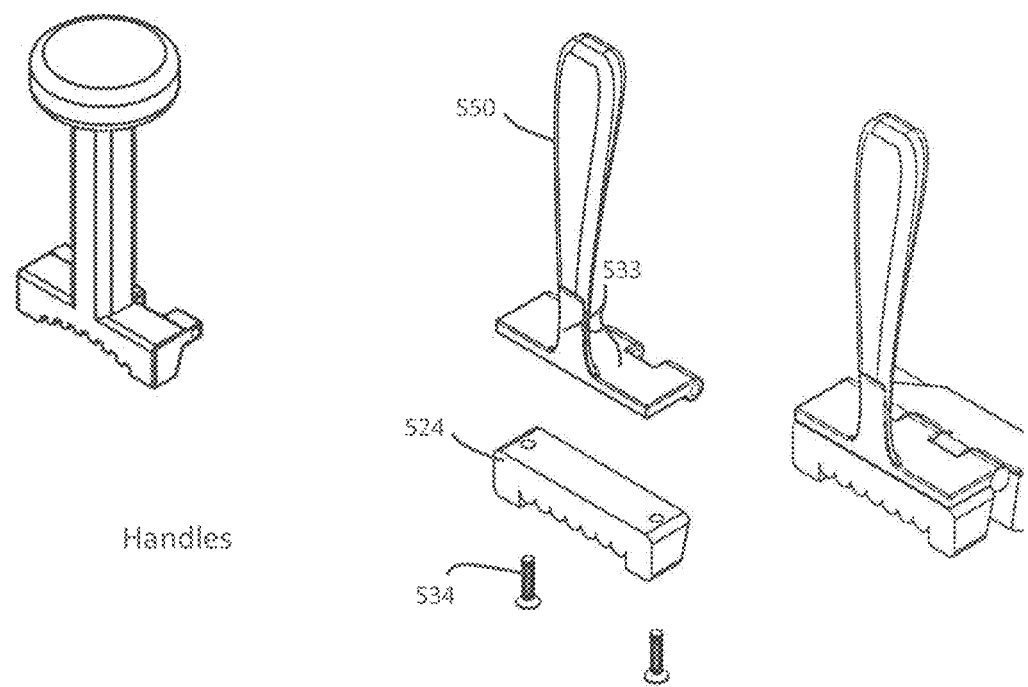
Figure 6A:
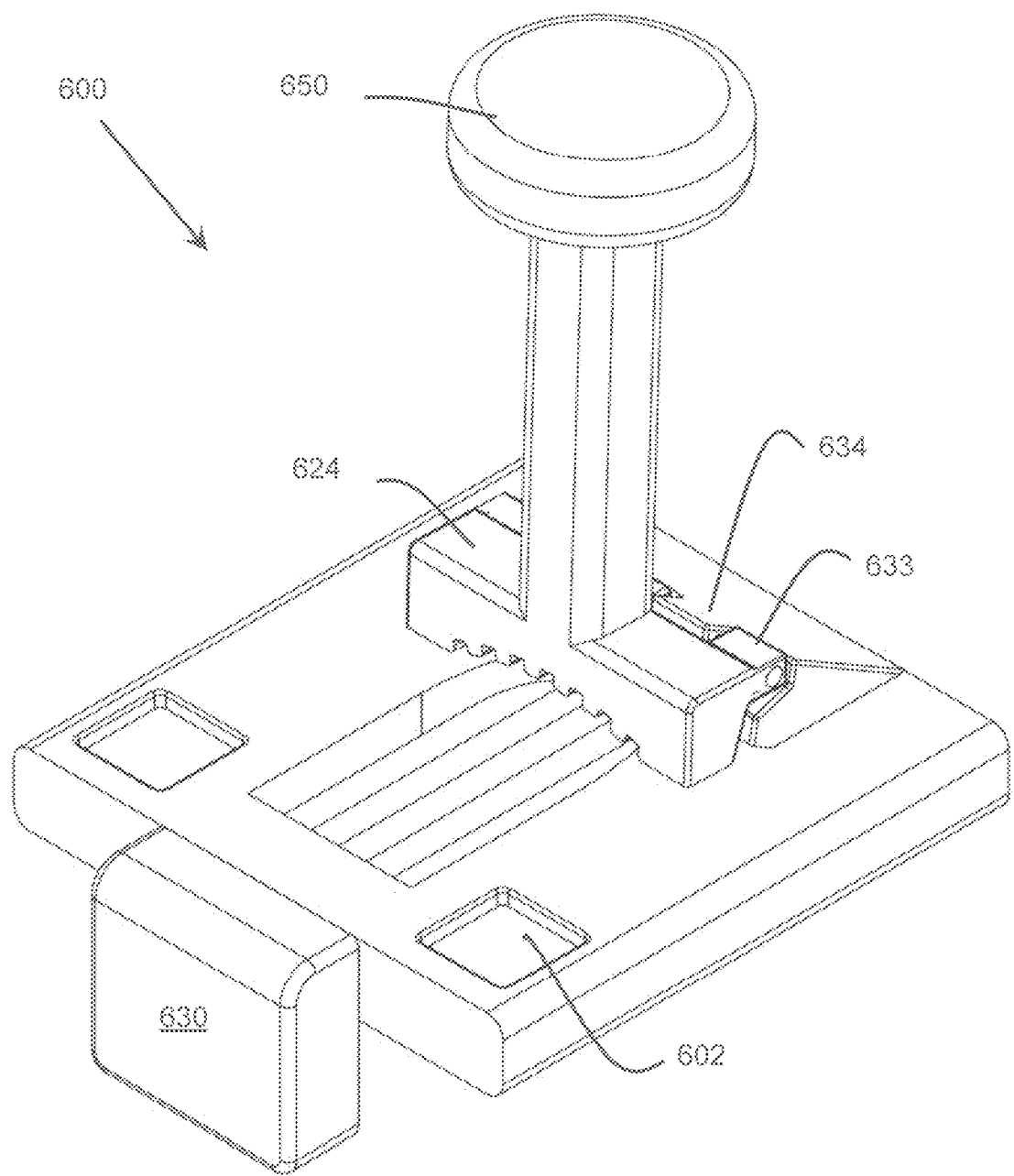
FIGS. 6A, 6B are a perspective view and rendering of another embodiment of an oyster clamp.
Figure 7:
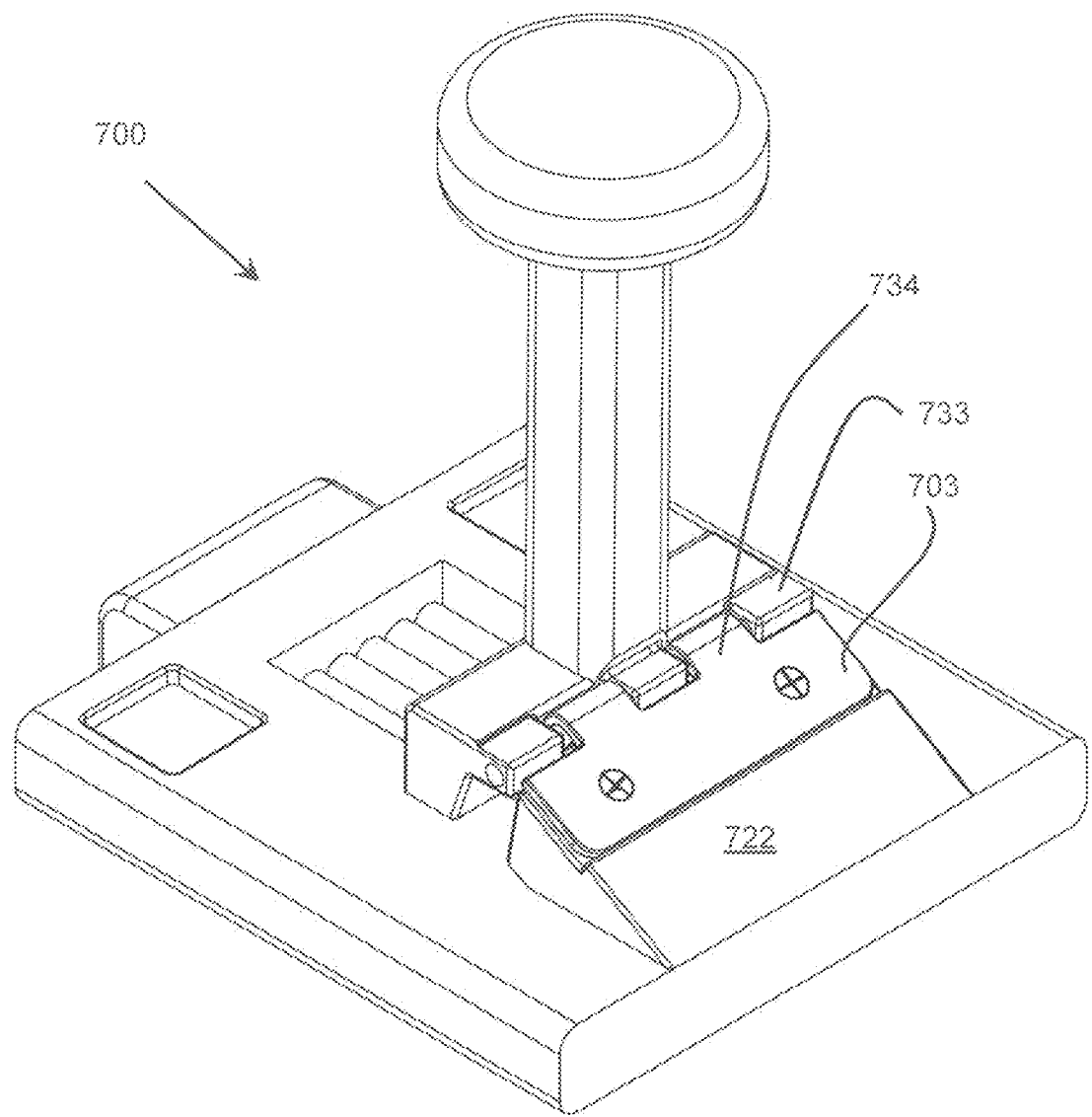
FIG. 7 is a rear perspective view of another embodiment similar to the embodiment illustrated in FIG. 6A, but with a different hinge construction.

Exemplary modifications in configuration and construction may include, without limitation, the base element, backstop, clamping element, and handle may be made of or include any appropriate solid material, such as wood, hard plastic, stainless steel, or the like. Further, comparative arrangements of various exemplary alternative part configurations are shown in FIGS. 5A and 5B, showing alternative backstops and handles, respectively. With regard to the backstops, the one on the left of FIG. 5A is used in the embodiment shown in FIG. 7, while the one on the right of FIG. 5A is used in the embodiment of FIG. 6A. In FIG. 6A, a portion of the hinge (633) through which a hinge pin is inserted is incorporated in a single piece that includes the handle (650) and the oyster clamping element 624. FIG. 7 is similarly configured. However in FIG. 6A, the other part of the hinge through which the hinge pin is inserted (634) is incorporated into the structural frame (as shown in FIG. 2 numeral 105). In contrast, in FIG. 7 that part of the hinge (734) projects from a plate (703) that is screwed onto the top of the backstop (722). This same handle, used in both FIGS. 6A and 7, is shown as an exemplary composite handle at the left side of FIG. 5B. In contrast, the illustrations in the center (exploded view) and right side (as assembled) of 5B show a differently configured handle assembly, including an oyster clamping element (524) screwed into a handle (550) with hinge elements (533). Notably, the screws (534) holding the clamping element (524) to the bottom of handle (550) may be sized to couple the oyster clamping element (524) to the bottom of the handle (550) without passing all the way through the bottom of the handle. Of course, other variations of these parts and others are possible. Similar types of configuration modifications and adaptations are also possible in the parts of other embodiments.

Figure 6B:
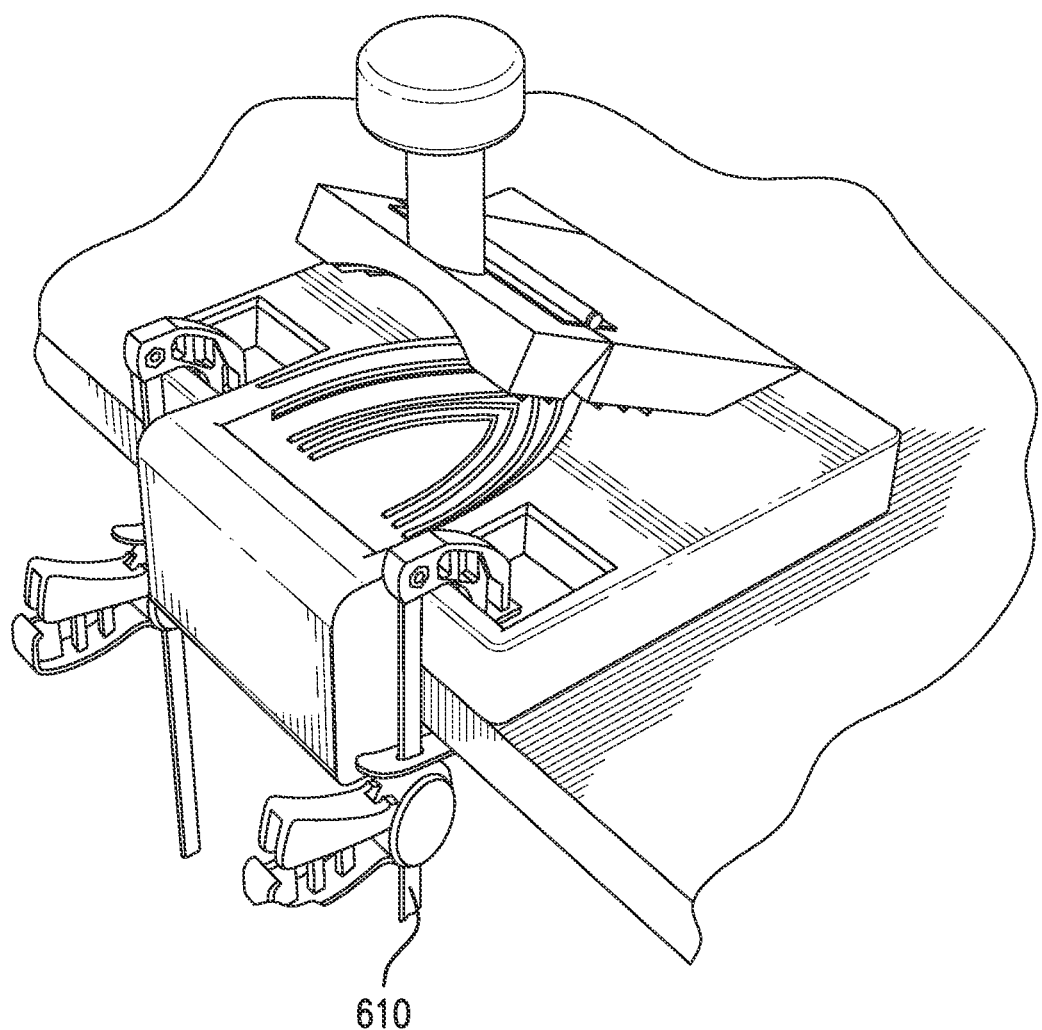

FIG. 6A is a perspective view of an exemplary embodiment substantially similar in form and function to the embodiment shown in FIG. 1. One difference is that the oyster clamping element, knob, and part of the hinge are formed as a single piece, as noted above. In addition, a thick panel (630) is used instead of a thin lip. A pair of indentations (602) are shown in the top surface of the base on either side of the panel (630), for positioning securing clamps that secure the Oyster Clamp (600) along the edge of a work surface. Such a setup is shown in FIG. 6B, wherein two securing clamps (610) are shown with their top ends pressing down in respective indentations, and their bottom ends pressing up against the underside of the work surface. Of course, other arrangements are also possible without departing from the scope of the invention. For example, the top ends of the claims may be adapted to be permanently coupled to the front portion of the base element.

FIG. 7 is a perspective view of an embodiment substantially similar to that of FIG. 6A. However, the configuration of the hinge is different, not being part of the frame but instead comprising a half hinge (703) coupled to the top surface of the backstop (722). Again, this illustrates that a variation in the configuration and construction of the Oyster Clamp (700) may be made without significantly affecting the functionality of relevant embodiments. Likewise, the hereinafter described exemplary embodiments generally use either a knob coupled via a hinge to the clamping element, or a handle that in operation causes the clamping element to press directly downward to apply pressure to the oyster and hold it in place while shucking. In every case, the hand grasping the knob or handle is kept a safe distance from the oyster opening tool when shucking, preventing injury in the event the tool slips. Moreover, at some embodiments are configured such that pressure from the oyster clamping element is applied proximate the center of the oyster, minimizing the possibility that the oyster might slip in or out of the Oyster Clamp.

Figure 8:
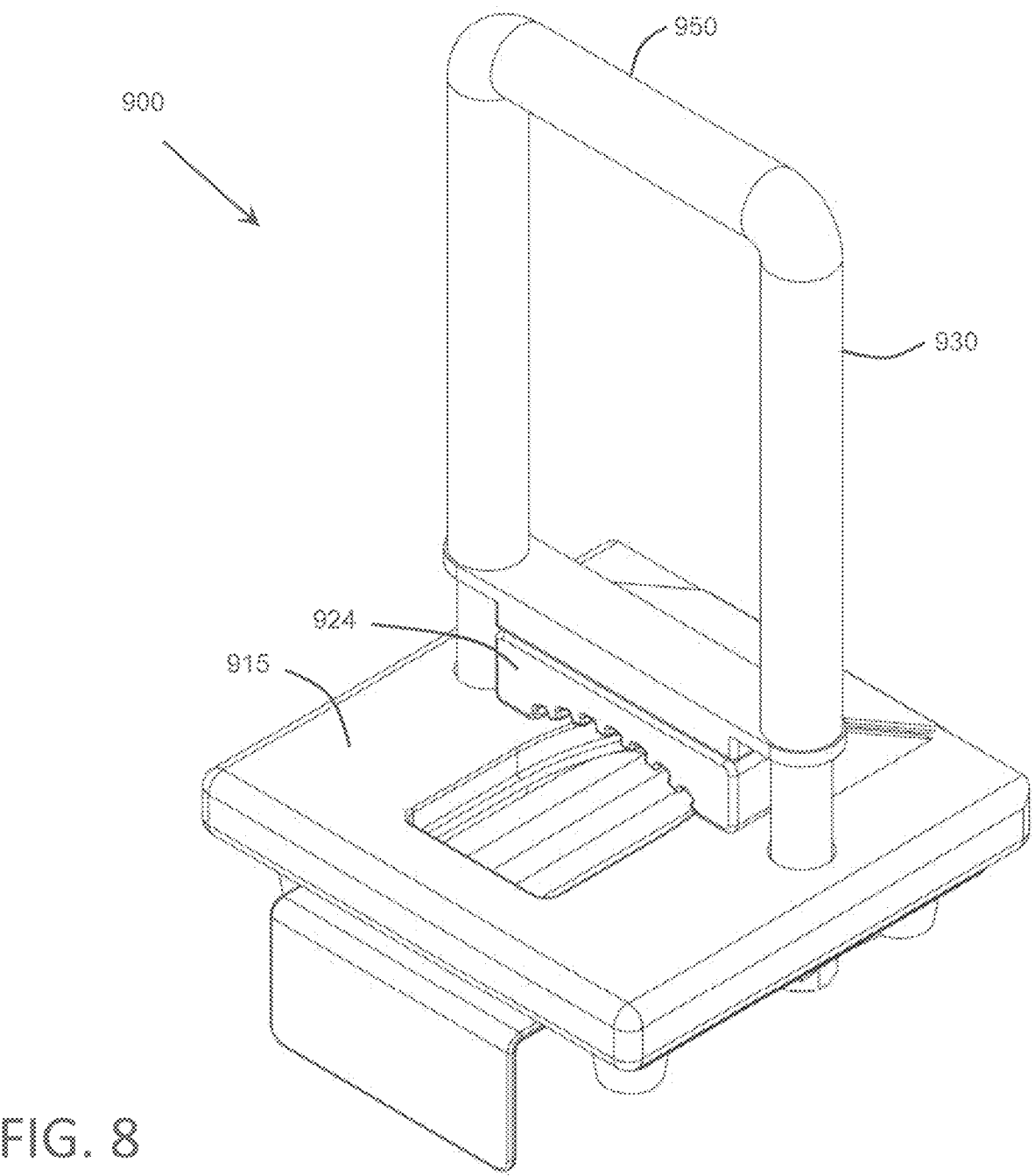
FIGS. 8, 10, 12, 14, 16, 18, 20, 22, 24, 26, 28, 30, 32, 34, 36, and 38 are perspective views of exemplary oyster clamp embodiments.
Figure 9:
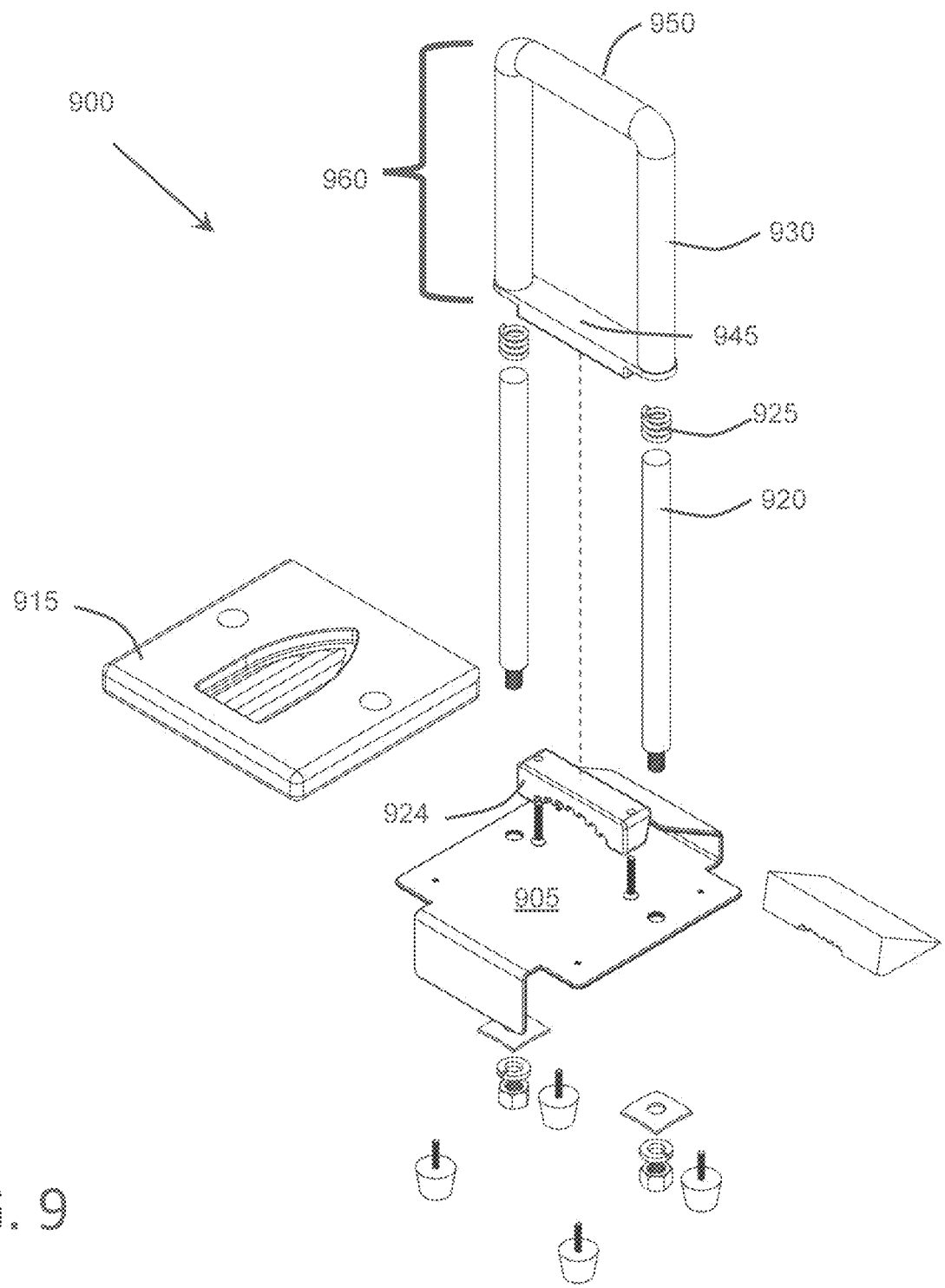
FIGS. 9, 11, 13, 15, 17, 19, 21, 23, 25, 27, 29, 31, 33, 35, 37, and 39 are exploded perspective views of the oyster clamps shown in FIGS. 8, 10, 12, 14, 16, 18, 20, 22, 24, 26, 28, 30, 32, 34, 36, and 38, respectively.

FIG. 8 is a perspective view of another embodiment, and FIG. 9 is an exploded view of the embodiment of FIG. 8. The bottom portion is substantially similar to that of embodiments previously described, comprising a metal frame (905) formed of a single sheet of stainless steel or other rigid metal, cut to shape and bent into a frame to which other elements such as the base element (915) are secured, and that provides great structural stability. However, the top portion is different, comprising a pair of shafts (920) fixedly coupled to and extending vertically from the base element (915). Springs (925) are coupled to the top of the shafts. The top portion also incorporates a so-called floating sleeve comprising a pair of tubes (930), each slidingly coupled over a respective one of the shafts (920). The bottom end of each tube (930) is fixedly coupled to a cross brace (945), which in turn is coupled to the oyster clamping element (924), as indicated by a dotted line. A handle (950) has two ends, each end fixedly coupled to the top end of a respective one of the tubes (930). In operation, the user simply lifts the handle (950), places an oyster in the base indentation against the backstop, presses the handle down with one hand to secure the oyster, and keeps applying downward pressure to the handle while operating an oyster opening tool with the other hand. The handle hand remains a safe distance from the oyster opening tool, preventing injury in the event the tool slips. Upon completion, the downward pressure on the handle is released, and the springs push the handle upward, releasing the oyster.

Together, the handle (950), tubes (930), cross brace (945), and oyster clamping element (924), once assembled, form a floating sleeve (960) that can be slid off the rest of the Oyster Clamp (900), and replaced with a different floating sliding sleeve more appropriate to the next task at hand. The Oyster Clamp (900) may thereby be reconfigured simply by removing and replacing the floating sleeve (960). This feature is handy, for example, when changing the type of shellfish being shucked, for example, from one size (e.g., small oysters) to another size (e.g., jumbo oysters), or from one type of bivalve (e.g., oysters) to another type with a different general shape (e.g., clams). Changing the floating sleeve changes the oyster clamping element (924) from a configuration appropriate for a first shucking task, to a second shucking task opening a different type of mollusk.

FIG. 9 is an exploded perspective view of the Oyster Clamp shown in FIG. 8. It is to be understood the configurations of the parts shown are merely examples, and other configurations of one or more of the parts may be used without departing from the scope of the invention. The arrangement, function, and purpose of the illustrated elements are apparent by inspection.

Figure 10:
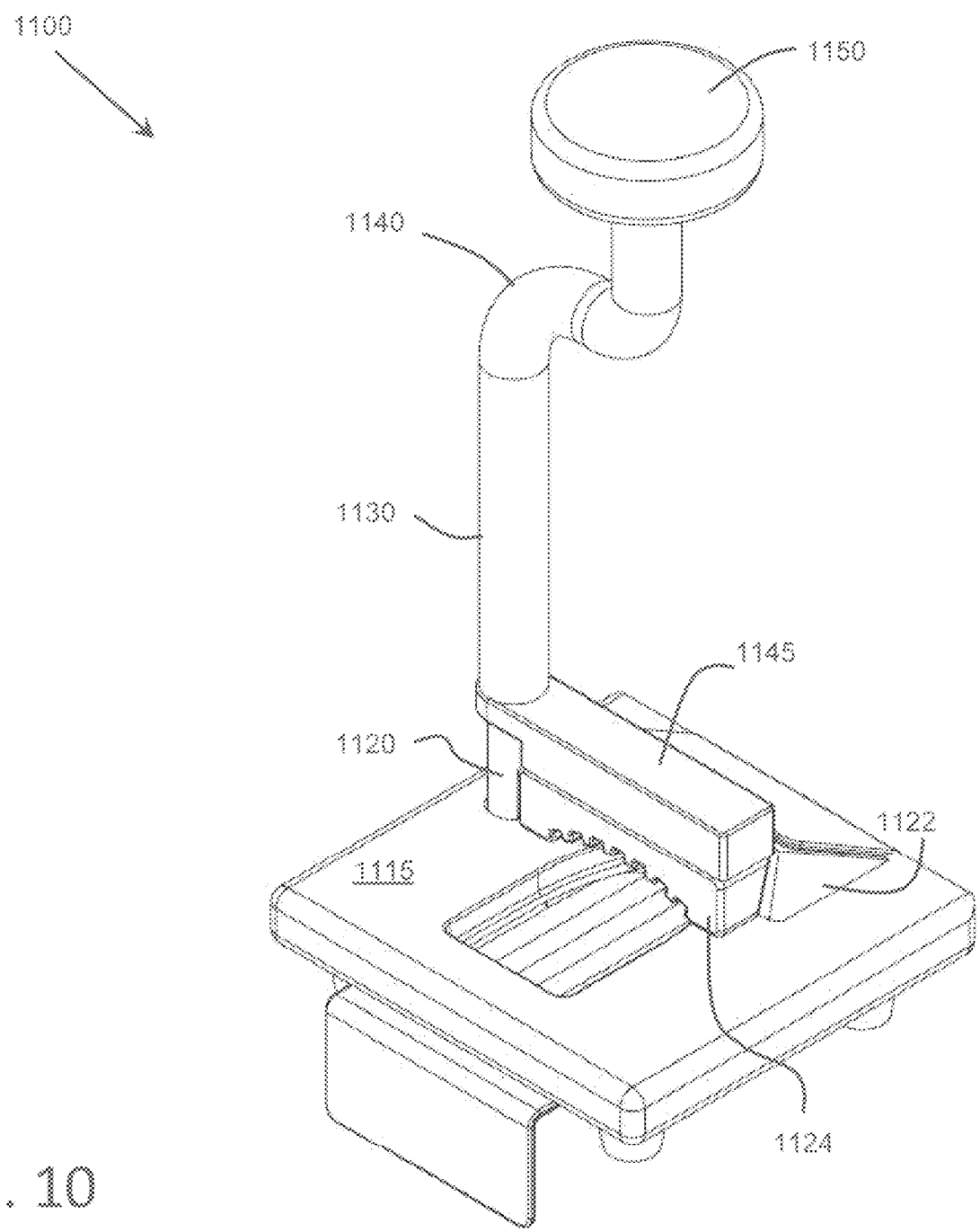

FIG. 10 is a perspective view of yet another exemplary embodiment (1100). The bottom portion is again substantially similar to that of the embodiments described in the foregoing, comprising a frame (1105), base element (1115), and backstop (1122). However, the top portion is different, comprising a single shaft (1120) fixedly coupled to and extending vertically from the base element (1115), coupled at its top end to a spring (1125). The top portion also comprises a tube (1130) that slides over the shaft (1120), with the bottom end of the tube (1130) fixedly coupled to a brace (1145) to which the oyster clamping element (1124) is coupled. The top end of the tube (1130) is fixedly coupled to the handle (1150) via a connector (1140). In this embodiment, the shaft (1120) and the tube (1130) are configured to have complementary shapes whereby the tube can slide vertically over the shaft, but cannot rotate around the shaft. For example, the shaft and tube may both have snug fitting semicircular cross sections (as shown), or elongated oval cross sections, or rectangular cross sections, or the like. In operation, the user places an oyster in the base indentation against the backstop (1122), presses the handle (1150) down with one hand to secure the oyster, and operates an oyster opening tool with the other hand.

As with the embodiment of FIG. 8, the handle (1150), tube (1130), brace (1145), and oyster clamping element (1124), once assembled, form a floating sleeve (1160) that can be slid off the rest of the Oyster Clamp (1100), and replaced with a different floating sleeve more appropriate to the next task at hand. The Oyster Clamp (1100) may thereby be reconfigured simply by removing and replacing the floating sleeve (1160). This feature is handy when changing the type of shellfish being shucked, for example, from one size (e.g., small oysters) to another size (e.g., jumbo oysters), or from one type of bivalve (e.g., oysters) to another type with a different general shape (e.g., clams). Changing the floating sleeve changes the oyster clamping element (1124) from a configuration appropriate for a first shucking task, to a different configuration appropriate for a second shucking task opening a different size or shape of mollusk.

Figure 11:
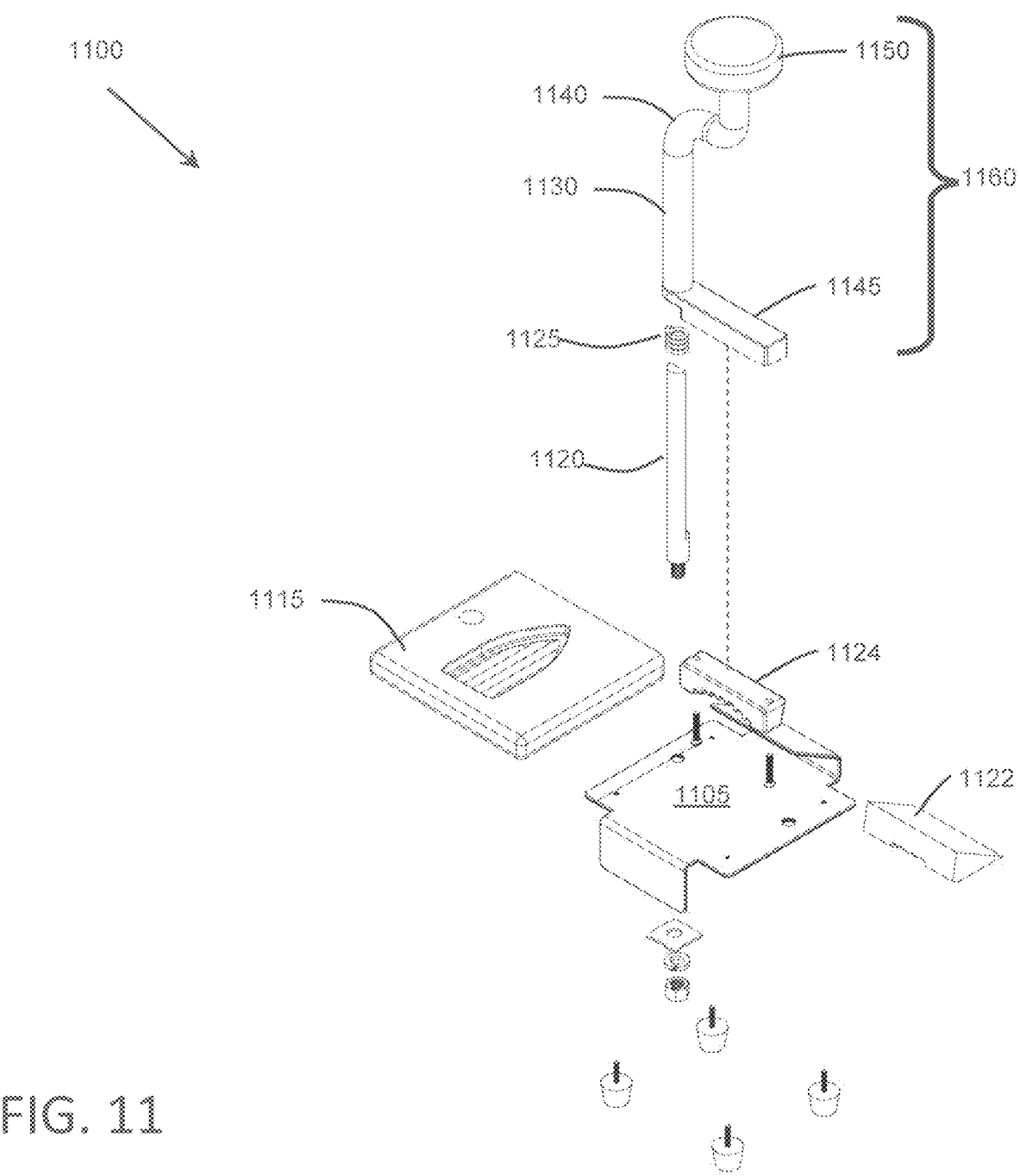

FIG. 11 is an exploded perspective view of the Oyster Clamp (1100) shown in FIG. 10. As before, the arrangement, function, and purpose of illustrated elements should be apparent by inspection. Further, the configuration of the parts shown are merely illustrative, and other configurations of one or more of the parts may be used without departing from the scope of the invention.

Figure 12:
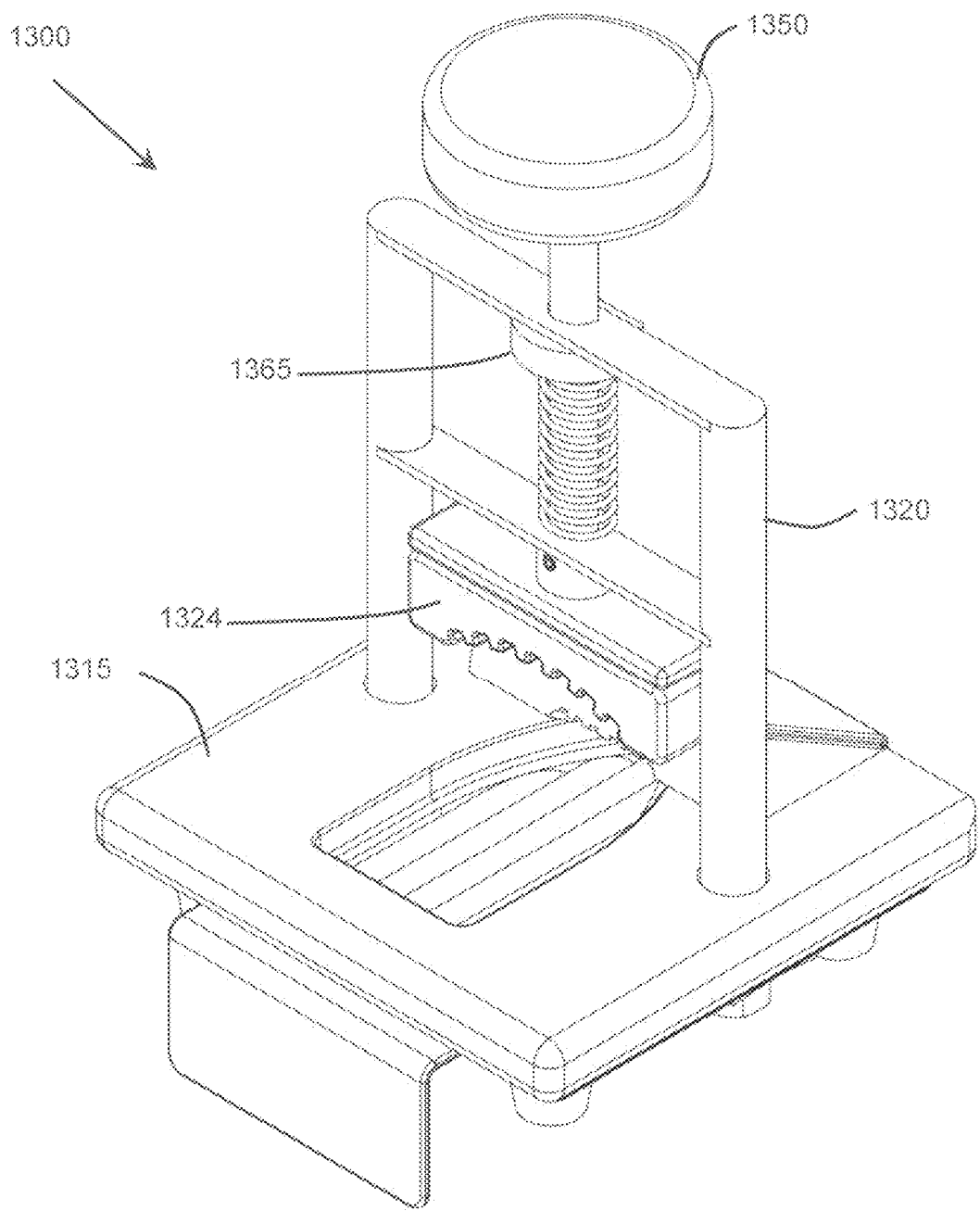

FIG. 12 is a perspective view of yet another exemplary embodiment. The bottom portion is again substantially similar to that of the embodiments described in the foregoing. Moreover, the functionality of the top portion is somewhat similar to the operation of the embodiments shown in FIGS. 8 and 10, comprising a knob (or handle) that is pressed downward to secure an oyster in the Oyster Clamp (1300), and a spring (1330) that pushes the handle back up, preferably to its original position.

The top portion comprises a pair of supports (1320), such as shafts or bars, fixedly coupled to and extending vertically from the base element (1315). Two brace elements (1345) are coupled horizontally between the supports (1320), one at the top of the supports, and one proximate the middle of the supports. Each brace element includes a hole at its center, and a spring (1330) is disposed between the holes. A pushrod (1355) is inserted through the holes, a collar (1365), and the spring (1330), and secured to a plate (1360). The bottom of the plate (1360) is coupled to the oyster clamping element (1324), and the top of pushrod (1355) is coupled to a knob or handle (1350). In operation, the user places an oyster in the base element indentation (1325) against the backstop (1322), presses the knob (1350) down with one hand, compressing the spring (1330) and securing the oyster, and keeps applying downward pressure to the knob while operating an oyster opening tool with the other hand. The handle hand remains on the knob (1350) a safe distance from the oyster opening tool, preventing injury in the event the tool slips. Upon completion, the downward pressure on the knob is released, and the spring (1330) pushes the pushrod (1355) upward causing the oyster clamping element (1324) to release the oyster.

Figure 13:
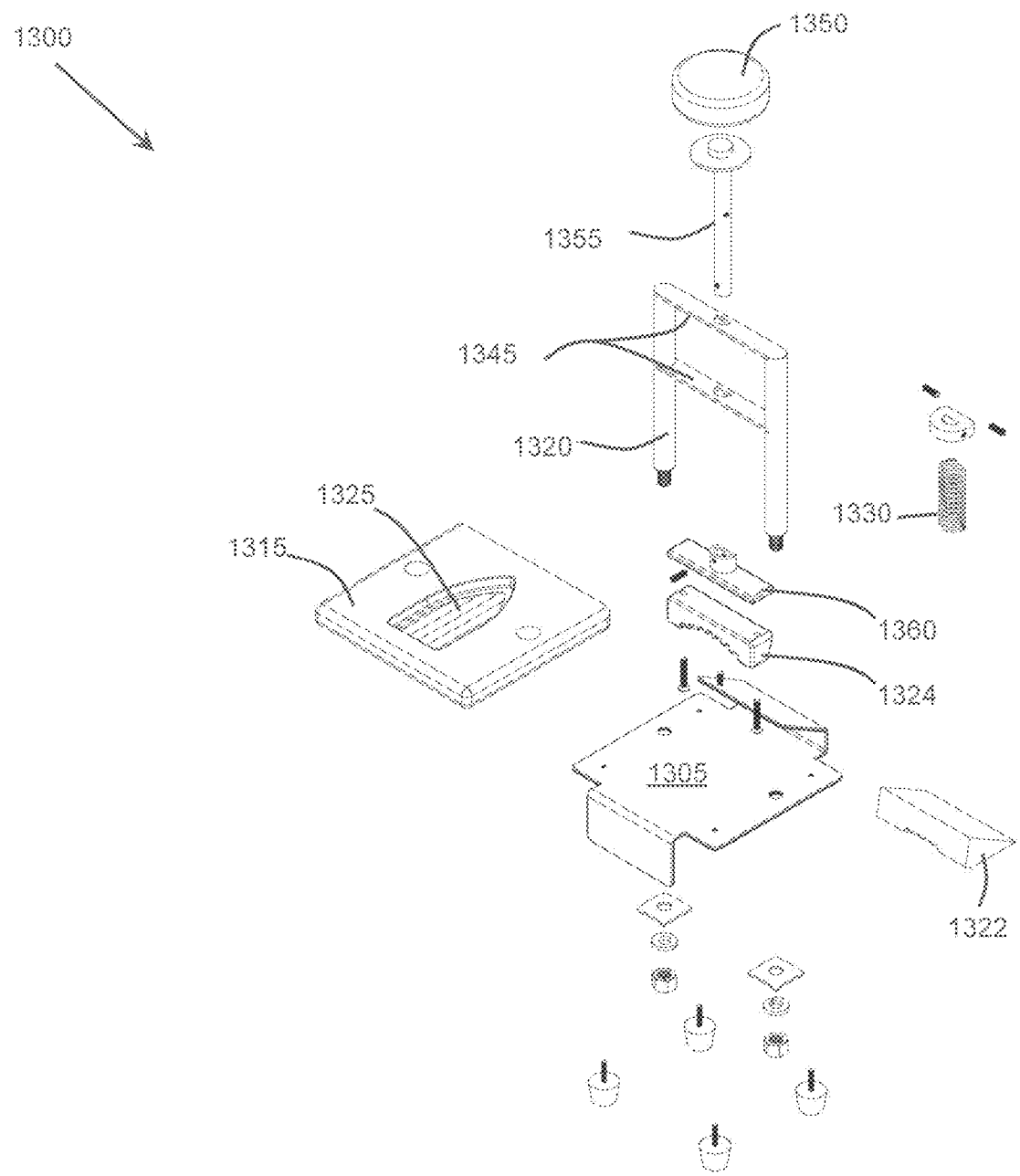

FIG. 13 is an exploded perspective view of the Oyster Clamp shown in FIG. 12. It is to be understood the configuration of the parts shown are merely illustrative, and other configurations of one or more of the parts may be used without departing from the scope of the invention. As in other exploded views, the function and purpose of illustrated elements are apparent by inspection.

Figure 14:
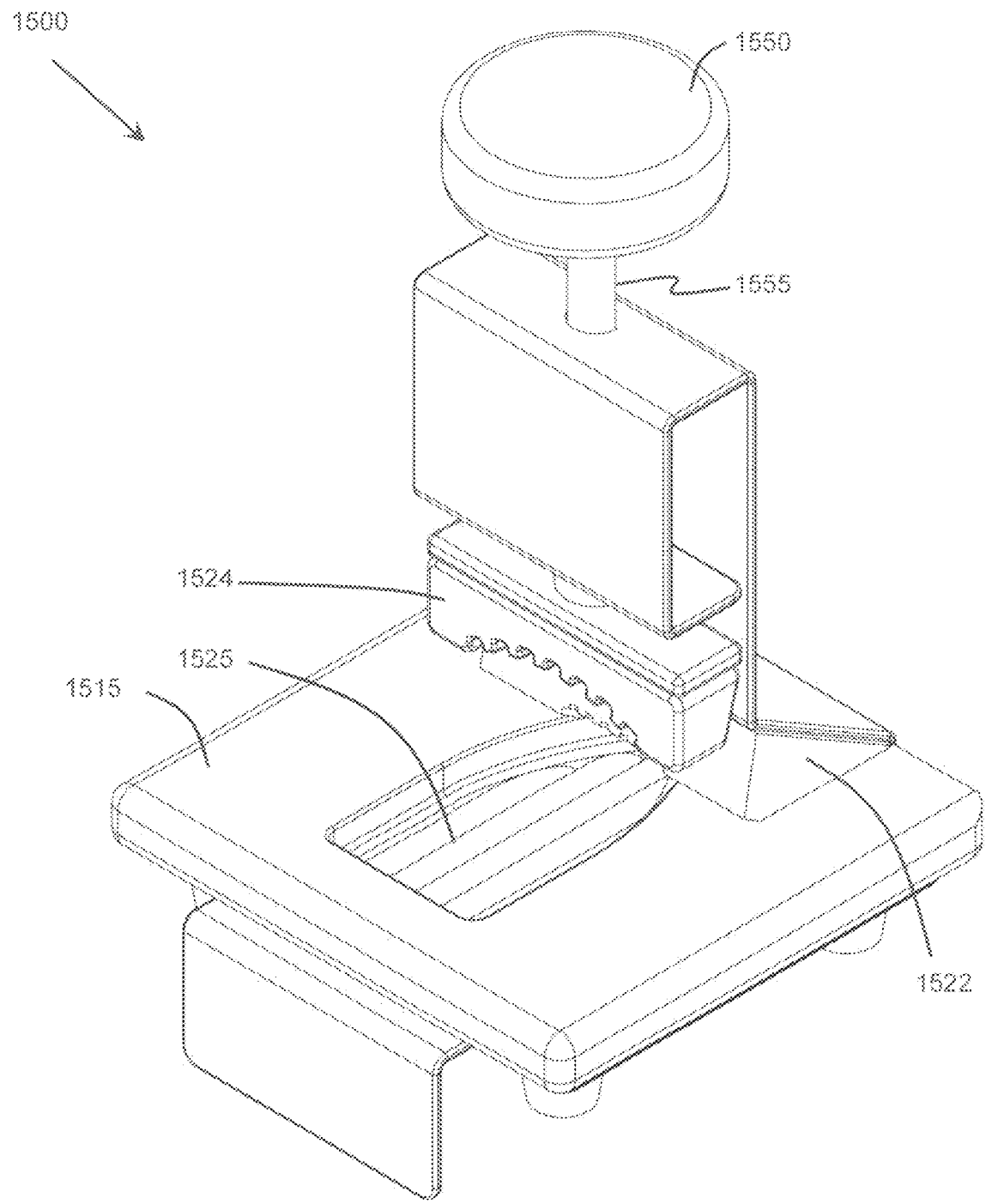

FIG. 14 is a perspective view of yet another exemplary embodiment. The operation of this embodiment is substantially similar to the operation of the embodiment illustrated in FIG. 12. However in this embodiment, structural support and guidance for the pushrod is provided by the end of frame (1505). The frame end (1545) includes holes for guiding the pushrod (1555), and a spring (1530) is disposed between the holes. The pushrod (1555) is inserted through the holes, a collar (1565), and the spring (1530), and secured to a plate (1560). The bottom of the plate (1560) is coupled to the oyster clamping element (1524), and the top of pushrod (1555) is coupled to a knob or handle (1550). In operation, the user places an oyster in the base element indentation (1525) against the backstop (1522), presses the knob (1550) down with one hand, compressing the spring (1530) and securing the oyster, and keeps applying downward pressure to the knob while operating an oyster opening tool with the other hand. The handle hand remains on the knob (1550) a safe distance from the oyster opening tool, preventing injury in the event the tool slips. Upon completion, the downward pressure on the knob is released, and the spring (1530) pushes the pushrod (1555) upward causing the oyster clamping element (1524) to release the oyster.

Figure 15:
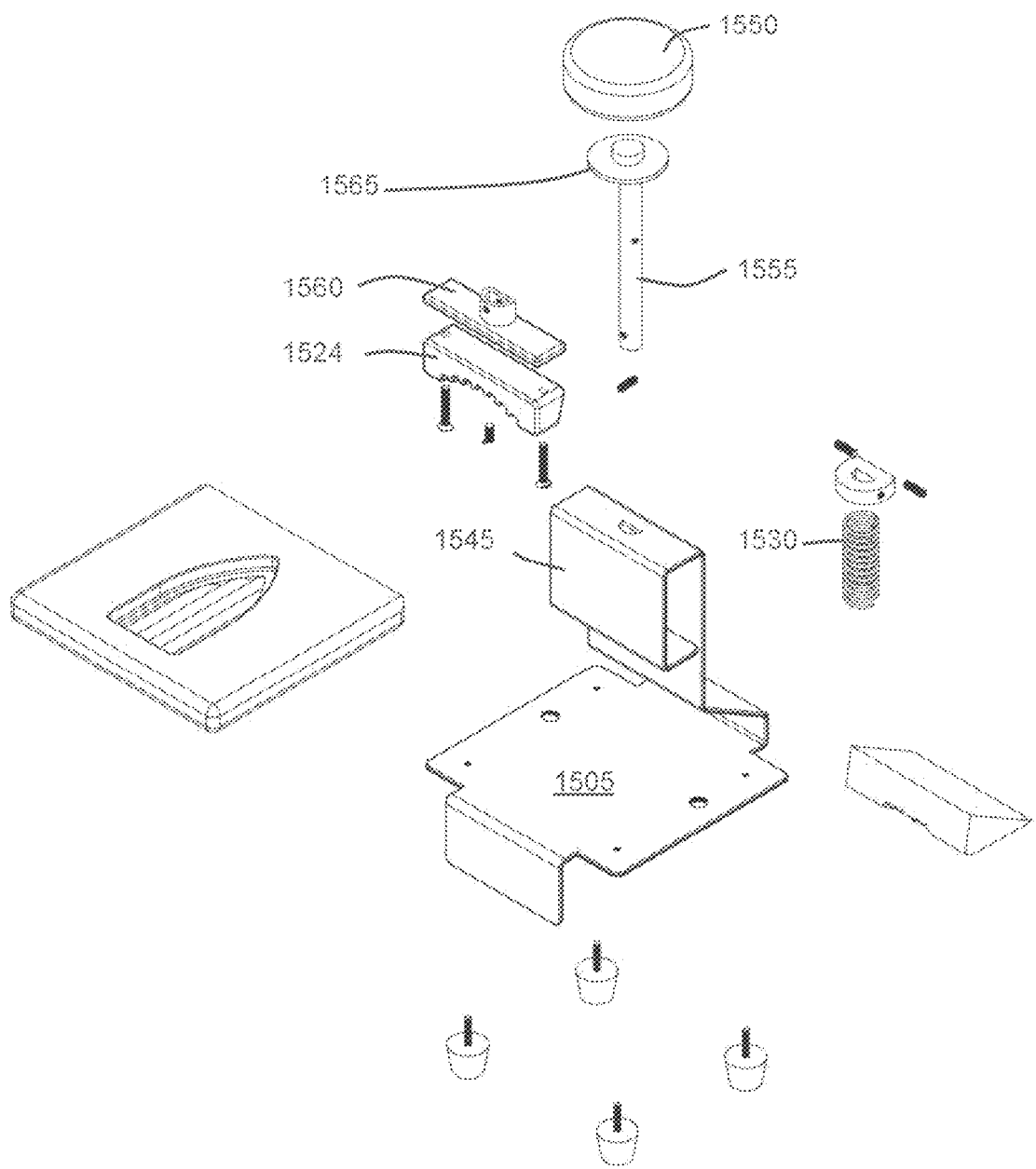

FIG. 15 is an exploded perspective view of the Oyster Clamp shown in FIG. 14. It is to be understood the configuration of the parts shown are merely illustrative, and other configurations of one or more of the parts may be used without departing from the scope of the invention. The function and purpose of illustrated elements are apparent by inspection.

Figure 16:
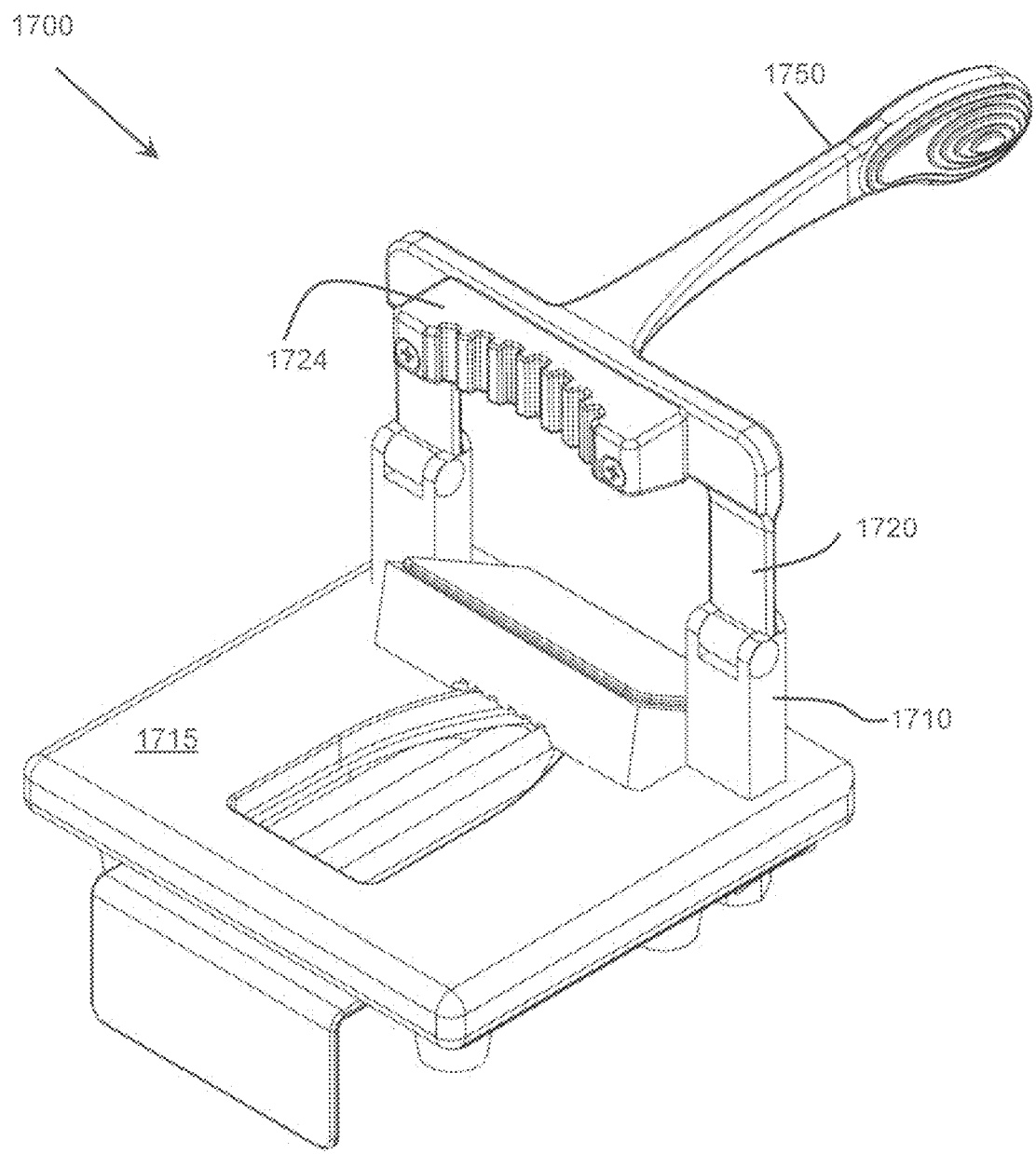

FIG. 16 is a perspective view of yet another exemplary embodiment (1700). The operation of this embodiment is substantially similar to the operation of the embodiment illustrated in FIG. 1. These embodiments mainly differ in the configuration of the hinge and handle, while remaining substantially similar in most other aspects of these embodiments. Instead of a single hinge as in FIG. 1, there are two hinges, one on either side of the rear of base element (1715). Part of the hinge (1710) is a post coupled directly to the base element (1715) coupled directly to the base element, and a top part (1720) coupled to the handle (1750). The top part of the hinge (1720) includes an extension that can be of any desired length such that, in use, the oyster clamping element (1724) presses down on the central part of the oyster during shucking. Further, the hinge posts (1710) each include a stem (1725) that prevents the handle from hitting the top of the work surface when the Oyster Clamp (1700) is open.

Figure 17:
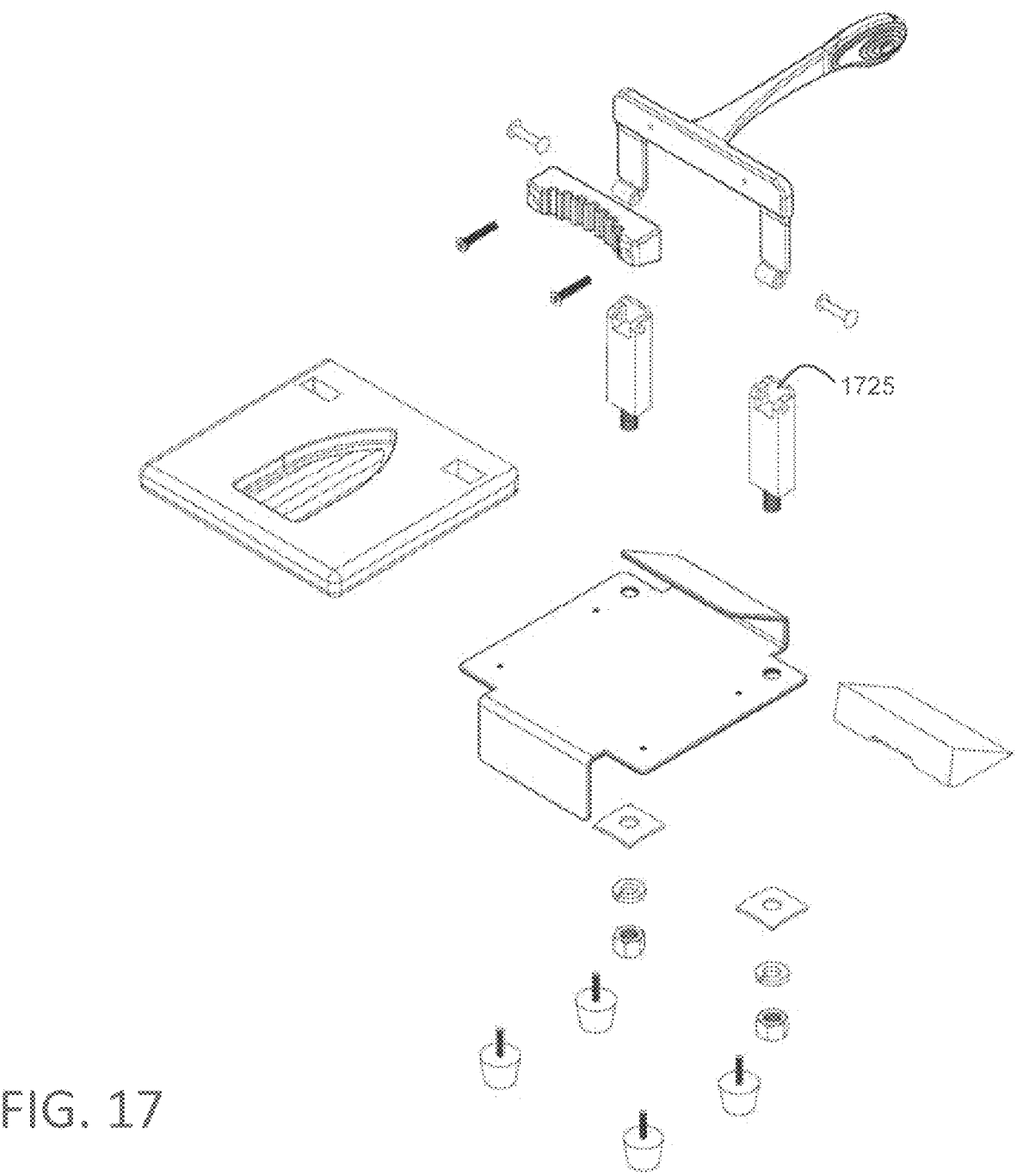

FIG. 17 is an exploded perspective view of the Oyster Clamp shown in FIG. 16. It is to be understood the configuration of the parts shown are merely illustrative, and other configurations of one or more of the parts may be used without departing from the scope of the invention. The function and purpose of illustrated elements are apparent by inspection.

Figure 18:
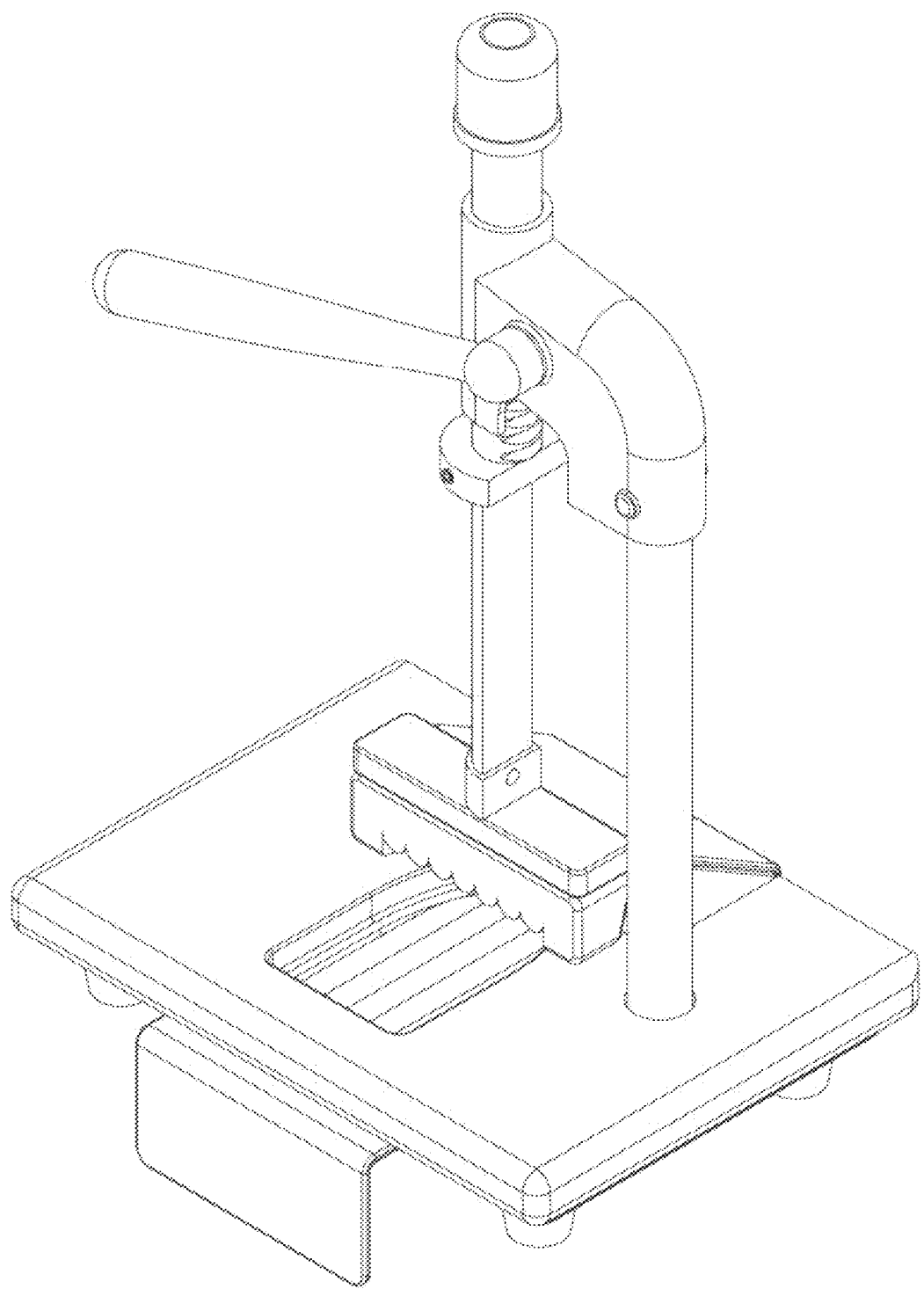
Figure 19:
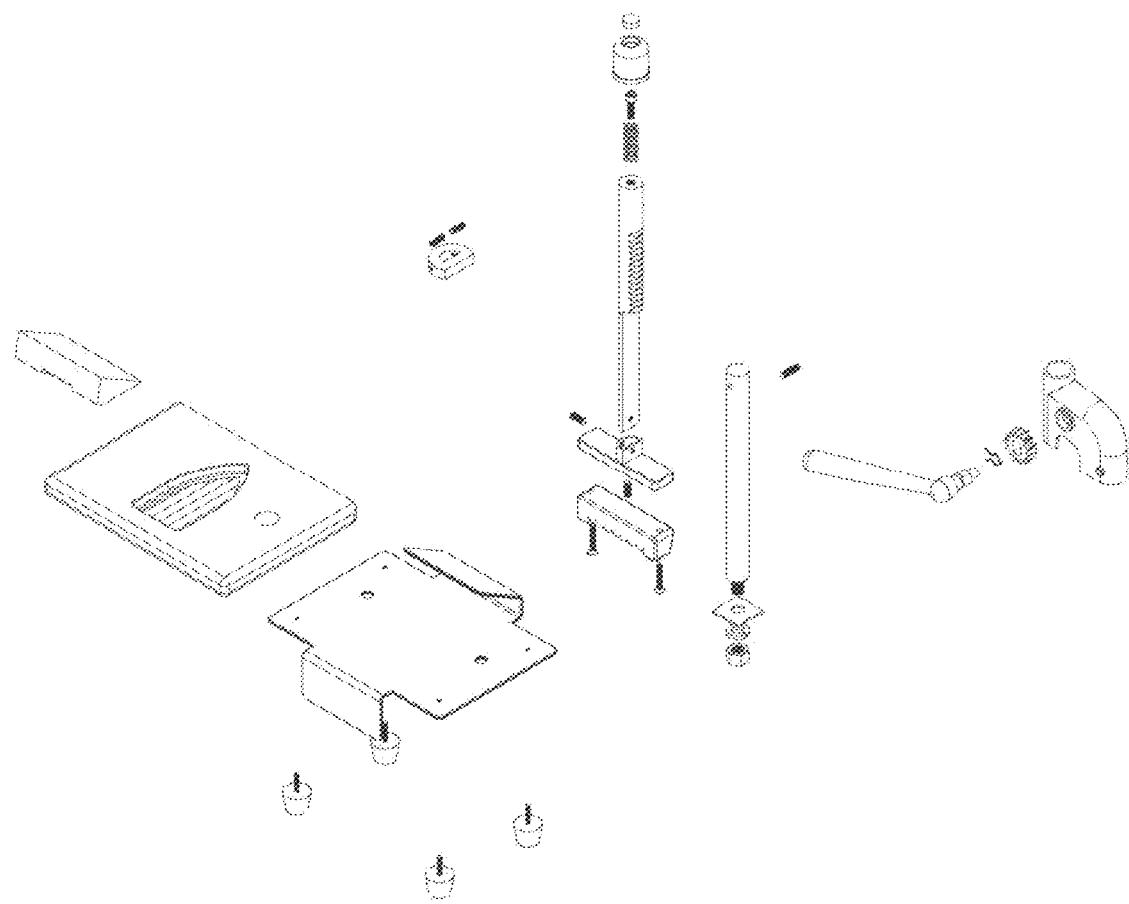

FIG. 18 is a perspective view of an embodiment substantially similar to the embodiment illustrated in FIG. 3, but of heavy-duty construction intended for commercial use. In general, the parts are thicker, wider, stronger, more durable, and more stable than the embodiment of FIG. 3. FIG. 19 is an exploded perspective view of the Oyster Clamp shown in FIG. 18. It is to be understood the configuration of the parts shown are merely illustrative, and other configurations of one or more of the parts may be used without departing from the scope of the invention. The function and purpose of illustrated elements are again apparent by inspection.

Figure 20:
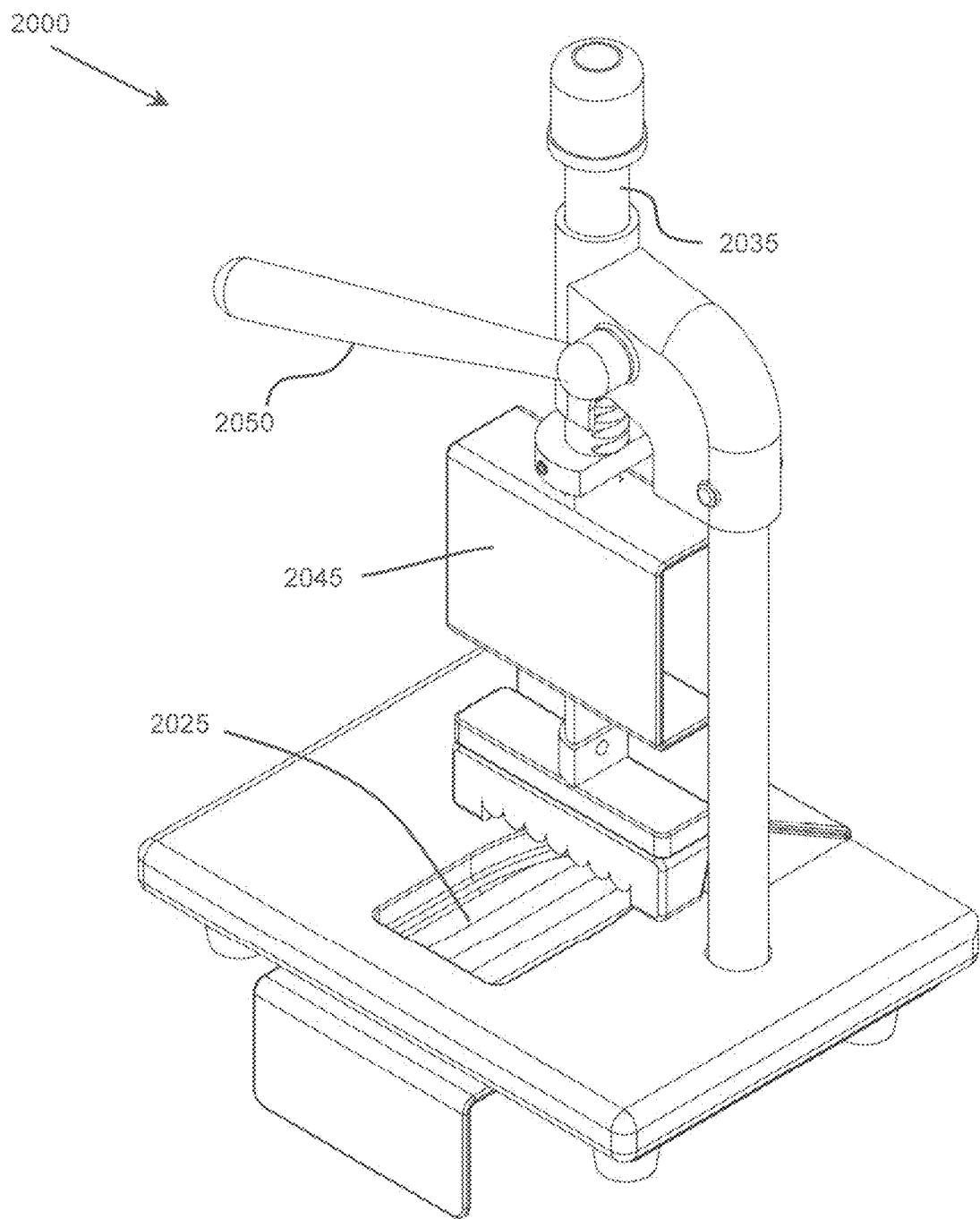
Figure 21:
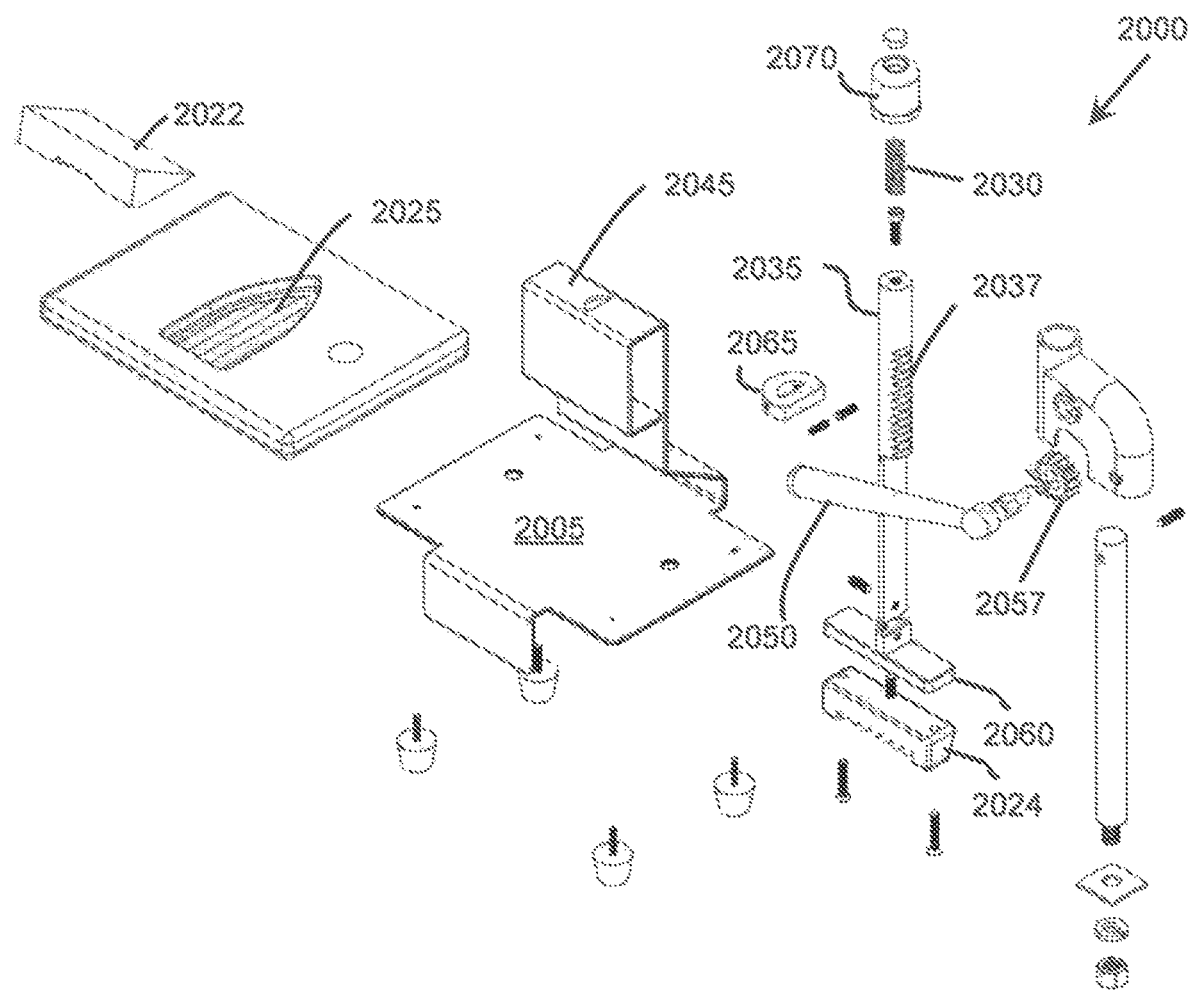

FIG. 20 is a perspective view, and FIG. 21 is an exploded view, of yet another exemplary embodiment. The operation of this embodiment is substantially similar to the operation of the embodiment illustrated in FIG. 3, with structural support similar to that provided by the embodiment of FIG. 14. In FIGS. 20 and 21, clamping element (2024) is raised and lowered with a rack (2037) and pinion (2057) system, and structural support and guidance for the piston are provided by the properly formed and bent end (2045) of frame (2005). The frame end (2045) includes holes for guiding the piston (2035), and a spring (2030) is disposed between the holes. The piston (2035) is inserted through a collar (2065), the holes in the end of the frame (2045), and the spring (2030), and secured to a plate (2060). The bottom of the plate (2060) is coupled to the oyster clamping element (2024), and the top of piston (2035) is coupled to a cap (2070). The pinion (2057) is operatively coupled to a handle (2050). In operation, the user places an oyster in the base element indentation (2025) against the backstop (2022), rotates the handle (2050) with one hand to lower the oyster clamping element (2024), thereby compressing the spring (2030) and securing the oyster. The user keeps applying pressure to the handle (2050) with one hand while operating an oyster opening tool with the other hand. The handle hand remains on the handle (2050) a safe distance from the oyster opening tool, preventing injury in the event the tool slips. Upon completion, the handle (2050) may be released or rotated in the opposite direction to raise the piston (2035), causing the oyster clamping element (2024) to release the oyster. The spring (2030) also pushes the piston (2035) upward.

It is to be understood the configuration of the parts shown are merely illustrative, and other configurations of one or more of the parts may be used without departing from the scope of the invention. The function and purpose of illustrated elements are apparent by inspection.

Figure 22:
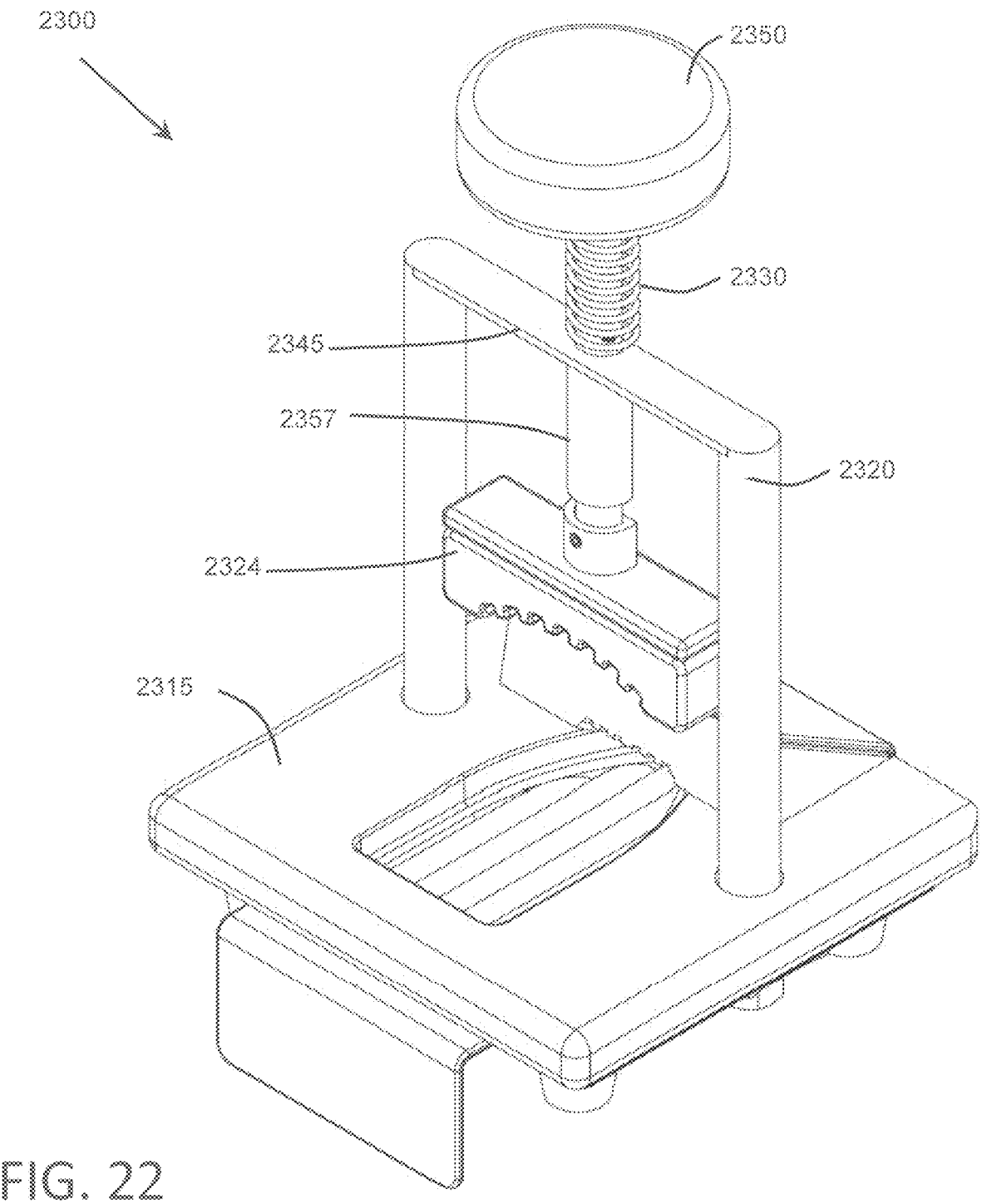
Figure 23:
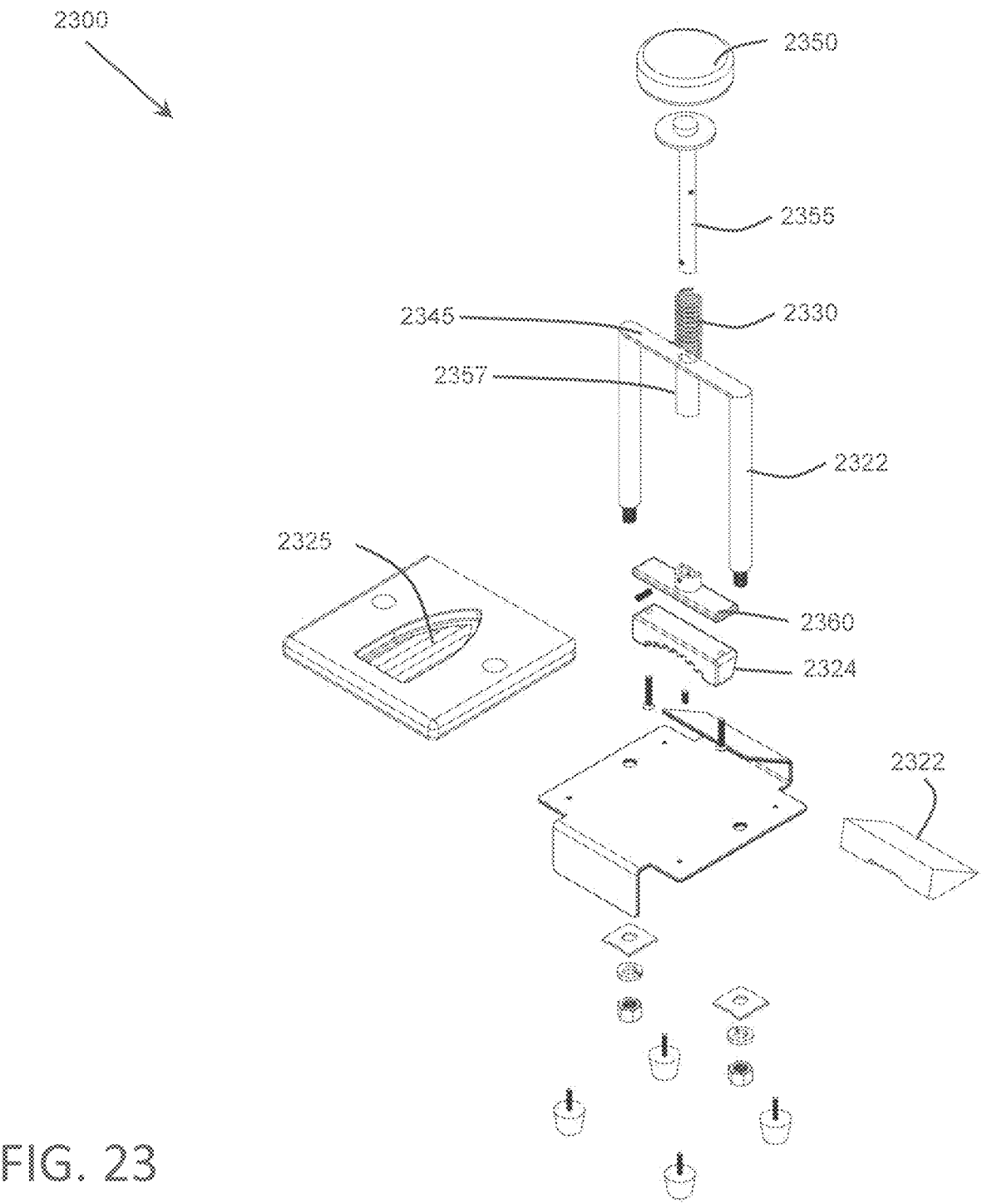

FIG. 22 is a perspective view and FIG. 23 is an exploded view of yet another exemplary embodiment. The operation of this embodiment is substantially similar to the operation of the embodiment illustrated in FIG. 12. The configuration is also largely the same. However in this embodiment, instead of two braces provided between the structural supports (2320), a single brace (2345) with a hole in its center is provided between the top of the supports (2320), and a tube (2357) extends downward from the hole. A spring (2330) is disposed between the holes in the brace (2345) and a knob (2350). A pushrod (2355) is inserted through the spring, the hole in brace (2345), and the tube (2357), and is coupled at its bottom end to a plate (2360). The oyster clamping element (2324) is coupled to the bottom of the plate (2360), and a knob (2350) is coupled to the top of the pushrod (2355). The tube ensures the pushrod (2335) is confined to move straight up and down with little to no wobbling. The cross sectional shape of the pushrod (2355) matches the shape of the hole in brace (2345), the tube (2357), and the socket in plate (2360) into which the bottom end of the pushrod (2355) is secured. Thereby, the oyster clamping element (2324) is prevented from spinning. In operation, the user lifts the knob (2350) with one hand, places an oyster in the base element indentation (2325) against the backstop (2322) with the other hand, presses the knob (2350) down with the handle hand to secure the oyster, and operates an oyster opening tool with the other hand. As in the embodiment of FIG. 12, the handle hand remains on the knob a safe distance from the oyster opening tool, preventing injury in the event the tool slips. Upon completion, the downward pressure on the knob is released, and the spring pushes it upward, causing the oyster clamping element to release the oyster.

Figure 24:
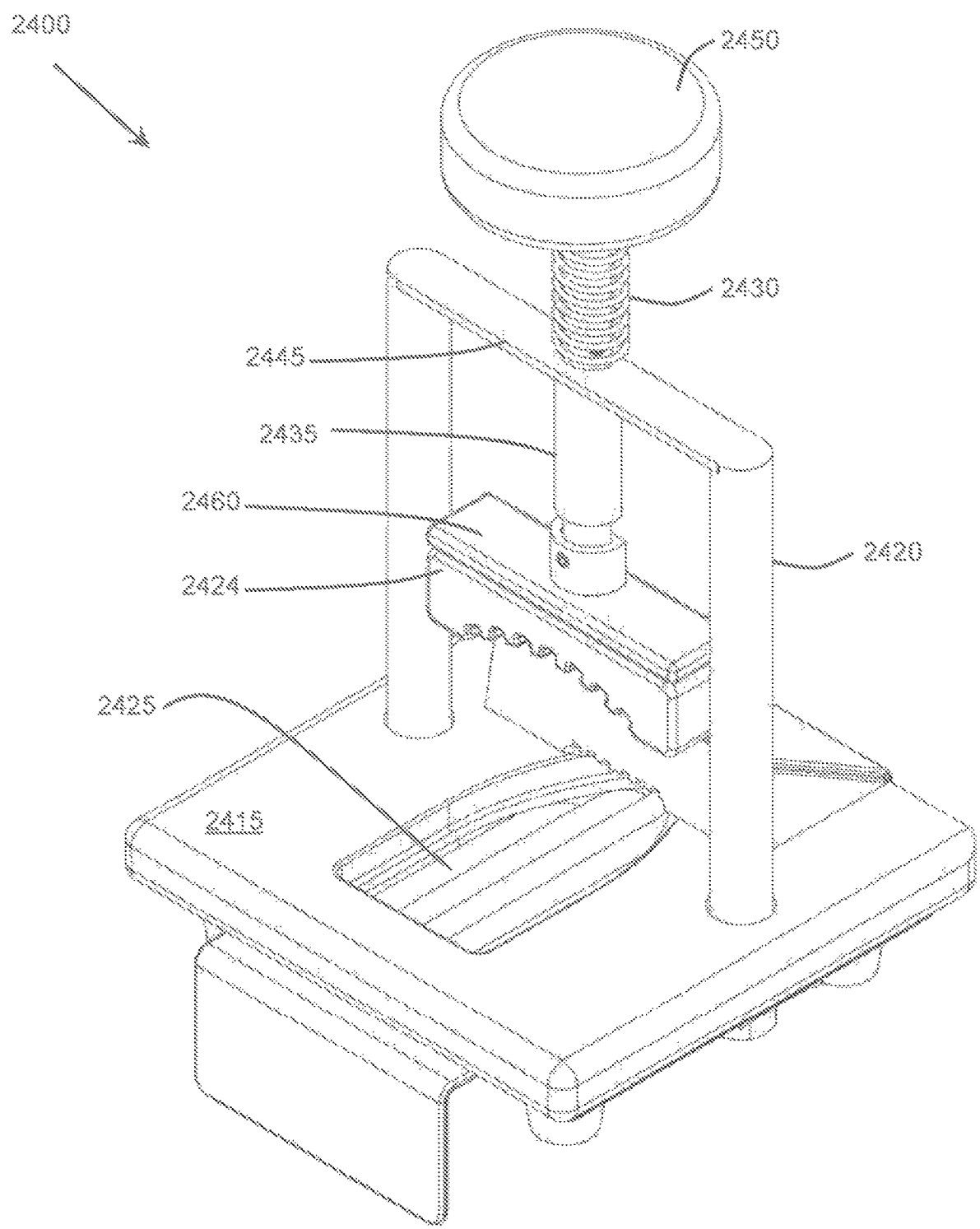
Figure 25:
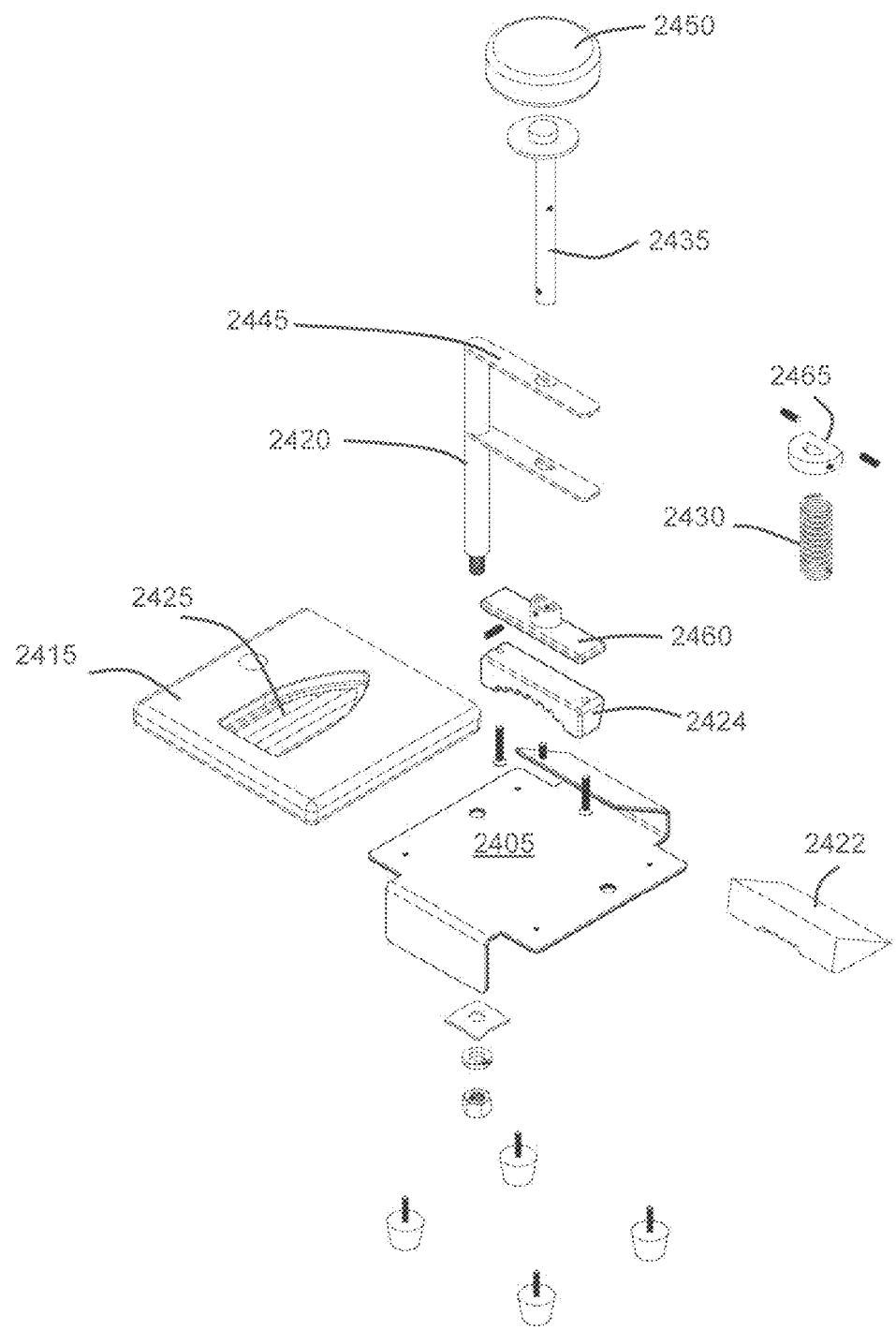

FIG. 24 is a perspective view and FIG. 25 is an exploded view of another exemplary embodiment. The operation of this embodiment is again substantially similar to the operation of the embodiment illustrated in FIG. 12. The configuration is also largely the same. However in this embodiment, instead of two support members provided between two structural supports (2320), a single structural support (2420) is provided with the two brace members (2445) coupled horizontally at only one side. One of the braces (2445) is disposed at the top of the support (2420), and one proximate the middle of the support. Each brace element includes a hole at its center, and a spring (2430) is disposed between the holes. A pushrod (2455) is inserted through the holes, a collar (2465), and the spring (2430), and secured to a plate (2460) at the bottom end of the pushrod (2355). The bottom of the plate (2460) is coupled to the oyster clamping element (2424), and the top of pushrod (2455) is coupled to a knob or handle (2450). In operation, the user places an oyster in the base element indentation (2425) against the backstop (2422), presses the knob (2450) down with one hand, compressing the spring (2430) and securing the oyster, and keeps applying downward pressure to the knob while operating an oyster opening tool with the other hand. The handle hand remains on the knob (2450) a safe distance from the oyster opening tool, preventing injury in the event the tool slips. Upon completion, the downward pressure on the knob is released, and the spring (2430) pushes the pushrod (2455) upward causing the oyster clamping element (2424) to release the oyster.

It is to be understood the configuration of the parts shown are merely illustrative, and other configurations of one or more of the parts may be used without departing from the scope of the invention. As in other exploded views, the function and purpose of illustrated elements are apparent by inspection.

Figure 26:
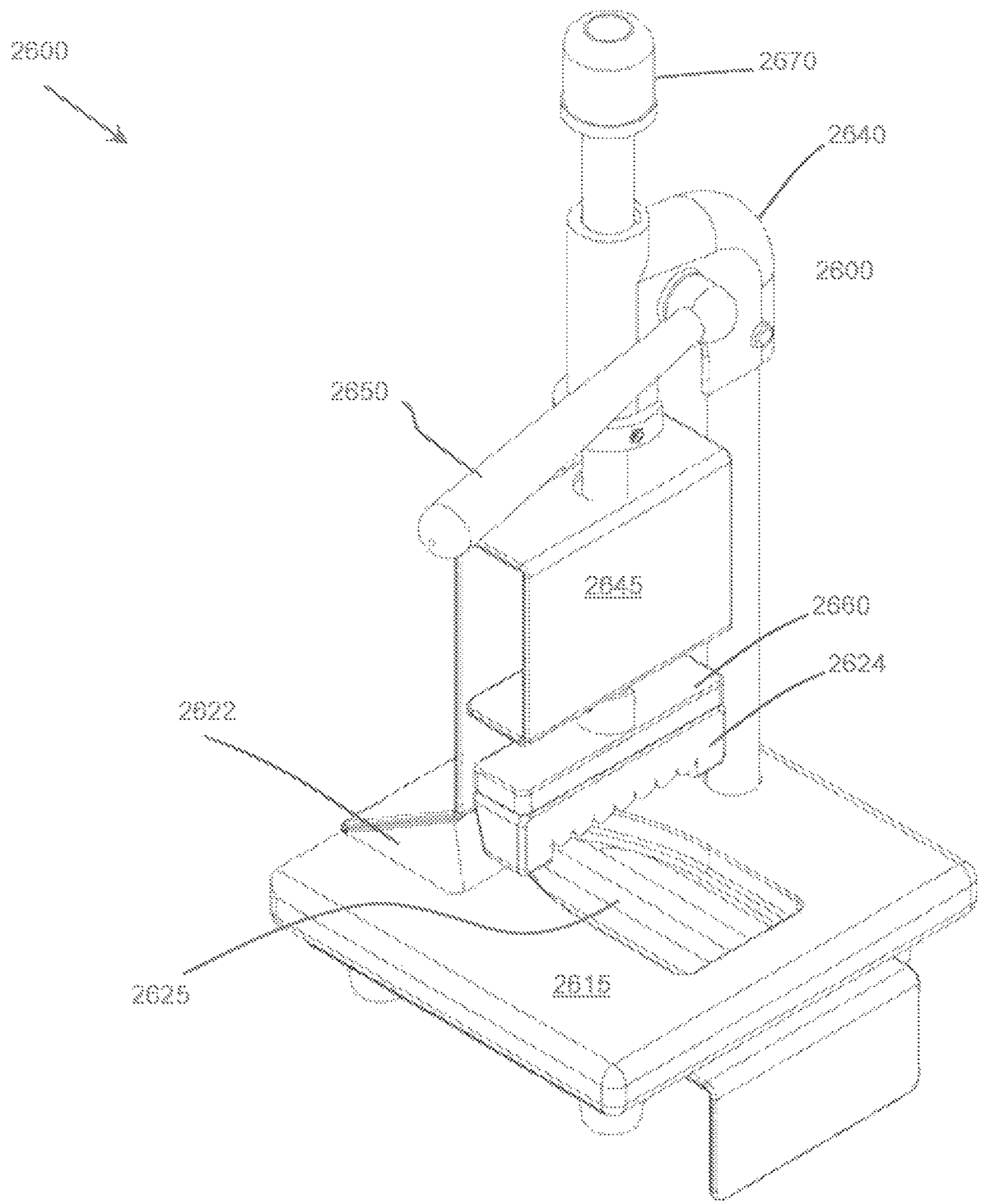
Figure 27:
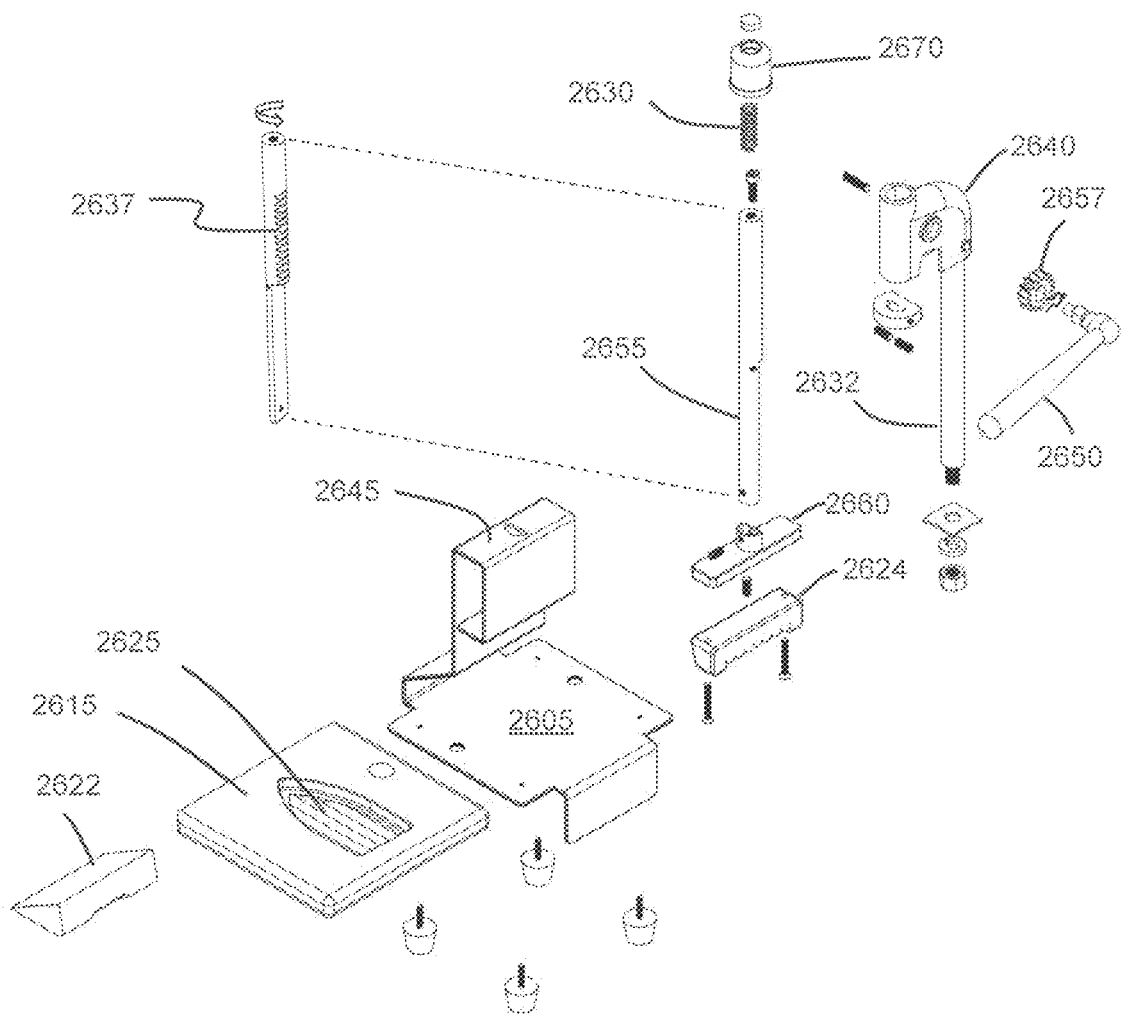

FIG. 26 is a perspective view and FIG. 27 is an exploded view of another exemplary embodiment. The operation and construction of this embodiment is substantially similar to the operation of the embodiment illustrated in FIG. 20. However this embodiment is larger and more sturdily built than that of FIG. 20, and may be more appropriate for use in a commercial setting.

Figure 28:
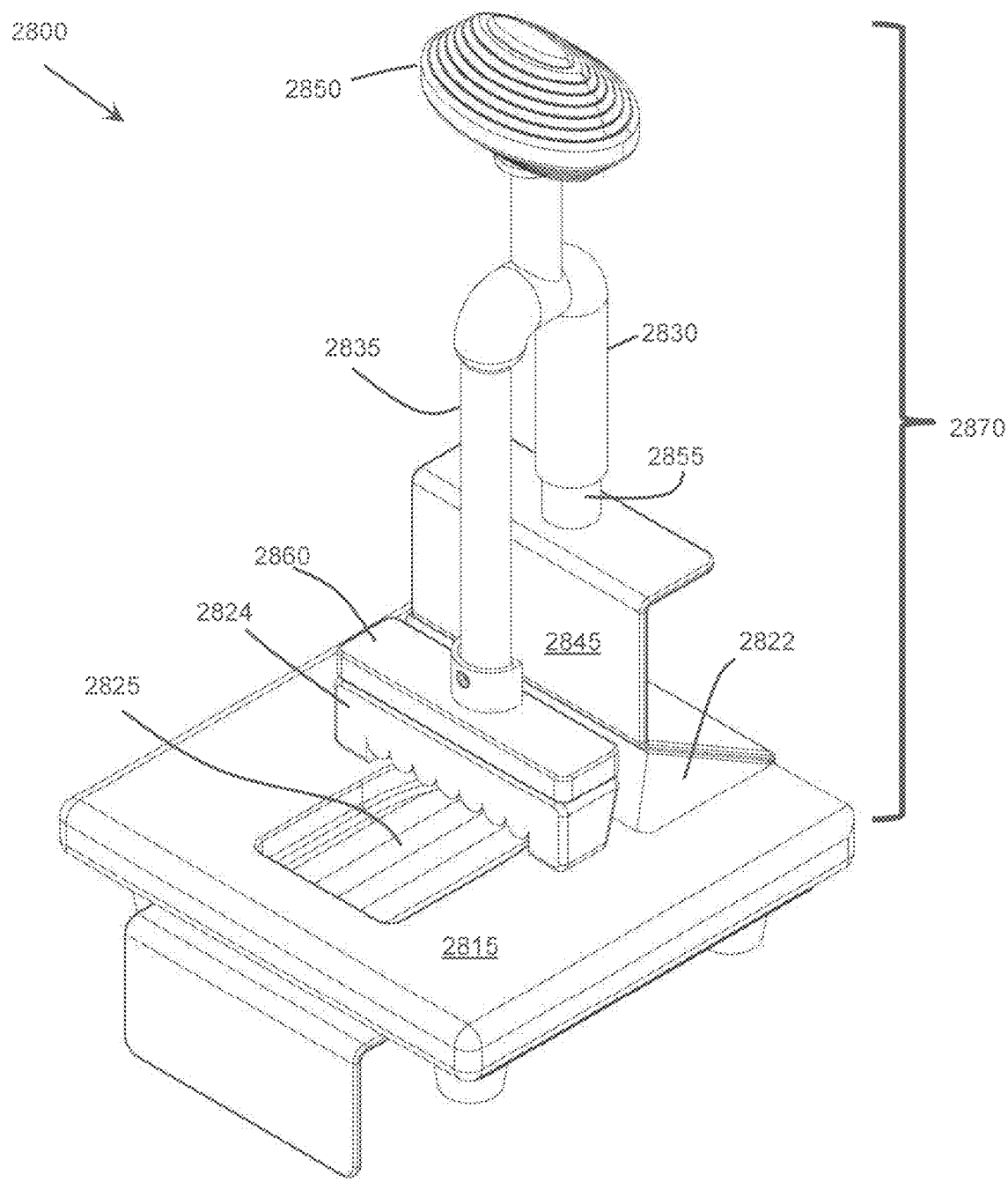
Figure 29:
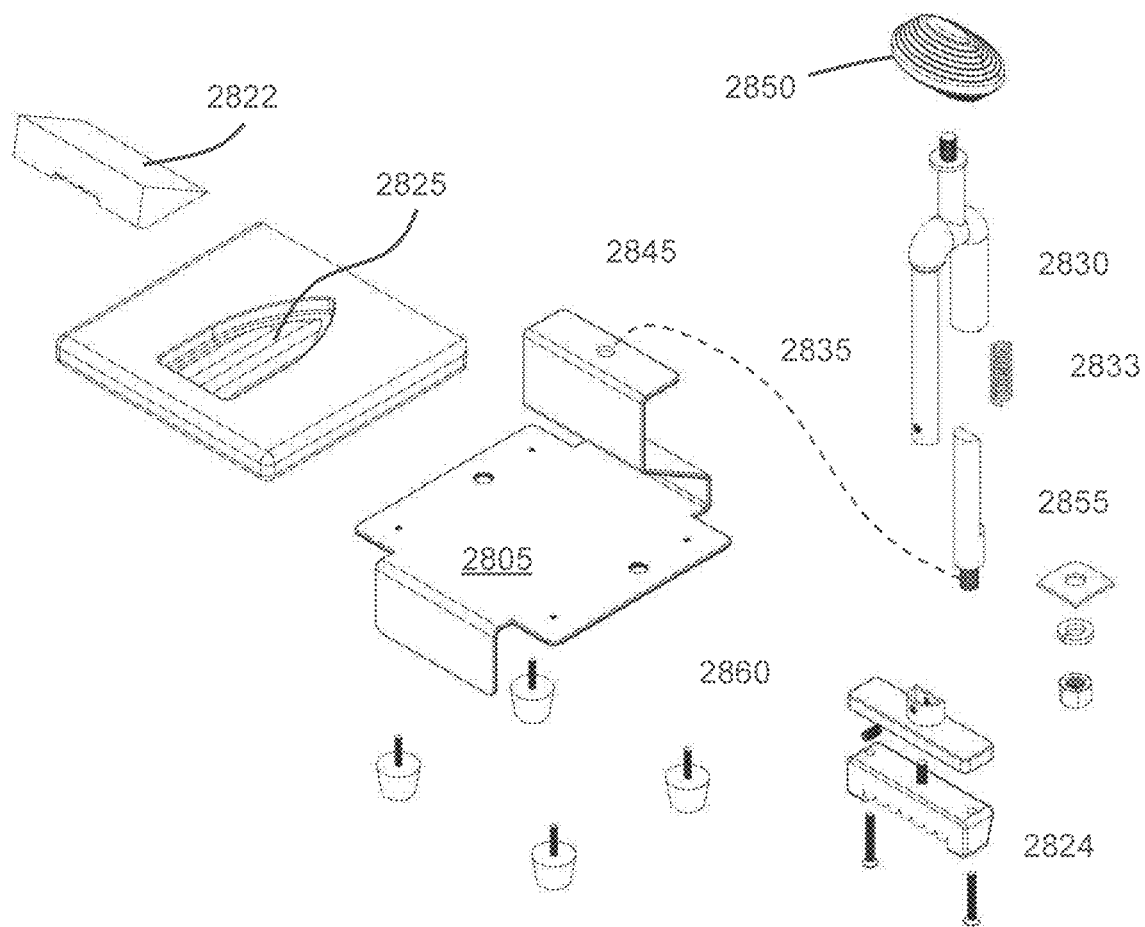

FIG. 28 is a perspective view and FIG. 29 is an exploded view of another exemplary embodiment. Here, structural support is again provided by a properly configured sheet of a strong, rigid material such as steel. The sheet is bent to provide a structural support (2845). A support member (2855) is coupled to the structural support (2845), and a tubular sleeve (2830) is disposed over the support (2855). The sleeve is coupled to handle (2850), and to support (2835). From there, support (2835) extends vertically down to plate (2860), the bottom of which is coupled to oyster clamping element (2824). A spring (2833) is coupled to the top of the support (2855). In operation, the user lifts the handle (2850) with a handle hand, places an oyster in the base indentation (2825) against the backstop (2822), presses the handle down with the handle hand to secure the oyster, and operates an oyster opening tool with the other hand. The handle hand remains on the handle a safe distance from the oyster opening tool, preventing injury in the event the tool slips. Upon completion, the downward pressure on the handle (2850) is released, and the spring (2833) pushes it upward, causing the oyster clamping element to release the oyster. In a preferred embodiment, this model may be made to be smaller than the others, and therefore more convenient to store for home use.

Moreover, similarly to the embodiment shown in FIG. 9, the handle (2950), sleeve (2830), support (2835), plate (2860), and oyster clamping element (2824), once assembled, form a floating sleeve (2870) that can be slid off the rest of the Oyster Clamp (2800), and replaced with a different floating sleeve more appropriate to the next task at hand. The Oyster Clamp (2800) may thereby be reconfigured simply by removing and replacing the floating sleeve (2870). This feature is handy, for example, when changing the type of shellfish being shucked, for example, from one size (e.g., small oysters) to another size (e.g., jumbo oysters), or from one type of bivalve (e.g., oysters) to another type with a different general shape (e.g., clams).

FIG. 29 is an exploded perspective view of the Oyster Clamp shown in FIG. 28. It is to be understood the configuration of the parts shown are merely illustrative, and other configurations of one or more of the parts may be used without departing from the scope of the invention. The function and purpose of illustrated elements are apparent by inspection.

Figure 30:
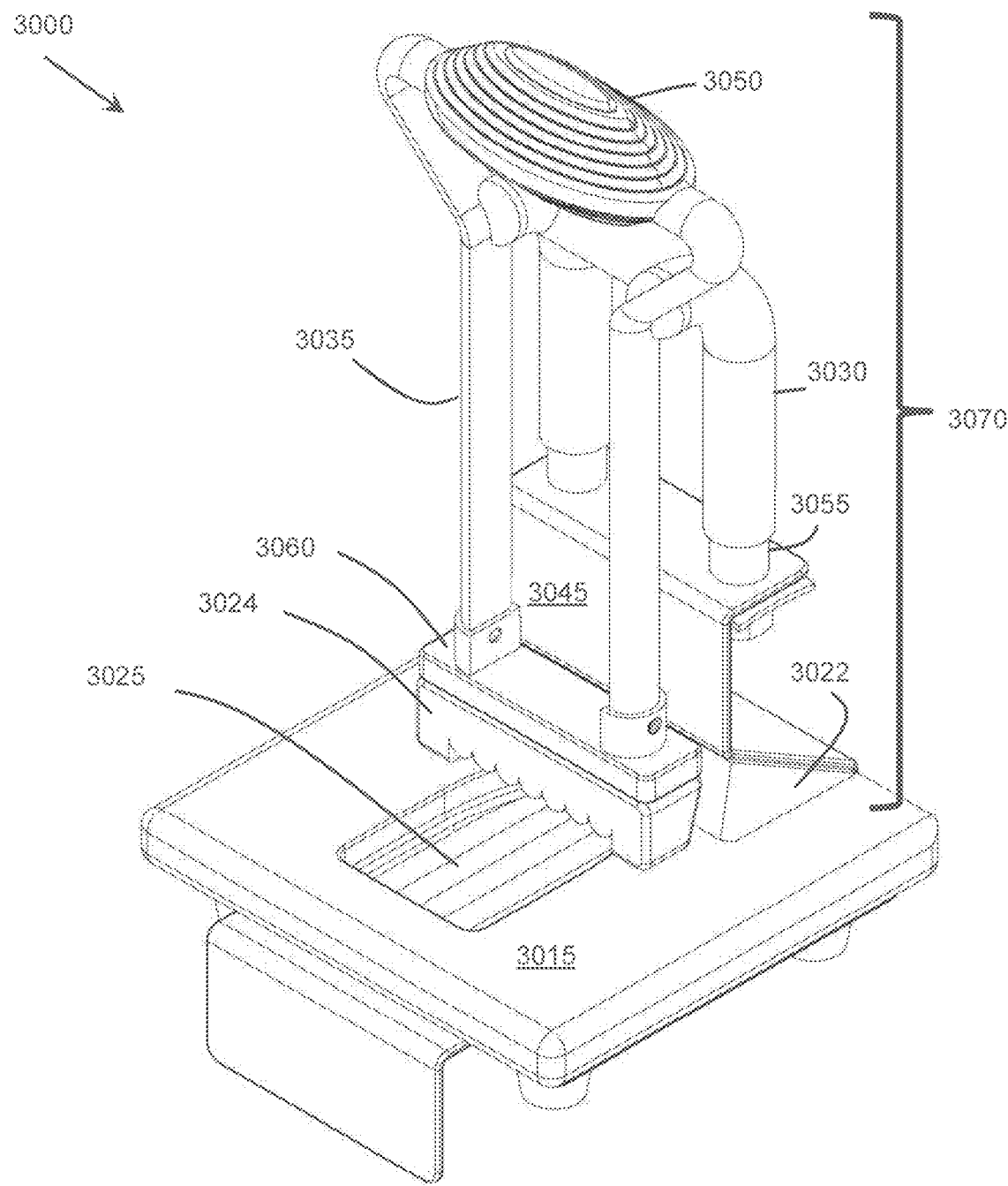
Figure 31:
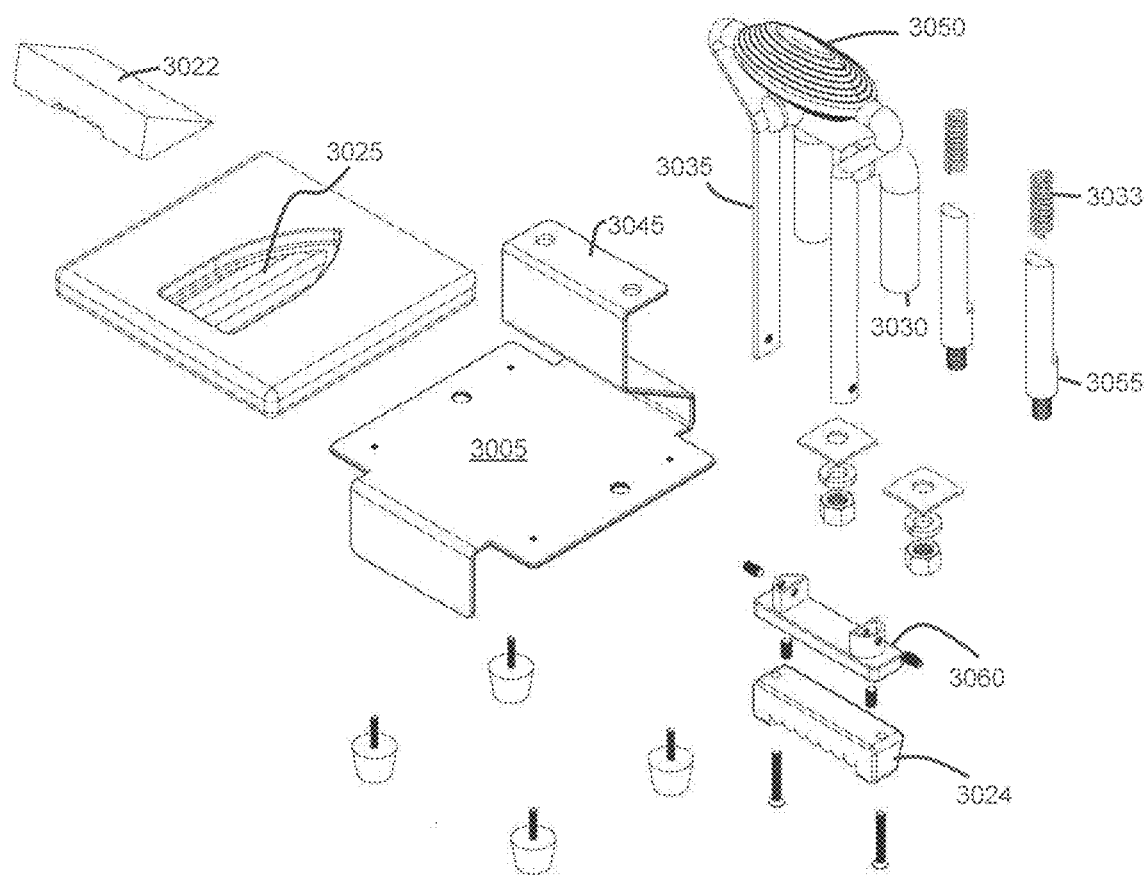

FIG. 30 is a perspective view and FIG. 31 is an exploded view of another exemplary embodiment. The operation of this embodiment is substantially similar to the operation of the embodiment illustrated in FIG. 28. However in this embodiment, two support members (3055) are coupled to the structural support (3045), and a tubular sleeve (3030) is disposed over the support members (3055). Both sleeves are coupled to handle (3050), and to a pair of supports (3035) with semicircular cross section. It is noted that the couplings to the handle (3050) are flared to accommodate a large hand if needed. Supports (3035) extend vertically down to plate (3060), the bottom of which is coupled to oyster clamping element (3024). Springs (3033) are coupled to the top of respective supports (3055), under the sleeves (3030). The two supports members (3055), sleeves (3030), and supports (3035) make this embodiment sturdier than that shown in FIG. 28. Similarly to the embodiment shown in FIG. 28, the handle (3050), sleeves (30), supports (3035), plate (3060), and oyster clamping element (3024), once assembled, form a floating sleeve (3070) that can be slid off the rest of the Oyster Clamp (3000), and replaced with a different floating sleeve more appropriate to the next task at hand. As previously described, the Oyster Clamp (3000) may thereby be reconfigured simply by removing and replacing the floating sleeve (3070). This feature is handy, for example, when changing the type of shellfish being shucked, for example, from one size (e.g., small oysters) to another size (e.g., jumbo oysters), or from one type of bivalve (e.g., oysters) to another type with a different general shape (e.g., clams).

FIG. 31 is an exploded perspective view of the Oyster Clamp shown in FIG. 30. It is to be understood the configuration of the parts shown are merely illustrative, and other configurations of one or more of the parts may be used without departing from the scope of the invention. The function and purpose of illustrated elements are apparent by inspection.

Figure 32:
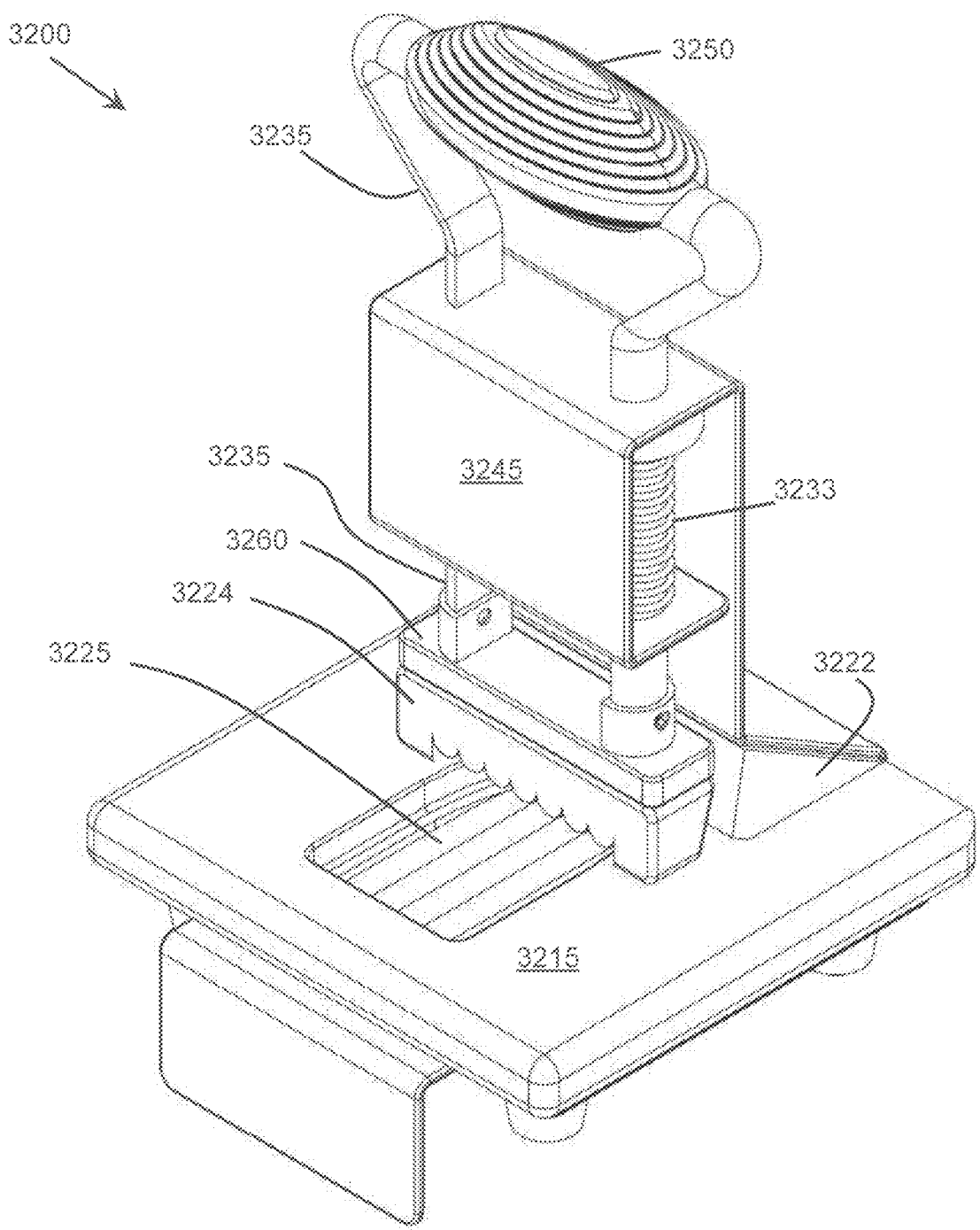
Figure 33:
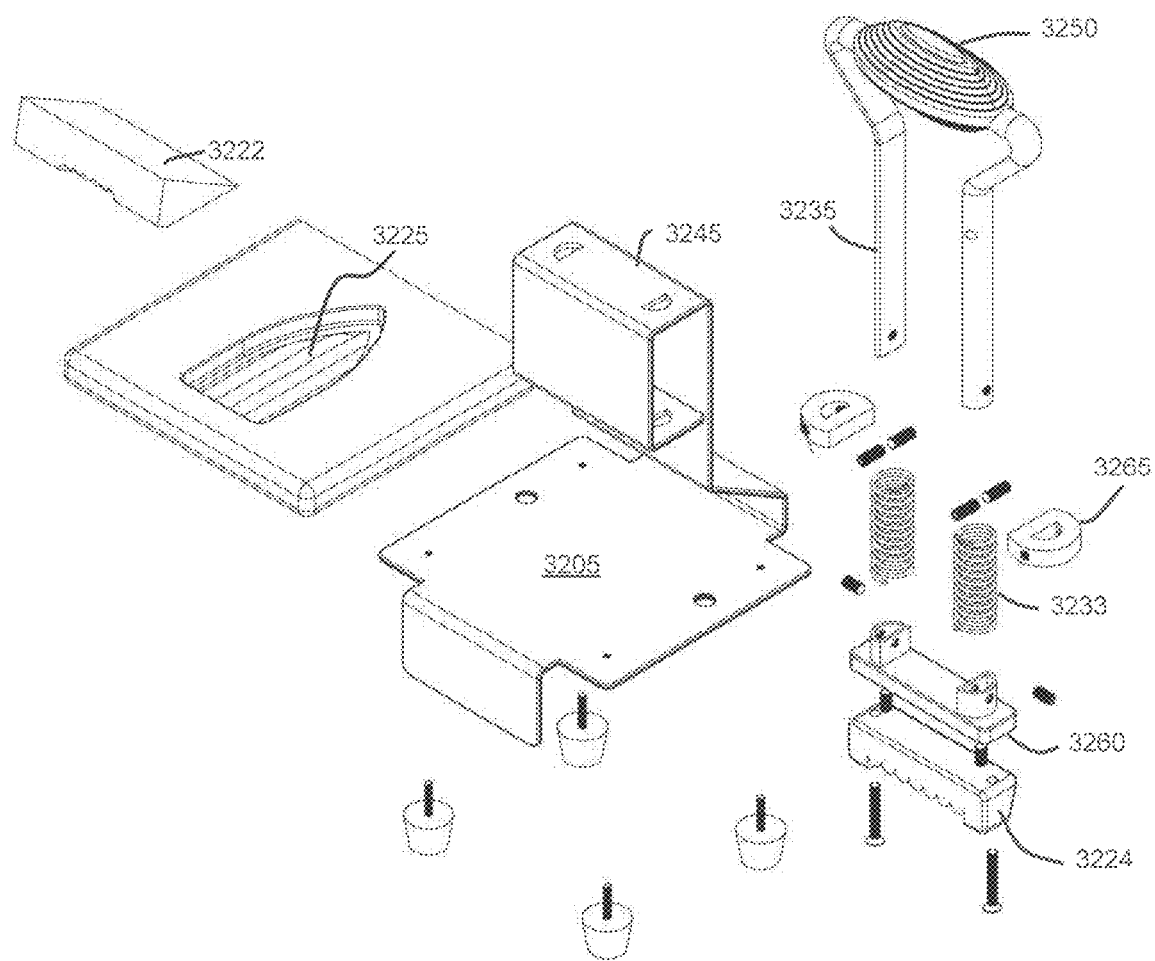

FIG. 32 is a perspective view and FIG. 33. Is an exploded view of yet another exemplary embodiment. The operation and construction of this embodiment is substantially similar to that of the embodiment illustrated in FIG. 30. However in this embodiment, structural support and guidance for the pair of pushrods 3035 is provided by the end of frame (3205). The frame end (3245) includes holes for guiding the pushrods (3255), and a spring (3233) is disposed vertically between the holes. The pushrods (3255) are inserted through the holes, collars (3265), and springs (3233), and secured to a plate (3260). The bottom of the plate (3260) is coupled to the oyster clamping element (3224), and the tops of pushrods (3255) are coupled to handle (3250). In operation, the user presses the handle (3250) down with one hand, compressing the spring (3233) and securing the oyster, operates an oyster opening tool with the other hand. The handle hand remains on the handle (3250) a safe distance from the oyster opening tool, preventing injury in the event the tool slips. Upon completion, the downward pressure on the handle is released, and the springs (3233) push the pushrods (3255) upward causing the oyster clamping element (3224) to release the oyster.

FIG. 33 is an exploded perspective view of the Oyster Clamp shown in FIG. 32. It is to be understood the configuration of the parts shown are merely illustrative, and other configurations of one or more of the parts may be used without departing from the scope of the invention. The function and purpose of illustrated elements are apparent by inspection.

Figure 34:
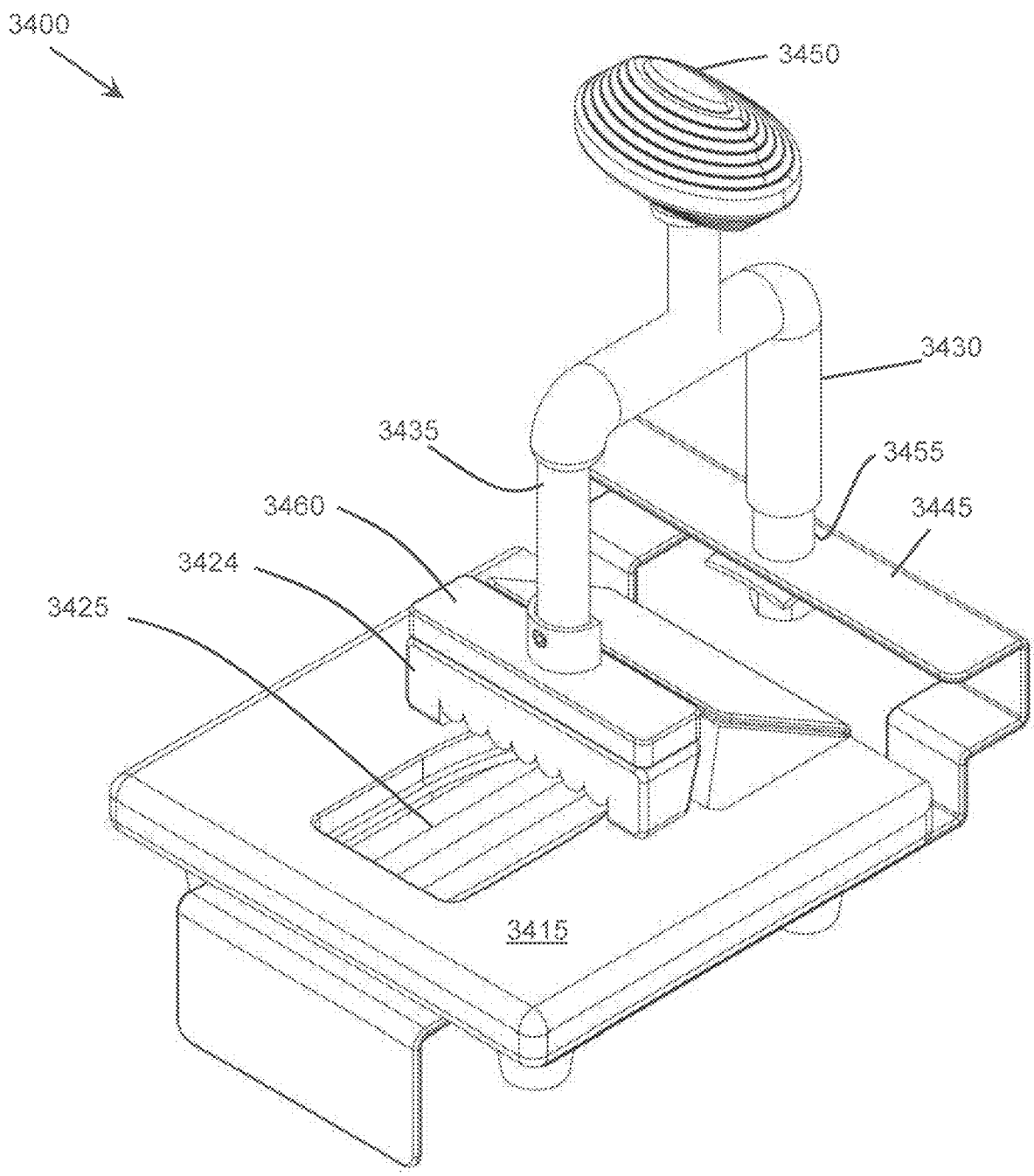
Figure 35:
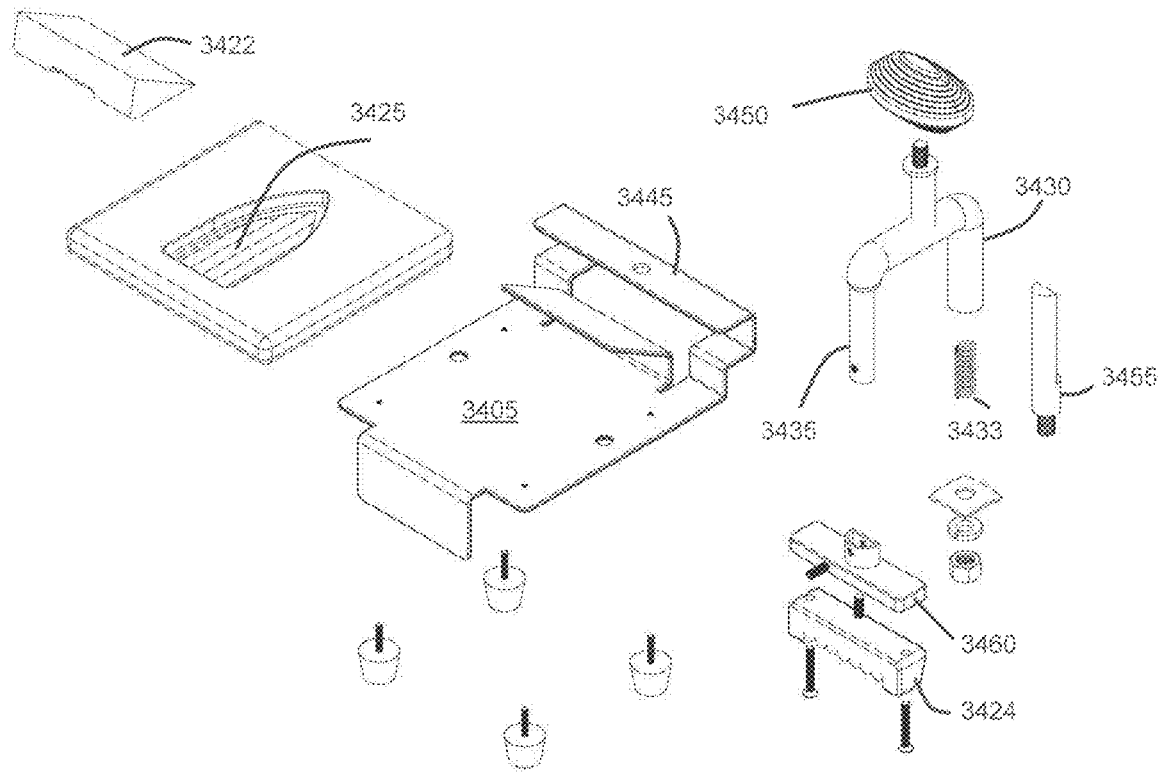

FIG. 34 is a perspective view and FIG. 35 is an exploded view of another exemplary embodiment. The operation and construction of this embodiment is substantially similar to the operation of the embodiment illustrated in FIG. 28. Similarly to the embodiment of FIG. 28, the handle (3450), sleeve (3430), support (3435), plate (3460), and oyster clamping element (3424), once assembled, form a floating sleeve (3470) that can be slid off the rest of the Oyster Clamp (3400), and replaced with a different floating sleeve more appropriate to the next type of bivalve to be schucked. However in this embodiment, structural support is provided by a differently configured and bent sheet of metal that doesn't touch the base element (3415). Instead, unlike the other embodiments described herein, the floating sleeve (3470) or equivalent structures is supported from behind and separated from the base element (3415). Further, the sleeve (3430) and support (3435) are further apart from each other, and shorter than the embodiment of FIG. 28. The resulting change in balance and stability characteristics of this embodiment may be preferred for some shucking tasks.

Figure 36:
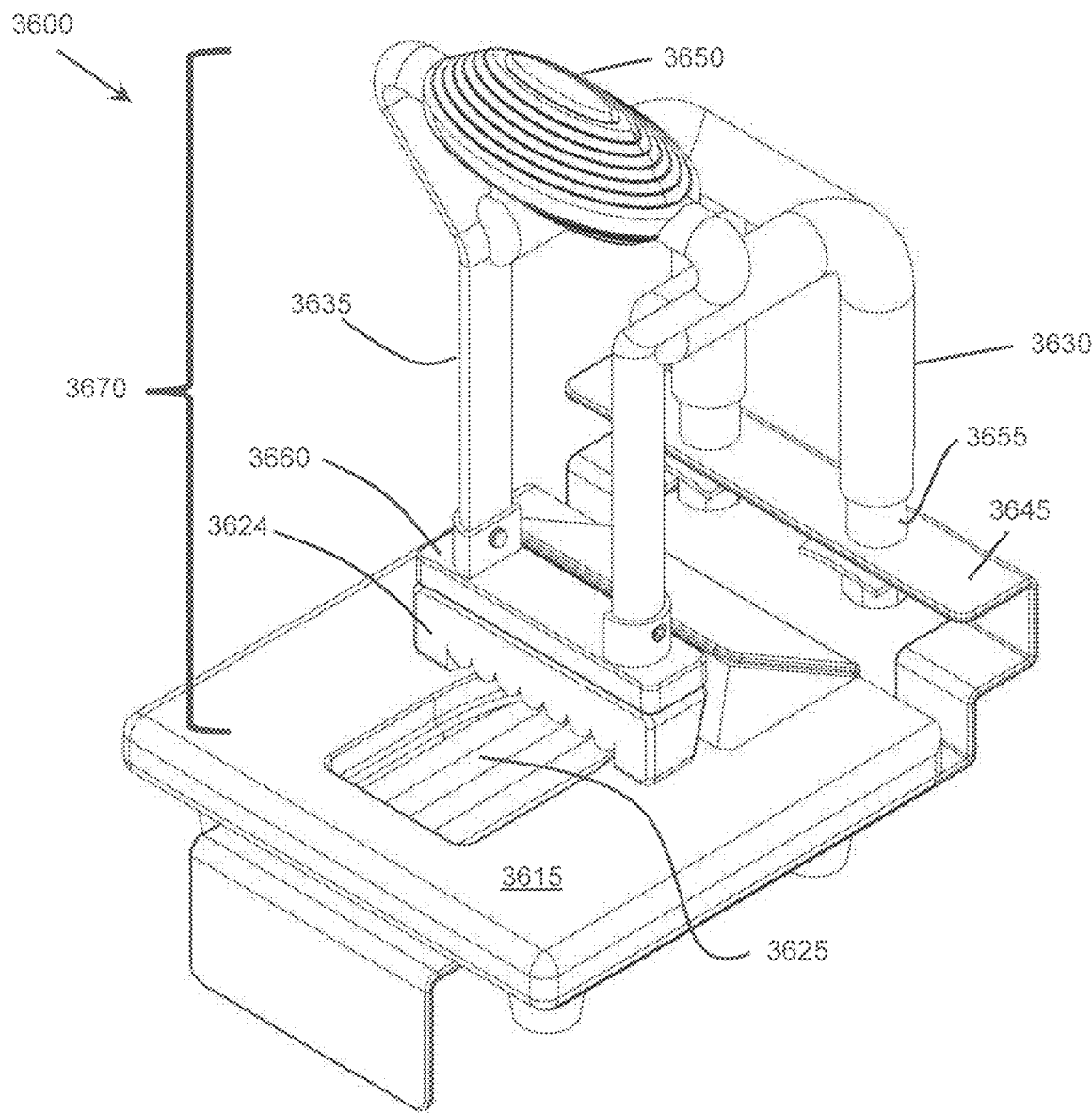
Figure 37:
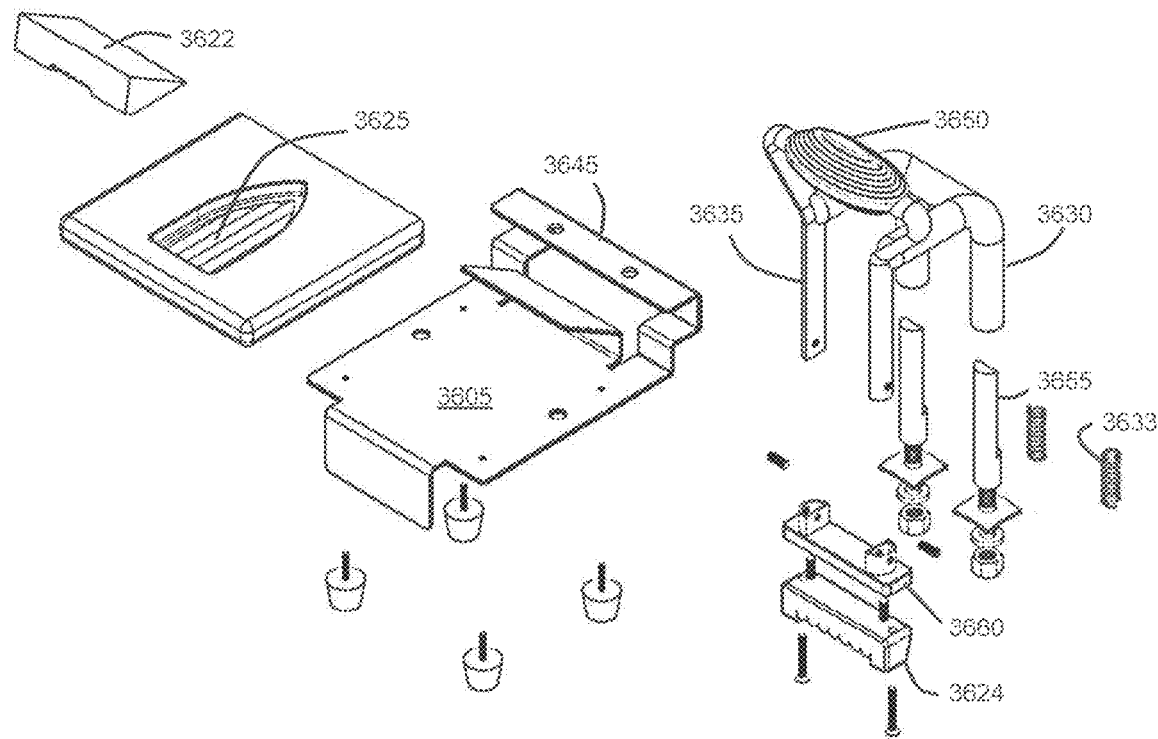

FIG. 36 is a perspective view and FIG. 37 is an exploded view of another exemplary embodiment. The operation and construction of this embodiment is substantially similar to that of the embodiment illustrated in FIG. 34, but having a pair of sleeves (3630) and supports (3635), making this embodiment significantly sturdier. Similarly to the embodiment of FIG. 34, the handle (3650), sleeves (3630), supports (3635), plate (3660), and oyster clamping element (3624), once assembled, form a floating sleeve (3670) that can be slid off the rest of the Oyster Clamp (3600), and replaced with a different floating sleeve more appropriate to the next type of bivalve to be schucked.

Figure 38:
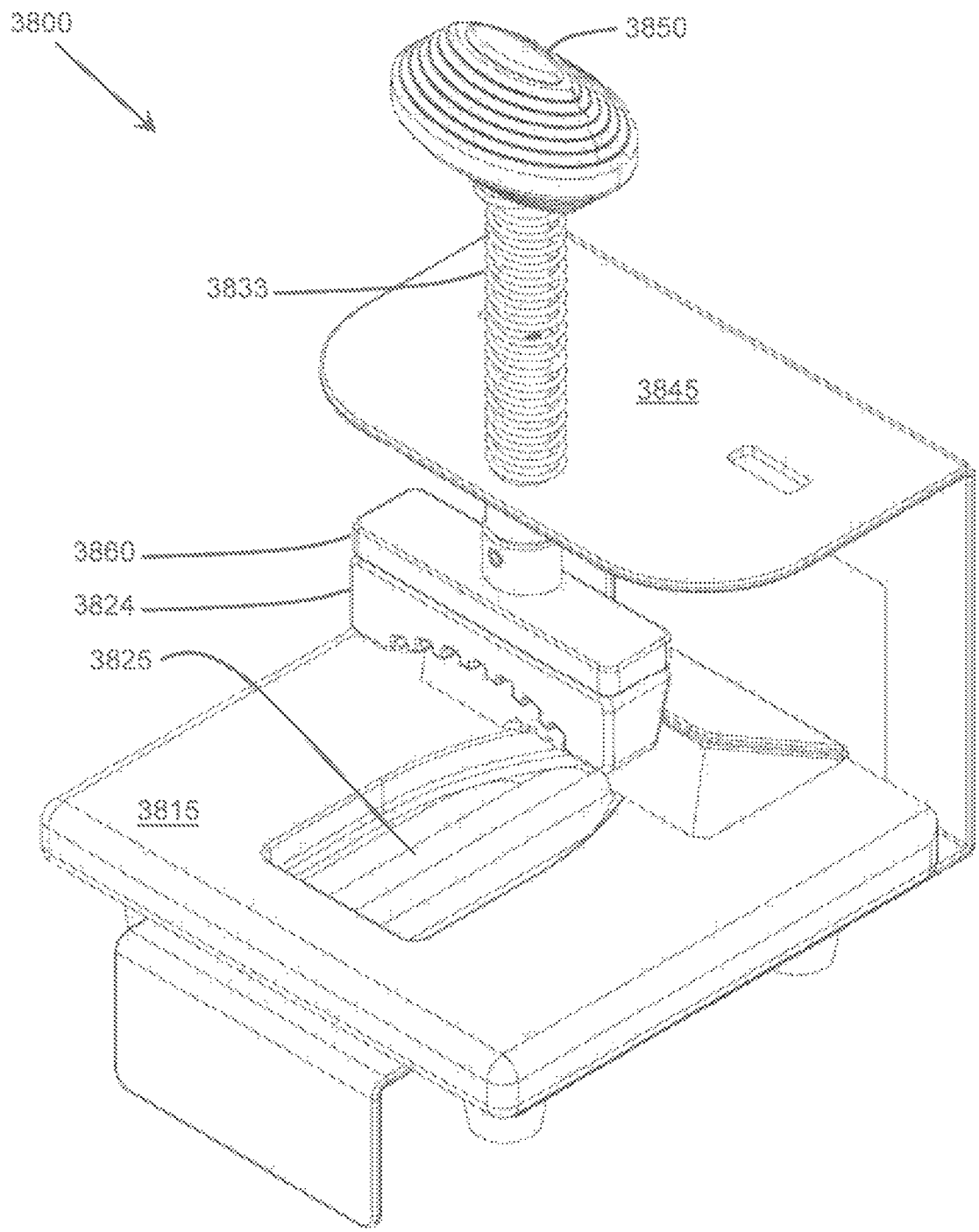
Figure 39:
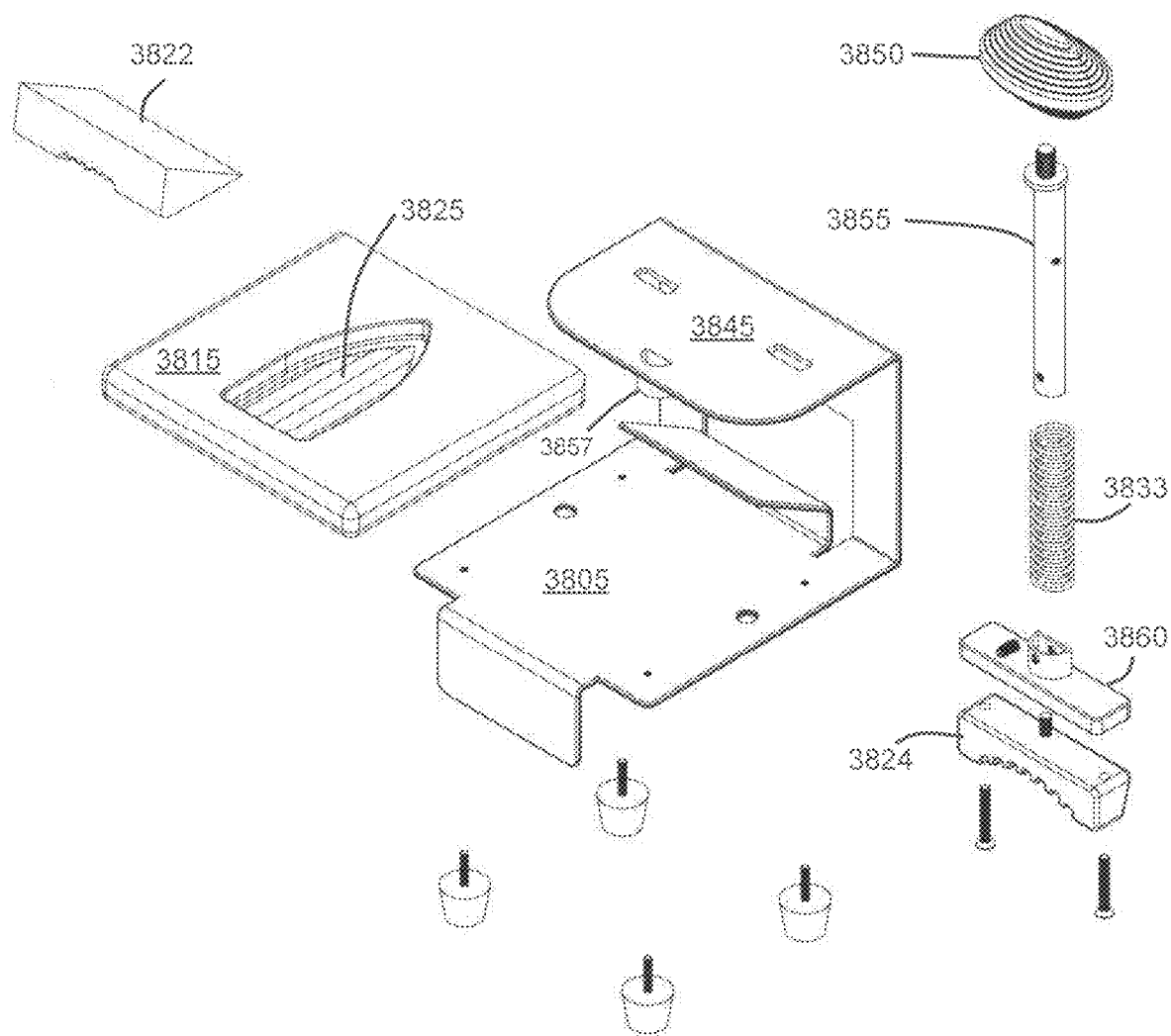

FIG. 38 is a perspective view and FIG. 39 is an exploded view of another exemplary embodiment. This embodiment comprises a frame support (3845) extended from the rear of the frame (3805) near the rear corners of base element (3815). This configuration provides balance and stability characteristics that may be may be preferred for some shucking tasks. In addition, there is room within structure (3845) for storing a shucking tool or the like.

With regard to operability of the Oyster Clamp 3800, a spring is disposed vertically over a hole in the top of the frame structure (3945), and a guide tube (3857) extends downward from the hole. A pushrod (3855) is coupled at its top end to handle (2850), and is inserted through the spring (3833), the hole in structure (3845), and the guide tube (3857), and at its bottom end is tightly coupled to the plate (3860). The oyster clamping element (3924) is coupled to the underside of the plate (3860).

In summary, the various disclosed embodiments can be characterized by features including a hinged version, a rack and pinion version, a plunger version, a tube version, and a sleeve version. The embodiments can also be characterized according to the arrangement of the connections between the lower portion and upper portions of the Oyster Clamp, including connections extending above the center rear of the base element, connections extending from the sides of the base element, and connections extending from behind the base element. There are configurations that can be characterized as comprising one "stem" or two "stems" between the base element and the handles. Finally, versions can be characterized as having heavy duty construction or not, and being narrow or wide, and as having interchangeable floating sleeves or not.

The oyster shucking tool can take on a variety of shapes and sizes, such as a knife or other sharp implement. In embodiments, the tool may have a powered aspect to enhance its ability to easily open a bivalve secured in the oyster clamp. Powered embodiments may include any appropriate type of power source, including battery, power mains, and the like. In embodiments, such a power tool can apply a torque to a blade-like element to turn that element to open the bivalve. The applied torque may be controllable to maintain either a predetermined default rotational speed, or a speed selected by the user. In some embodiments, a portable drill may be used with a variety of sizes of oyster opening tools appropriate for opening different bivalve sizes and shapes.

Figure 40:
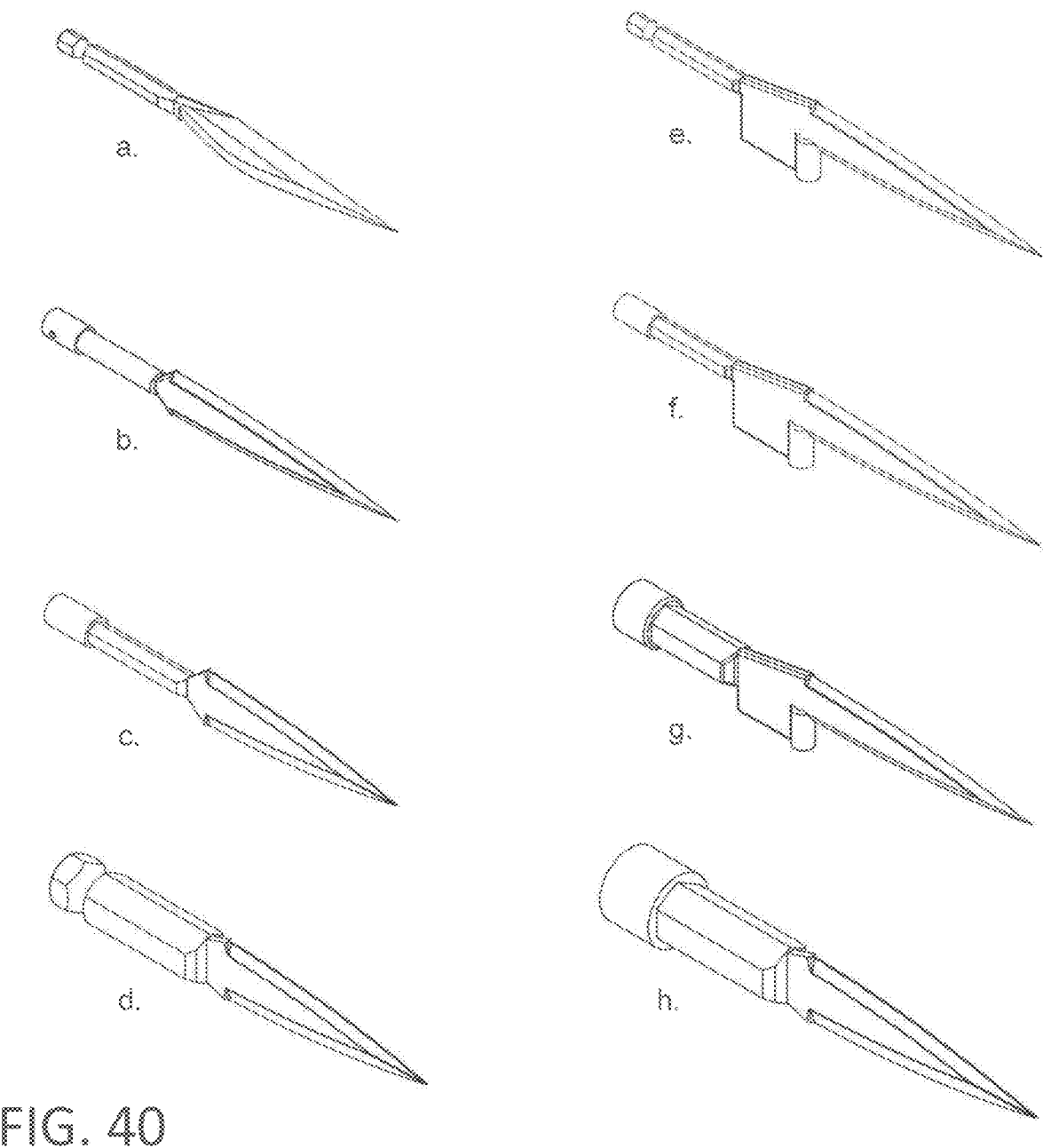
FIG. 40 shows perspective views of a plurality of illustrative embodiments of oyster opening blades configured as drill bit replacements for power drills.
Figure 41:
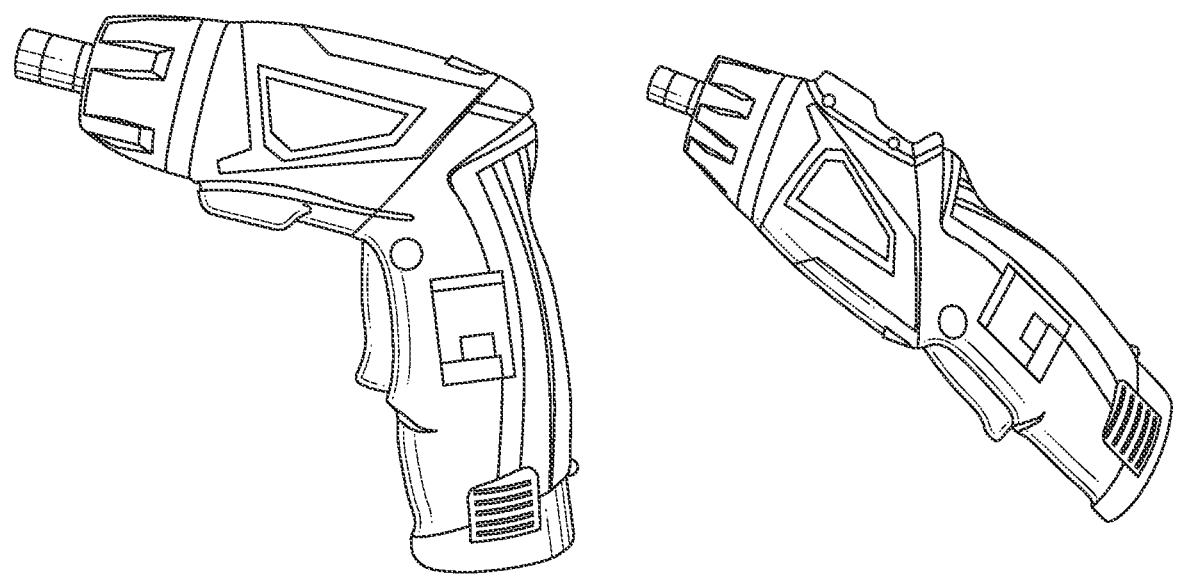
FIG. 41 shows side perspective views of two illustrative power drill embodiments suitable for use with one or more of the oyster opening blades shown in FIG. 40.
Figure 42A:
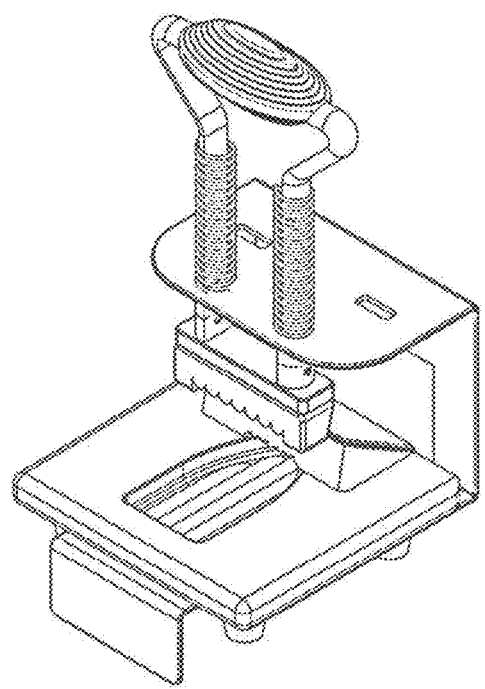
FIGS. 42A, 43A, 44A, 45A, 46A, 47A, 48A, 49A, 50A, 51A, 52A, 53A, 54A, 55A, 56A, 57A, 58A, 59A, 60A, 61A, 62A, 63A, 64A, 65A, and 66A are perspective views of exemplary oyster clamp embodiments that comprise the same or similar components contained in the embodiments illustrated in FIGS. 1-39, but in various different arrangements.
Figure 42B:
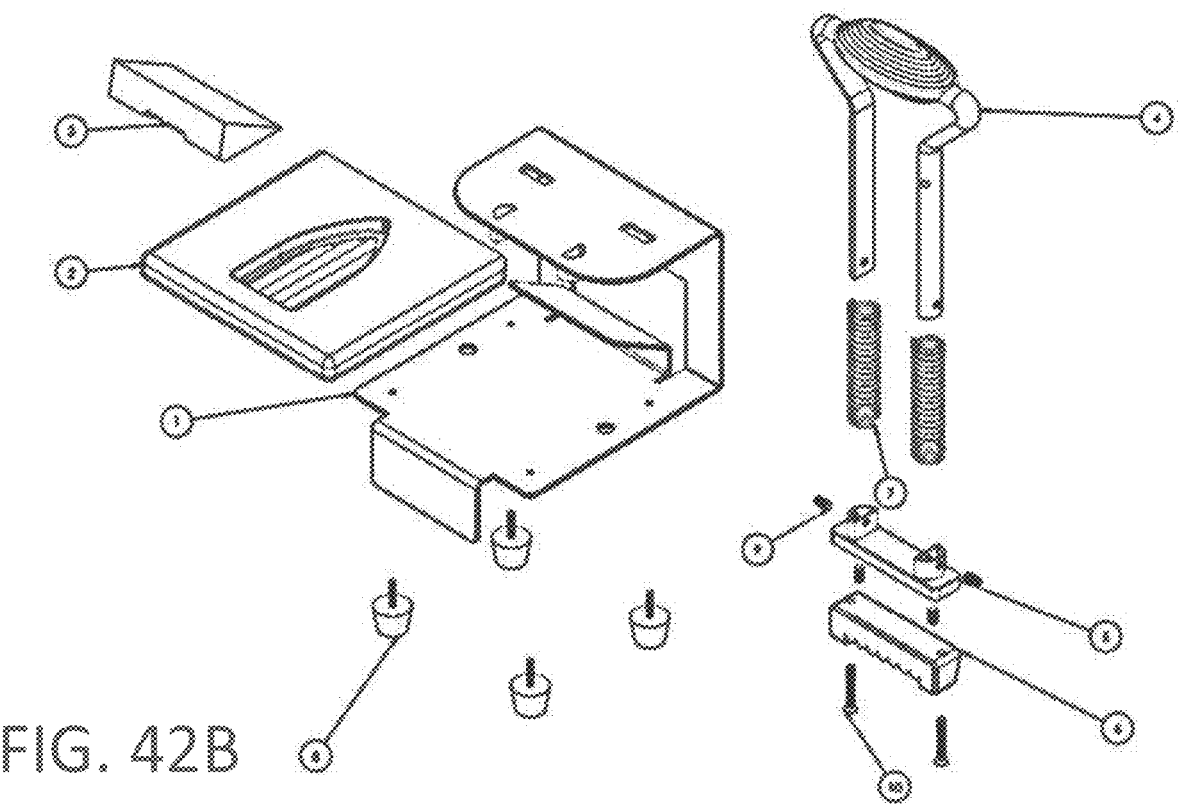
FIGS. 42B, 43B, 44B, 45B, 46B, 47B, 48B, 49B, 50B, 51B, 52B, 53B, 54B, 55B, 56B, 57B, 58B, 59B, 60B, 61B, 62B, 63B, 64B, 65B, and 66B are exploded perspective views of the oyster clamps shown in FIGS. 42A, 43A, 44A, 45A, 46A, 47A, 48A, 49A, 50A, 51A, 52A, 53A, 54A, 55A, 56A, 57A, 58A, 59A, 60A, 61A, 62A, 63A, 64A, 65A, and 66A, respectively.
Figure 43A:
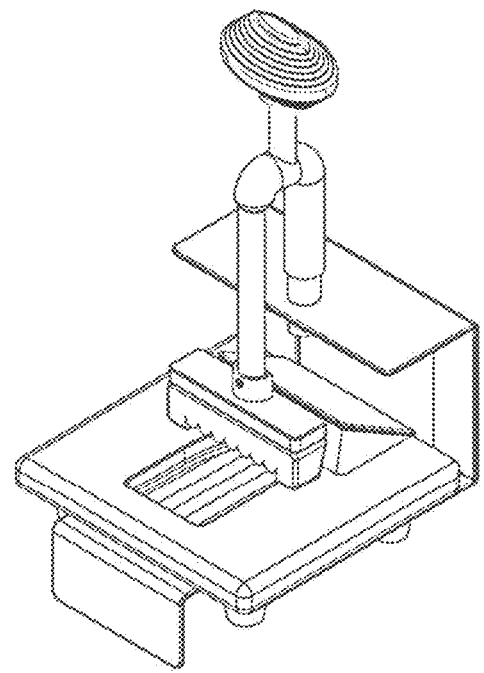
Figure 43B:
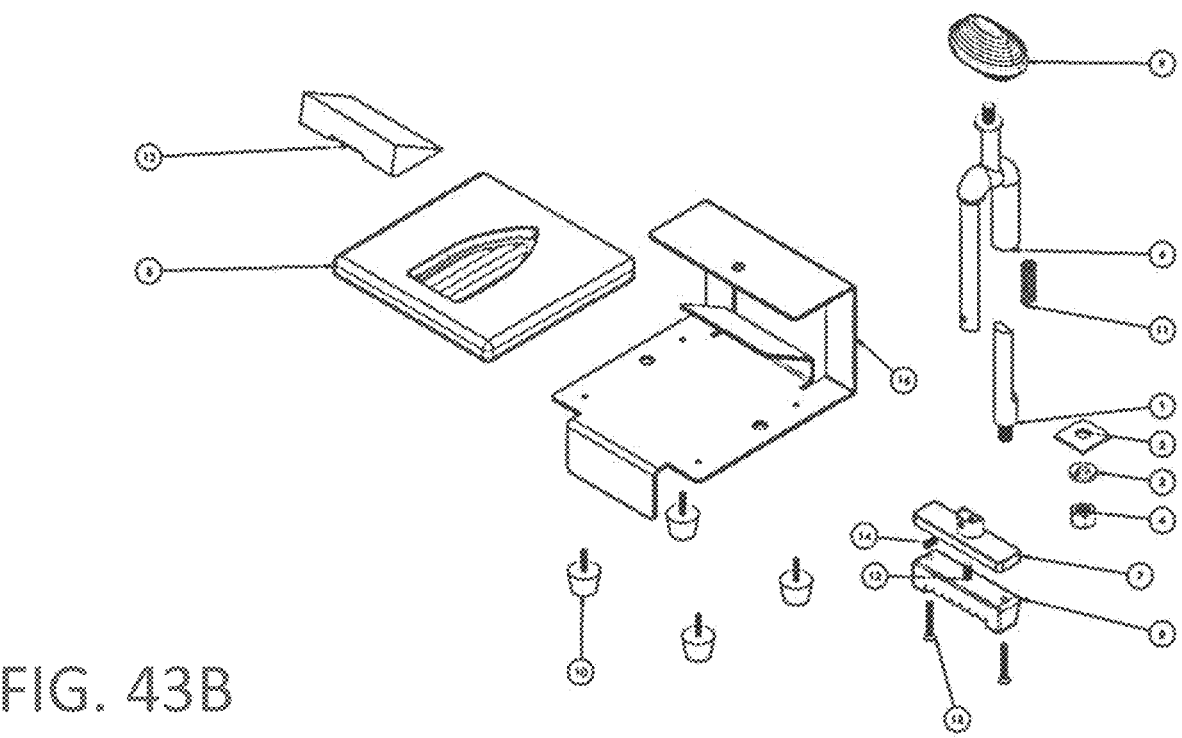
Figure 44A:
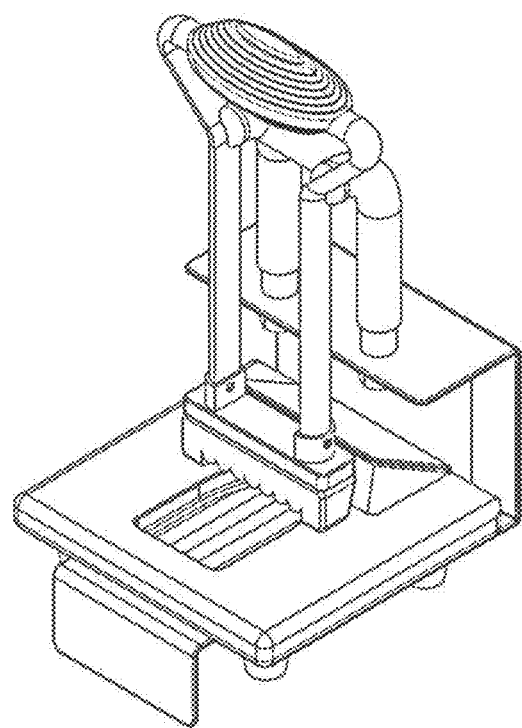
Figure 44B:
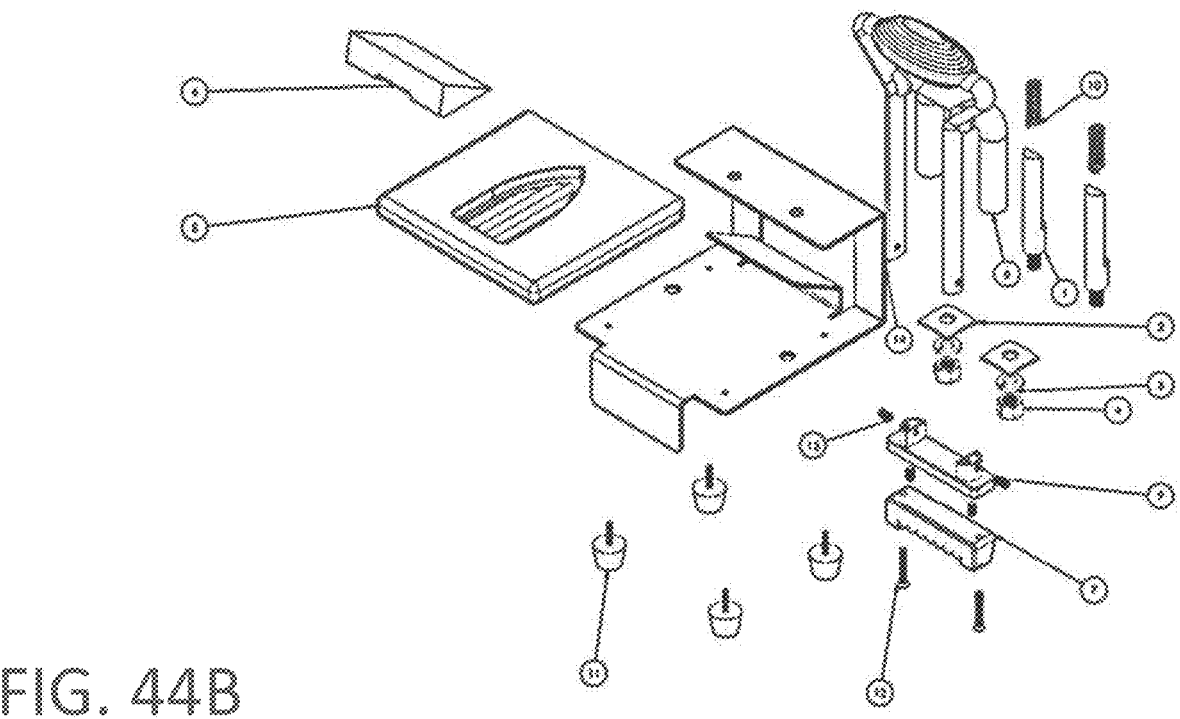
Figure 45A:
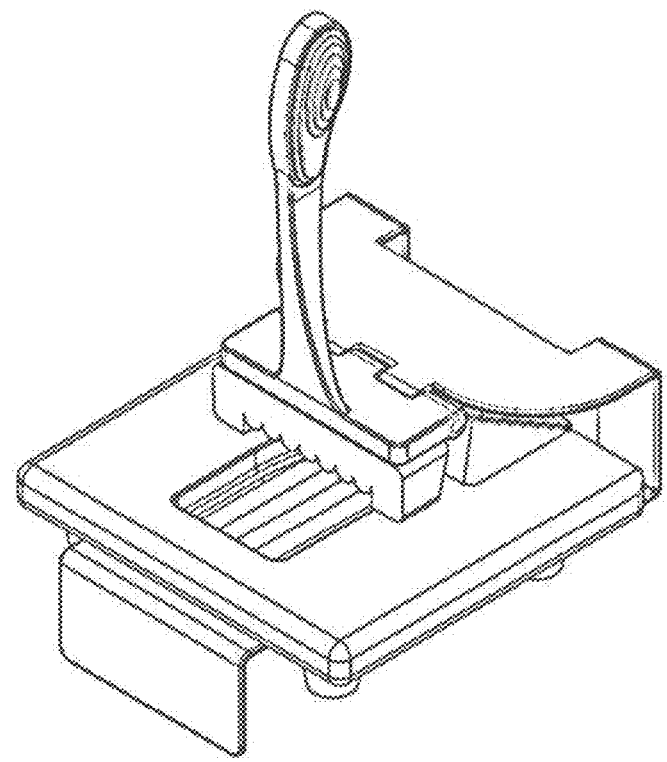
Figure 45B:
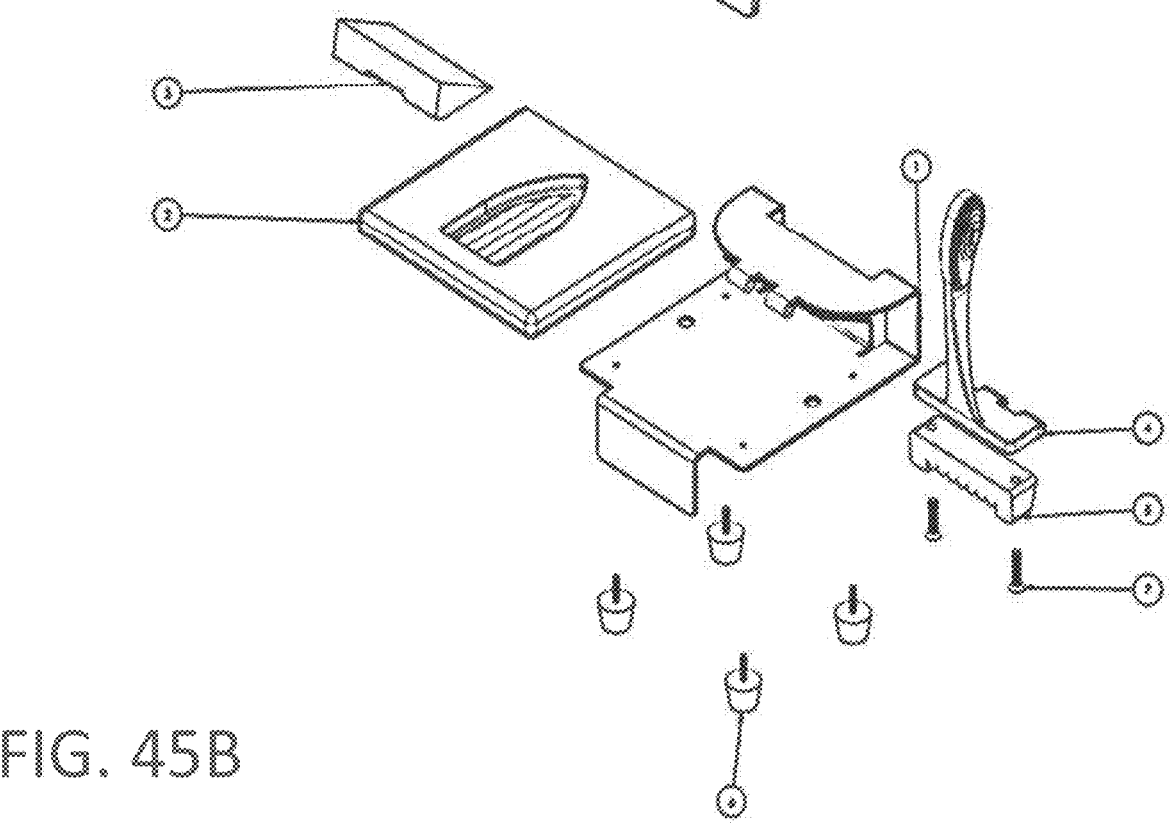
Figure 46A:
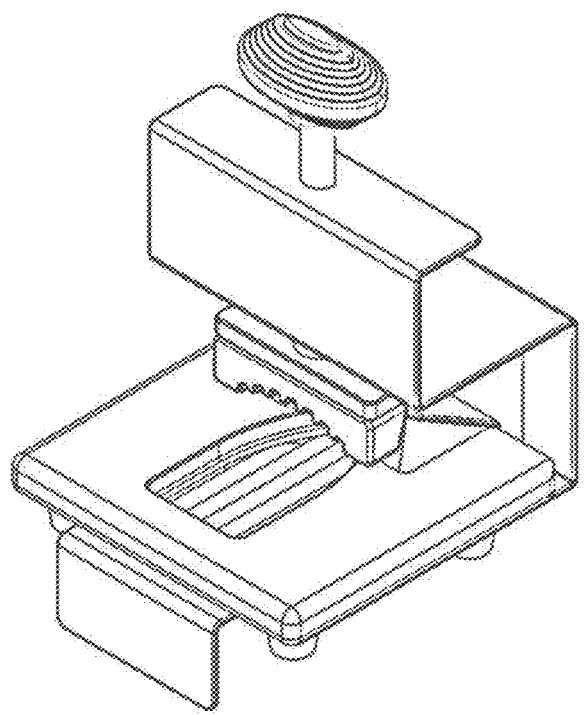
Figure 46B:
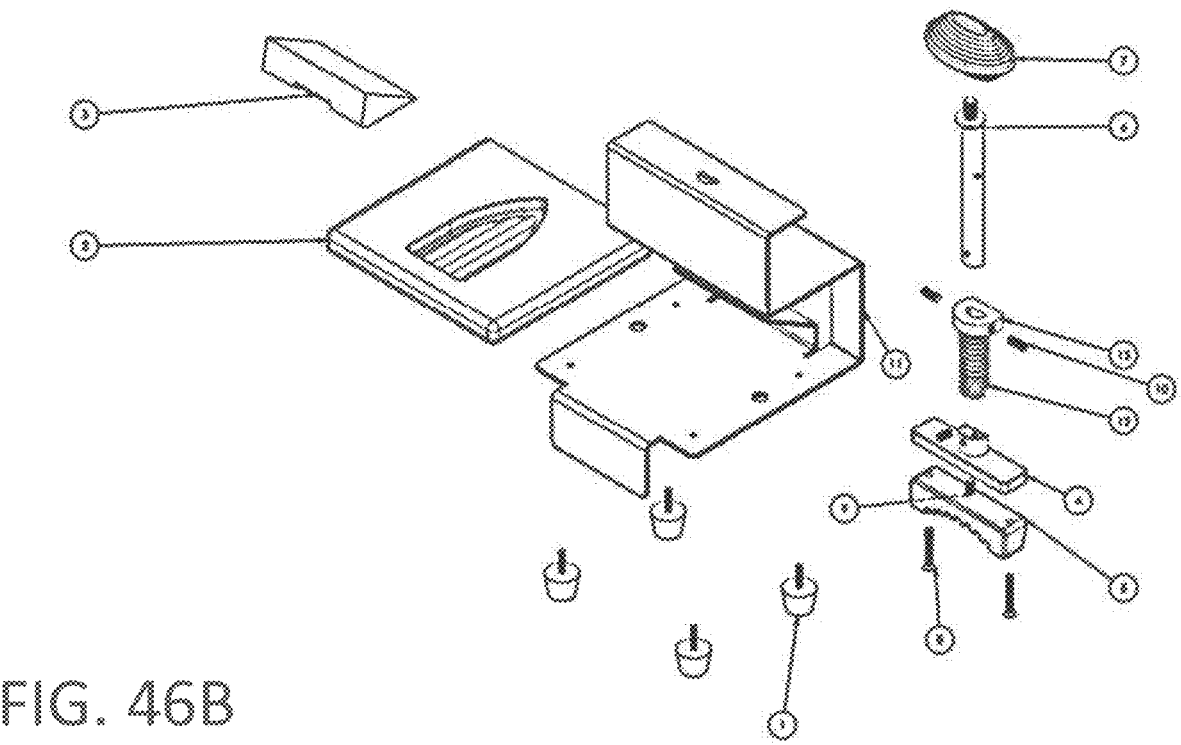
Figure 47A:
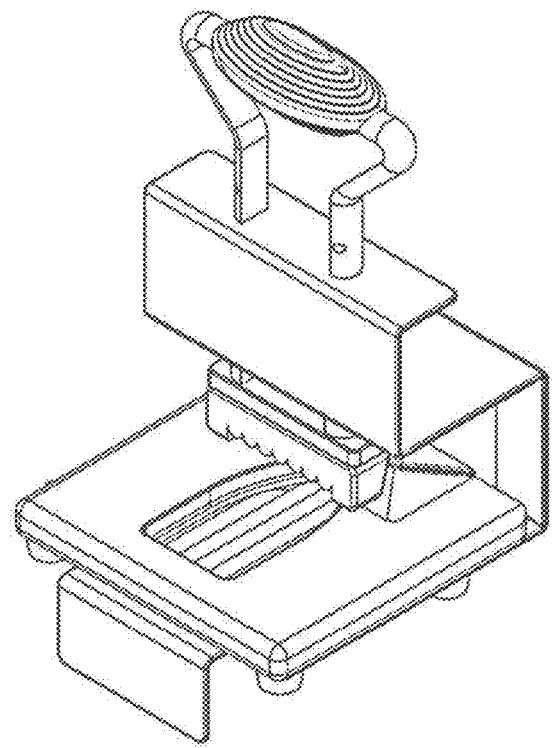
Figure 47B:
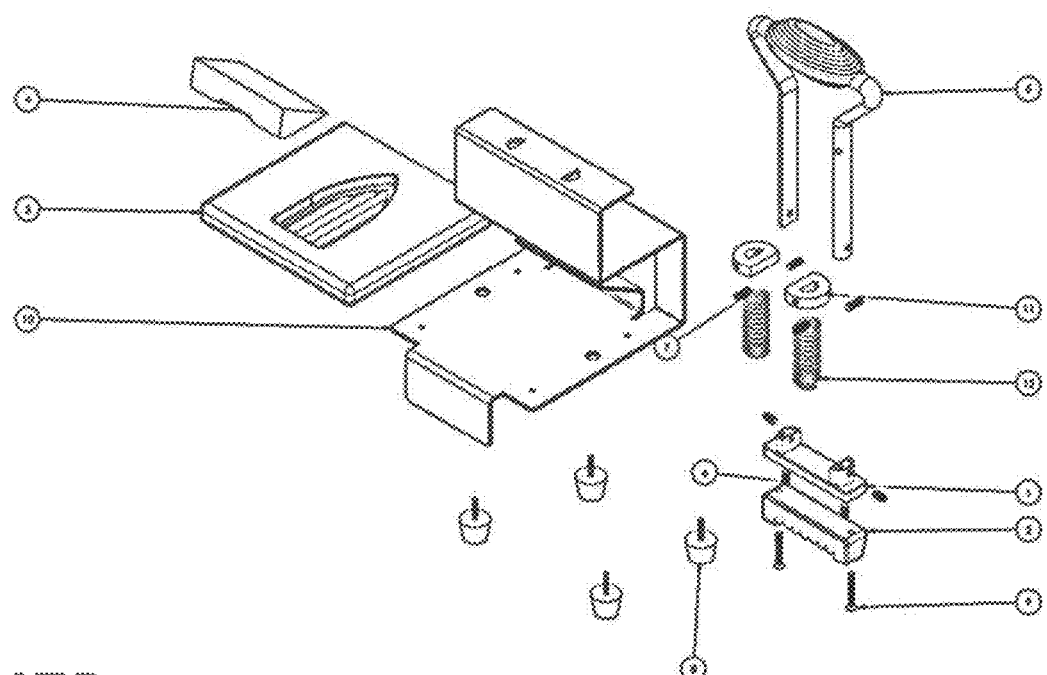
Figure 48A:
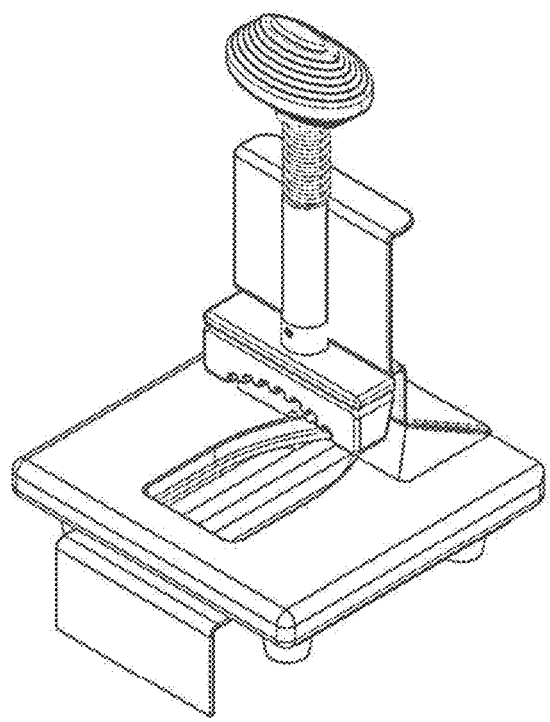
Figure 48B:
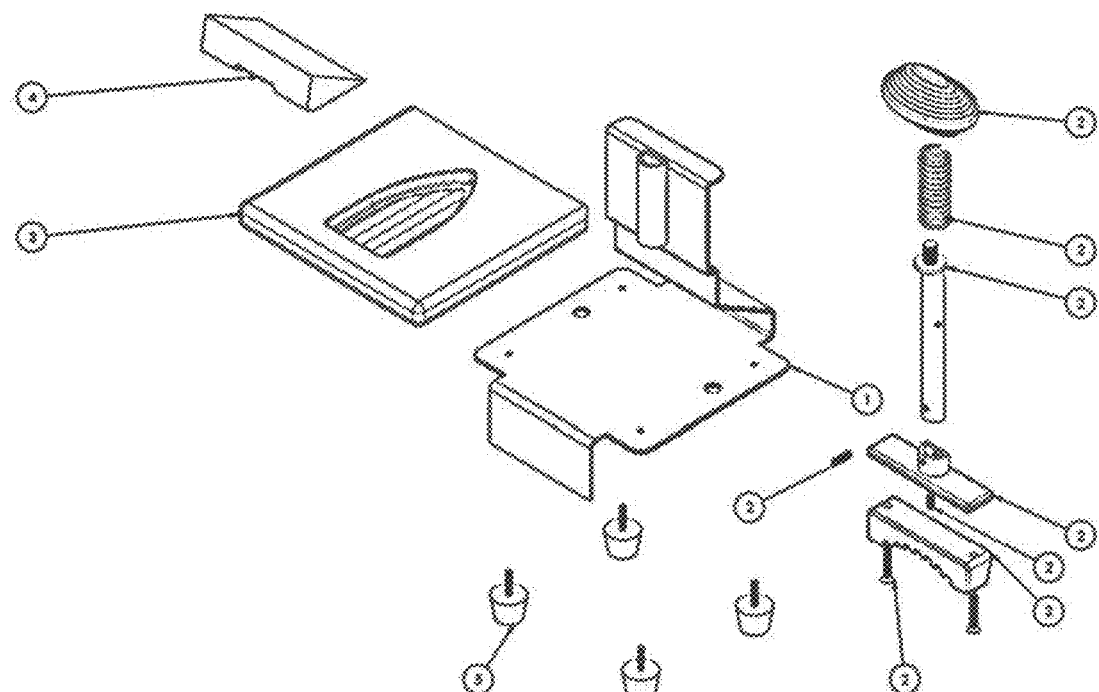
Figure 49A:
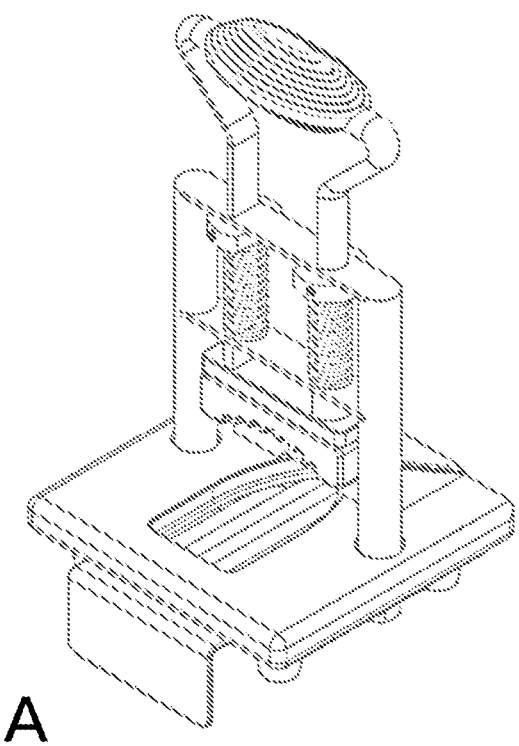
Figure 49B:
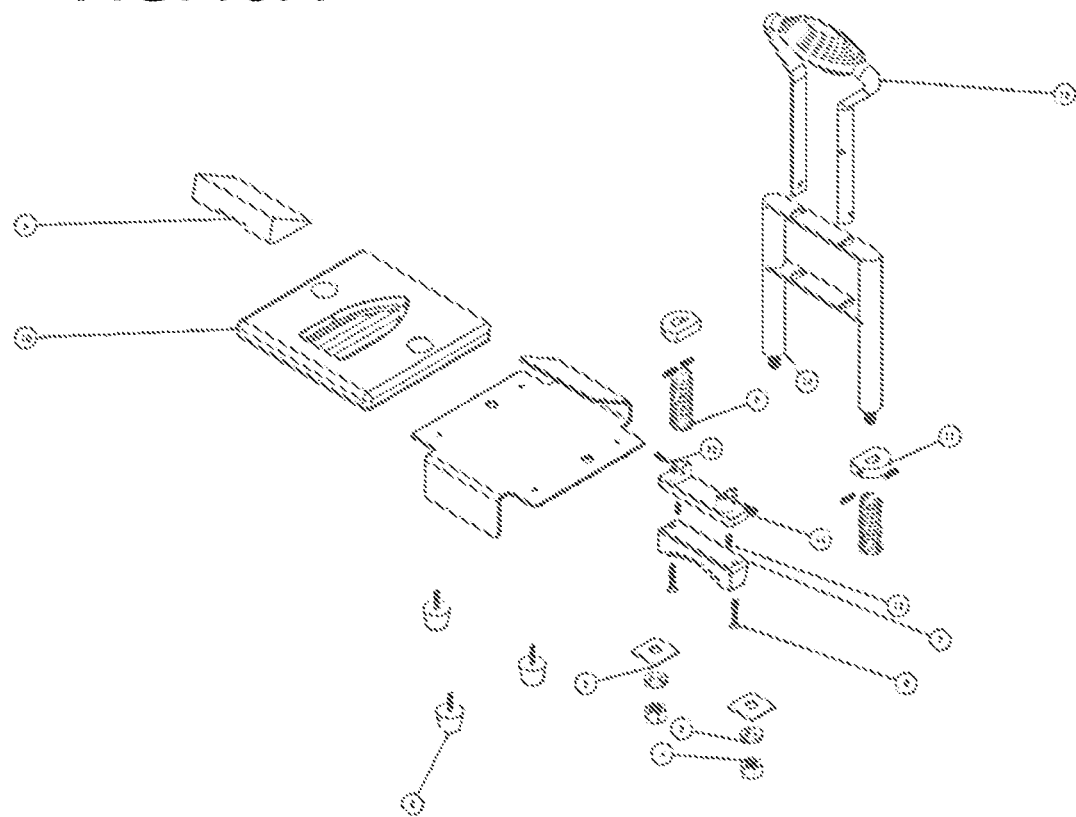
Figure 50A:
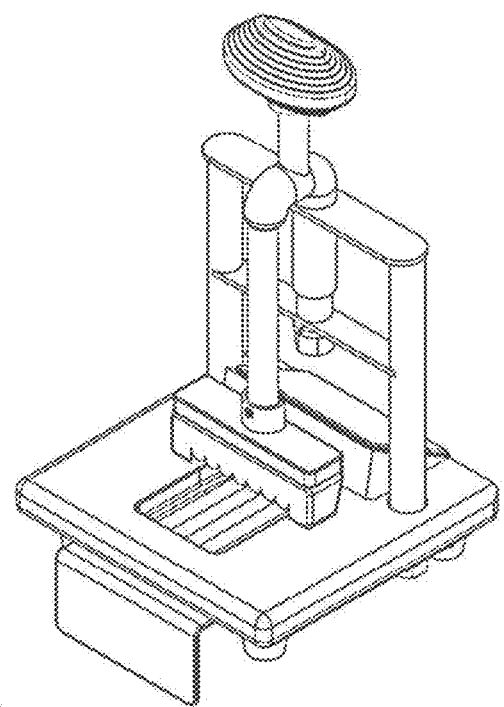
Figure 50B:
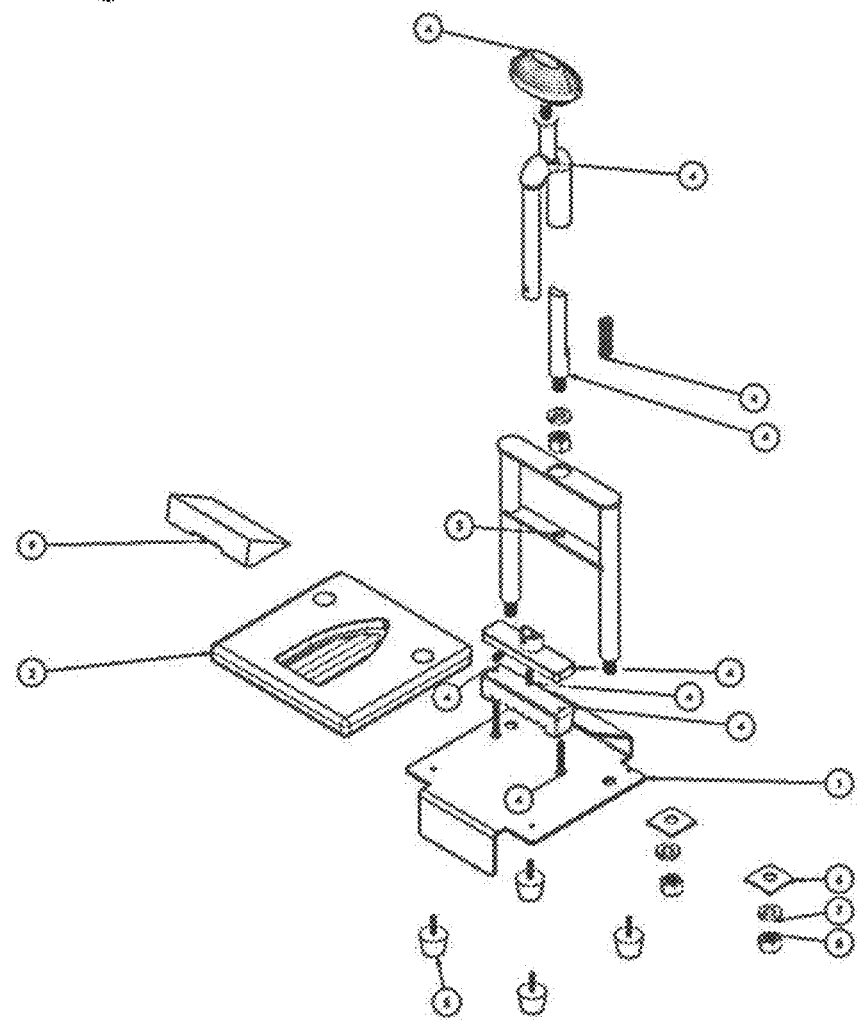
Figure 51A:
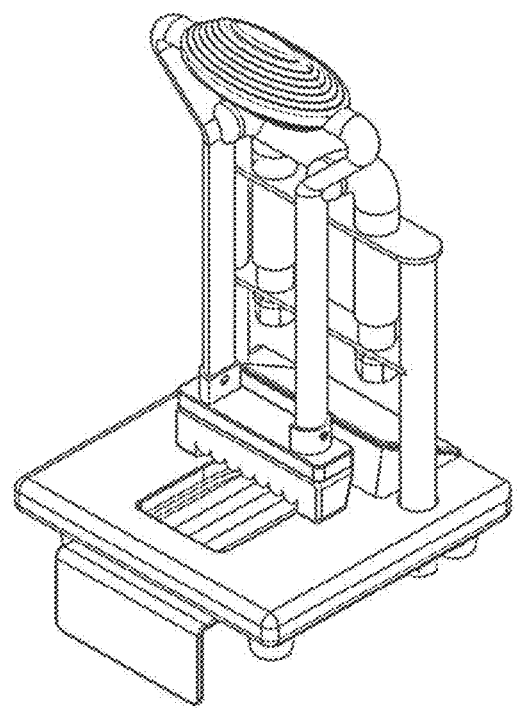
Figure 51B:
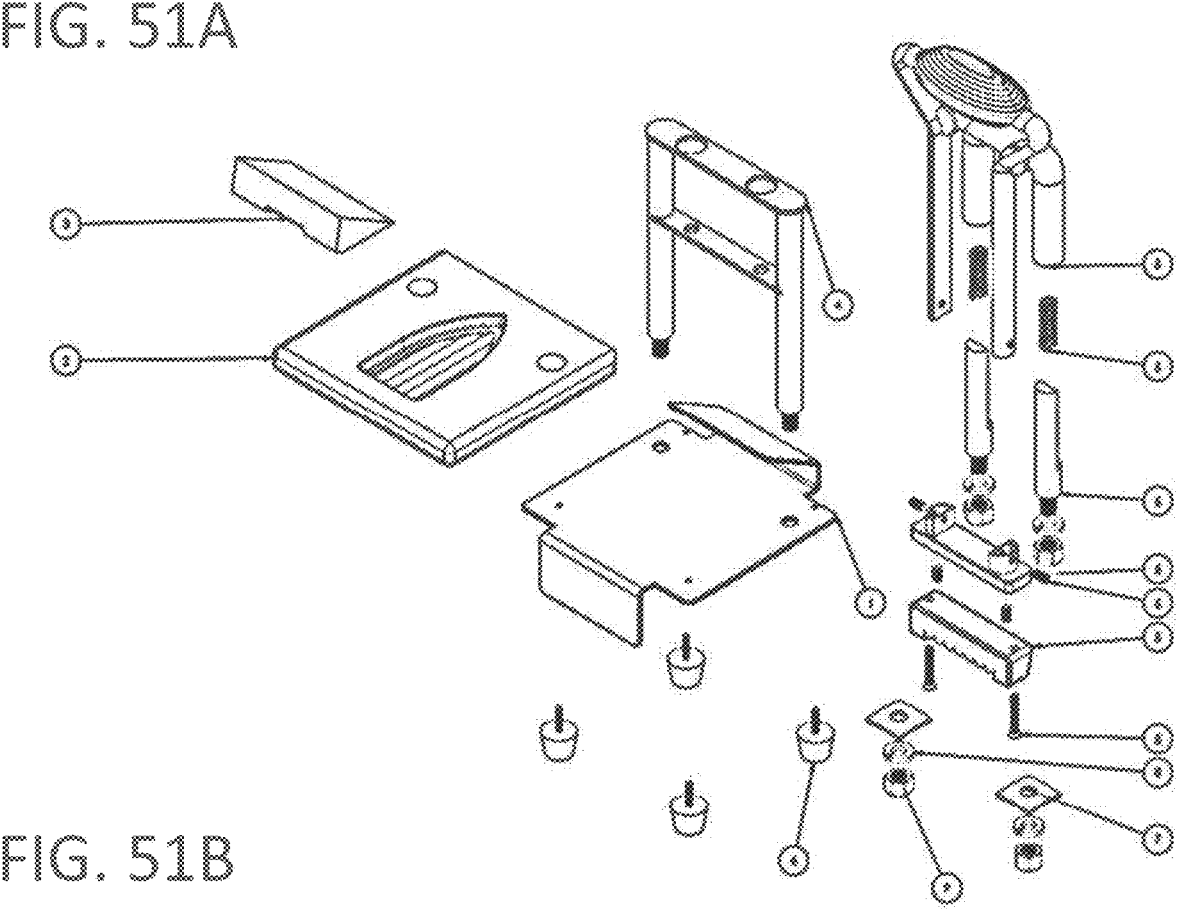
Figure 52A:
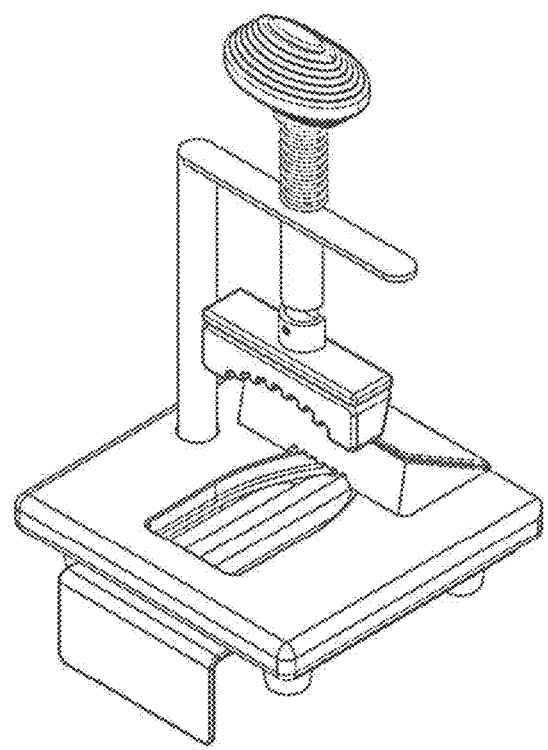
Figure 52B:
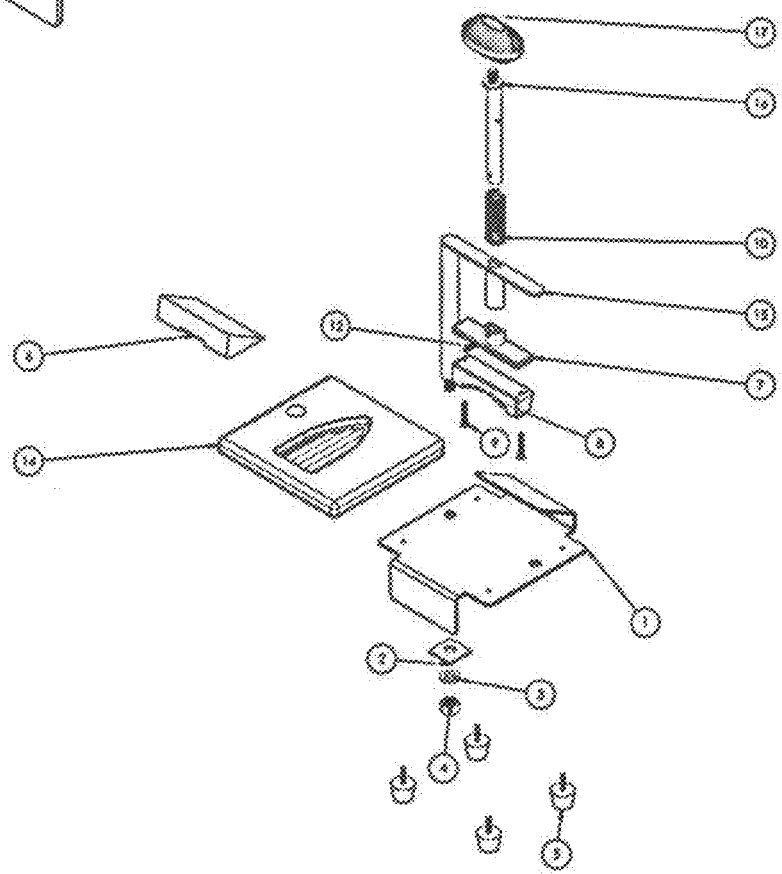
Figure 53A:
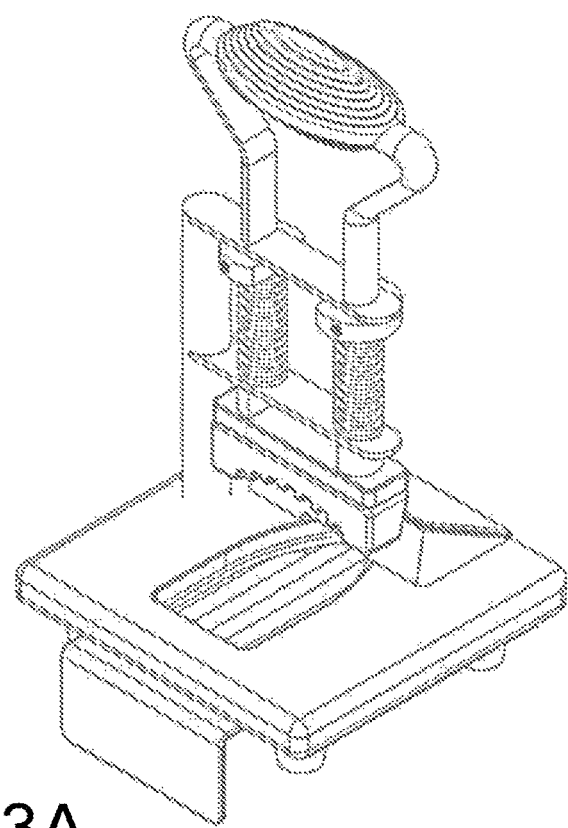
Figure 53B:
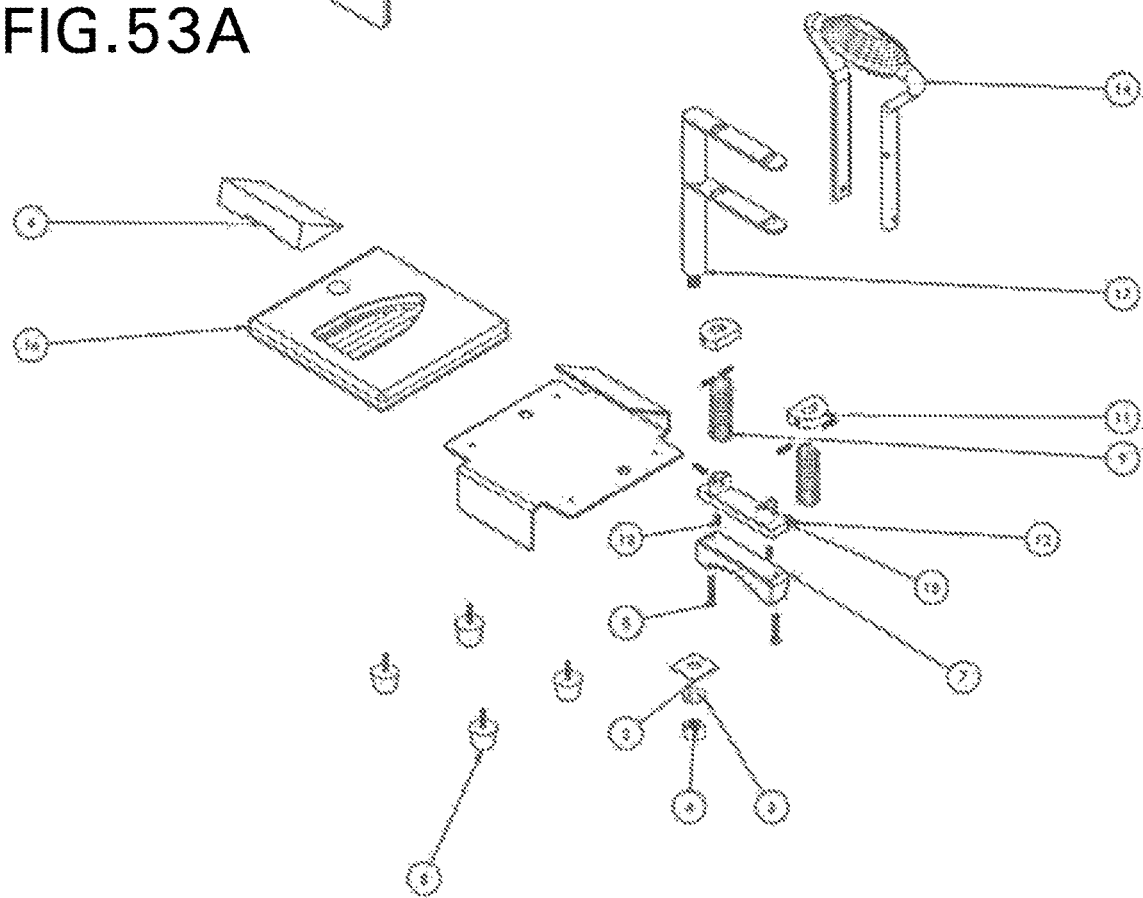
Figure 54A:
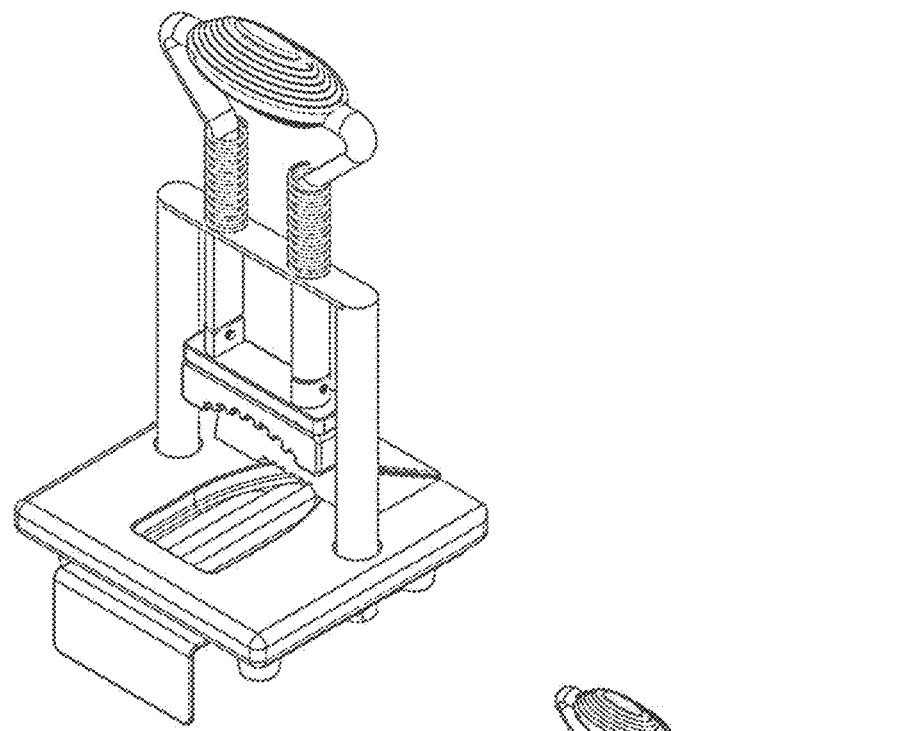
Figure 54B:
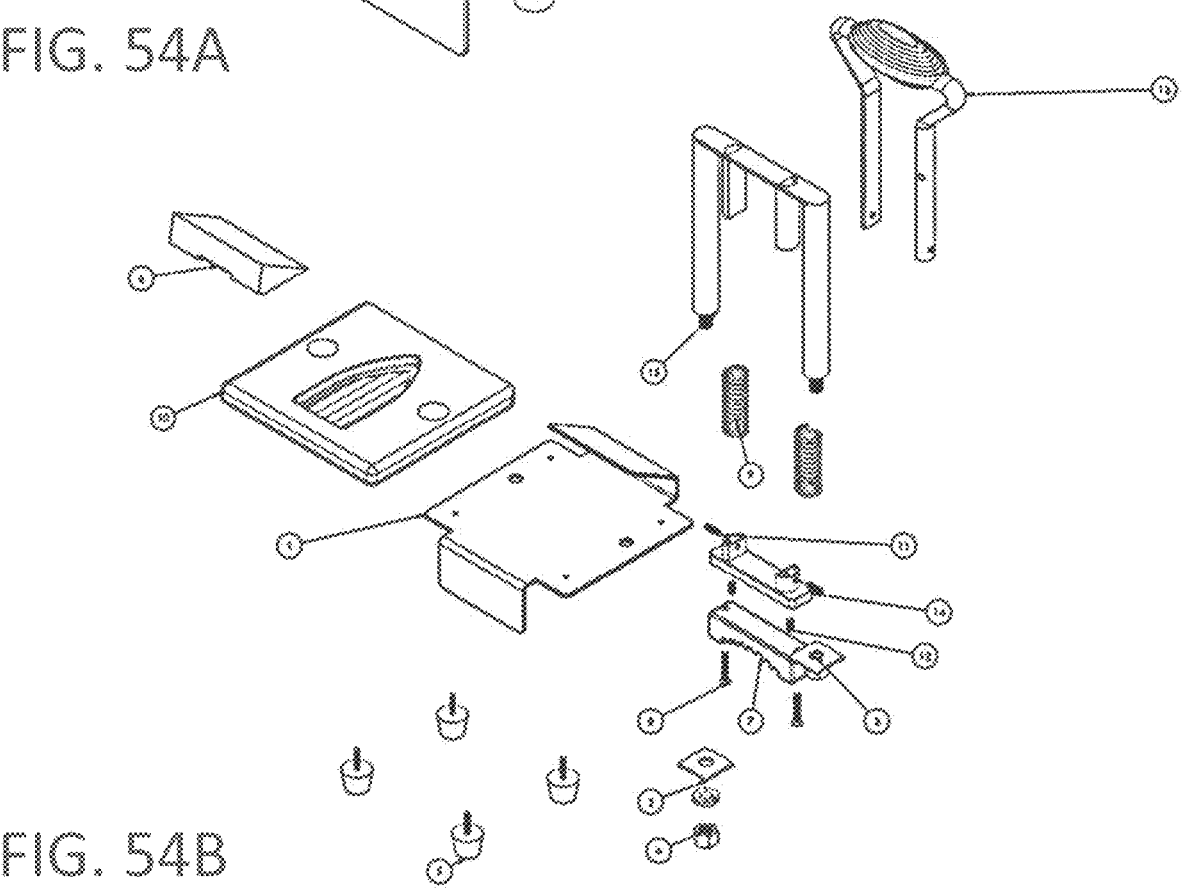
Figure 55A:
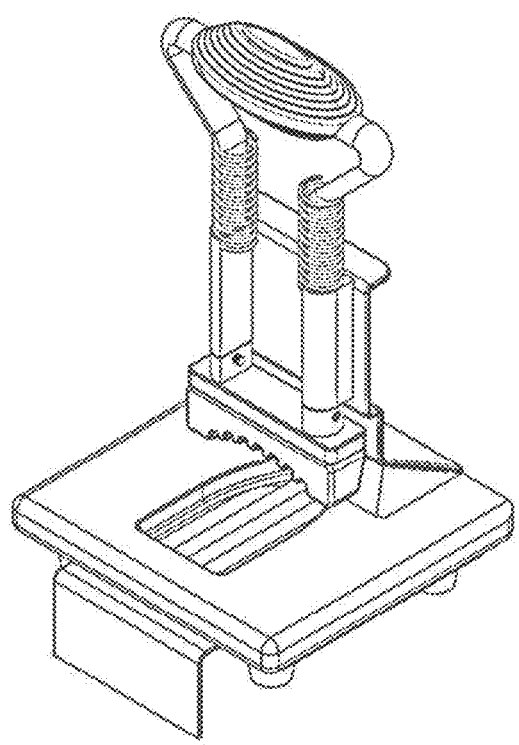
Figure 55B:
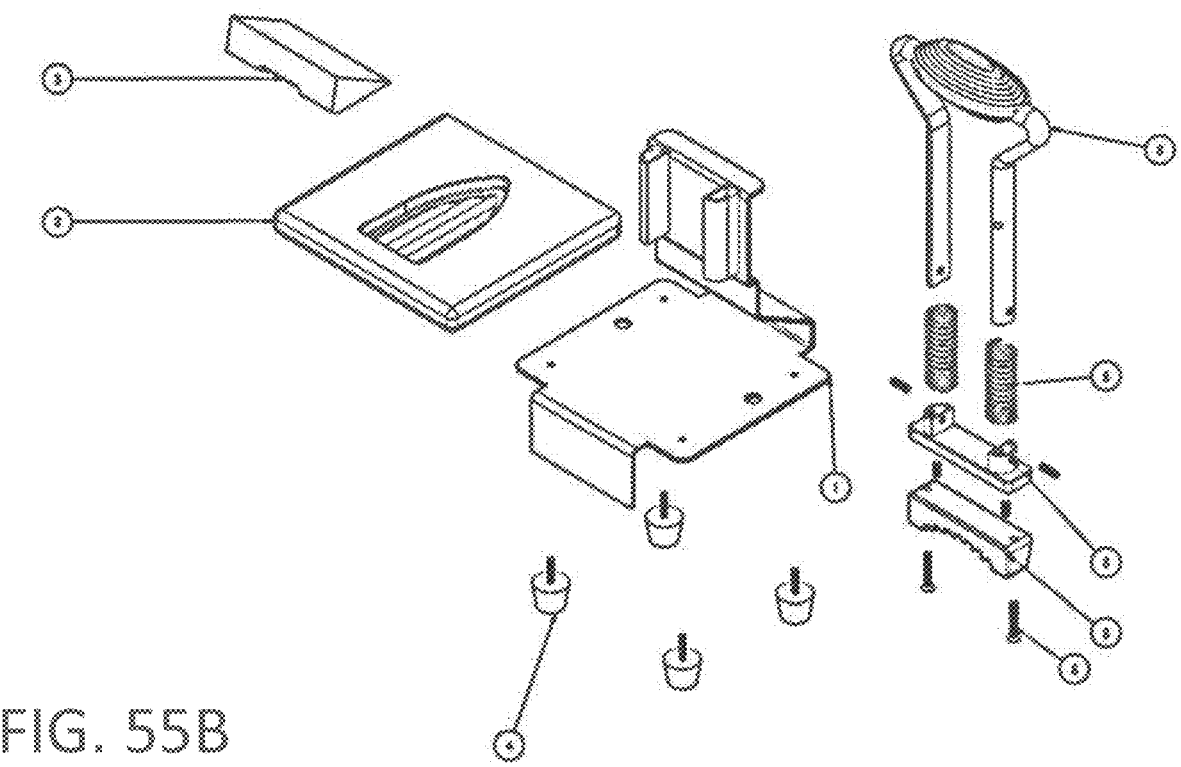
Figure 56A:
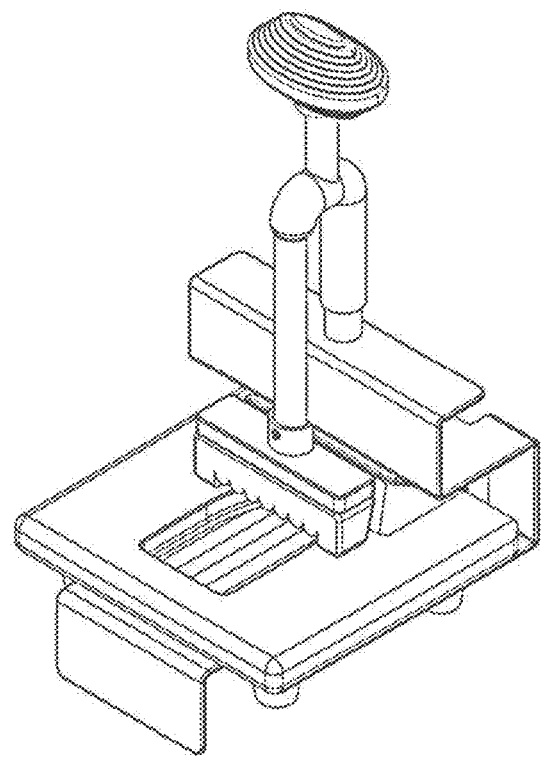
Figure 56B:
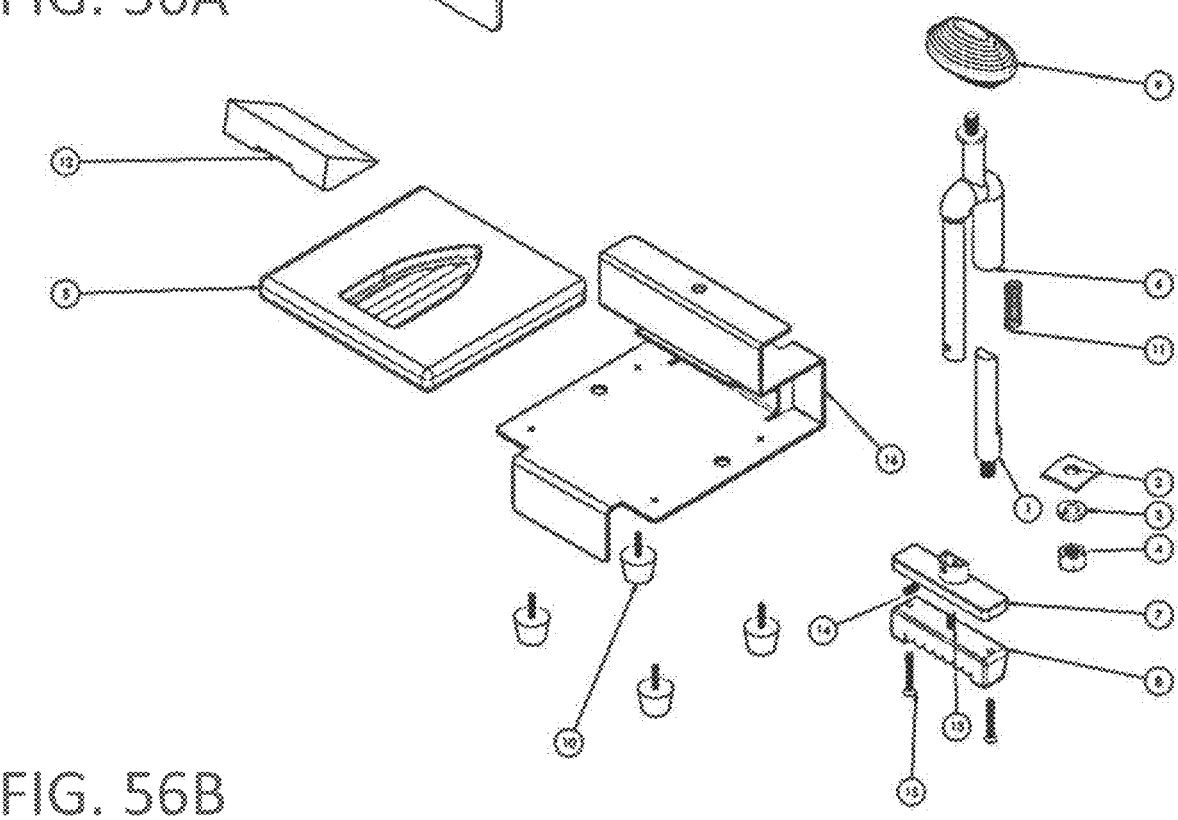
Figure 57A:
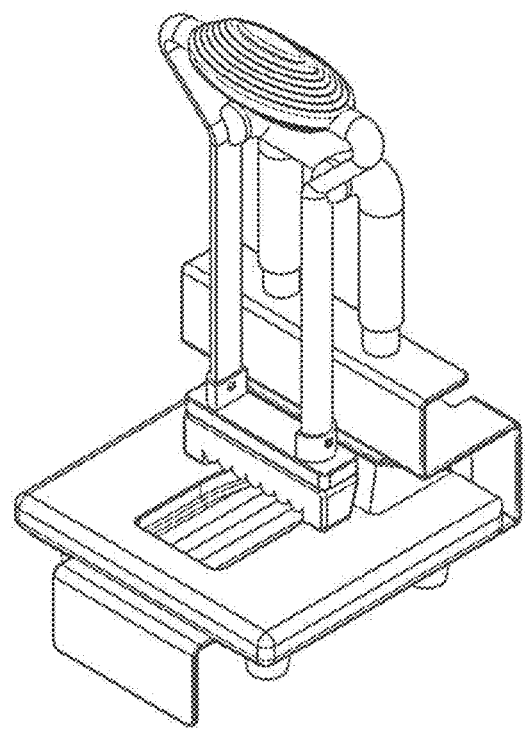
Figure 57B:
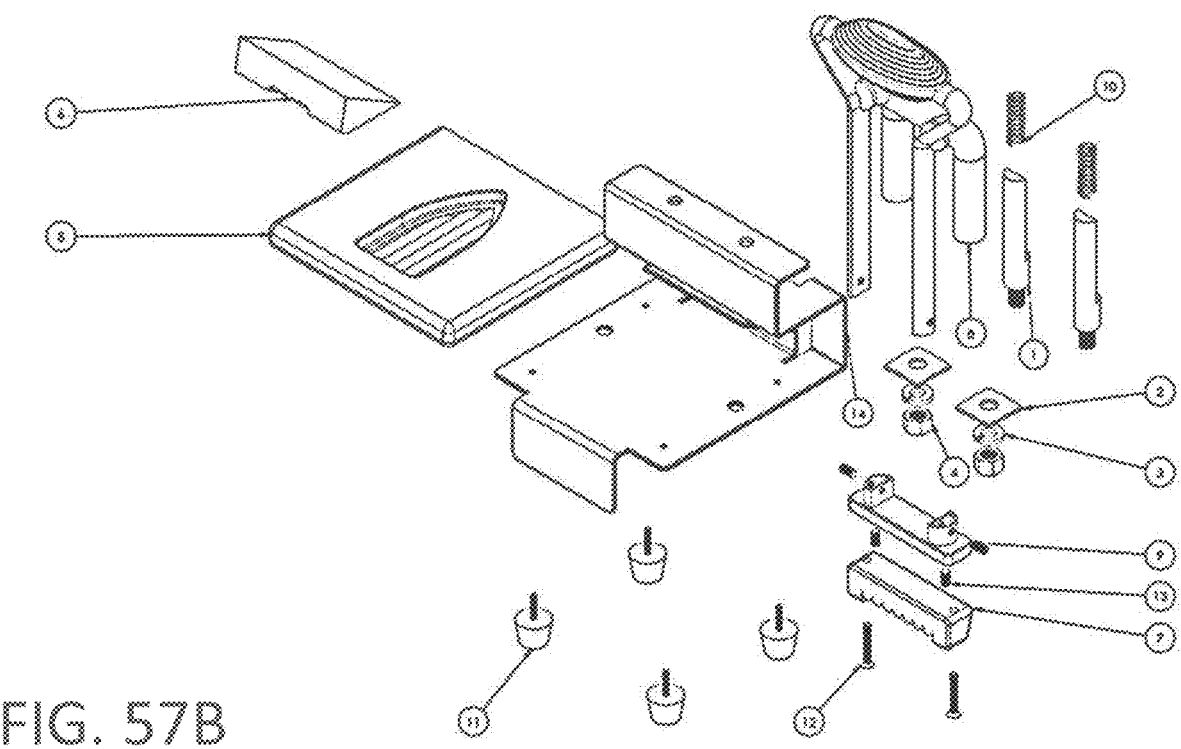
Figure 58A:
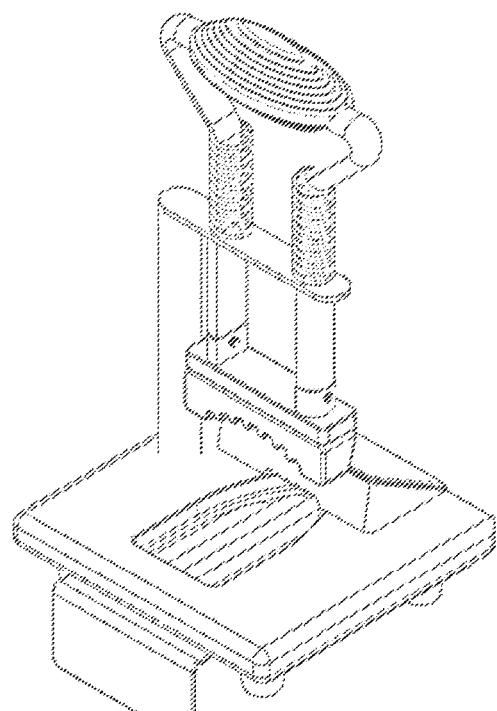
Figure 58B:
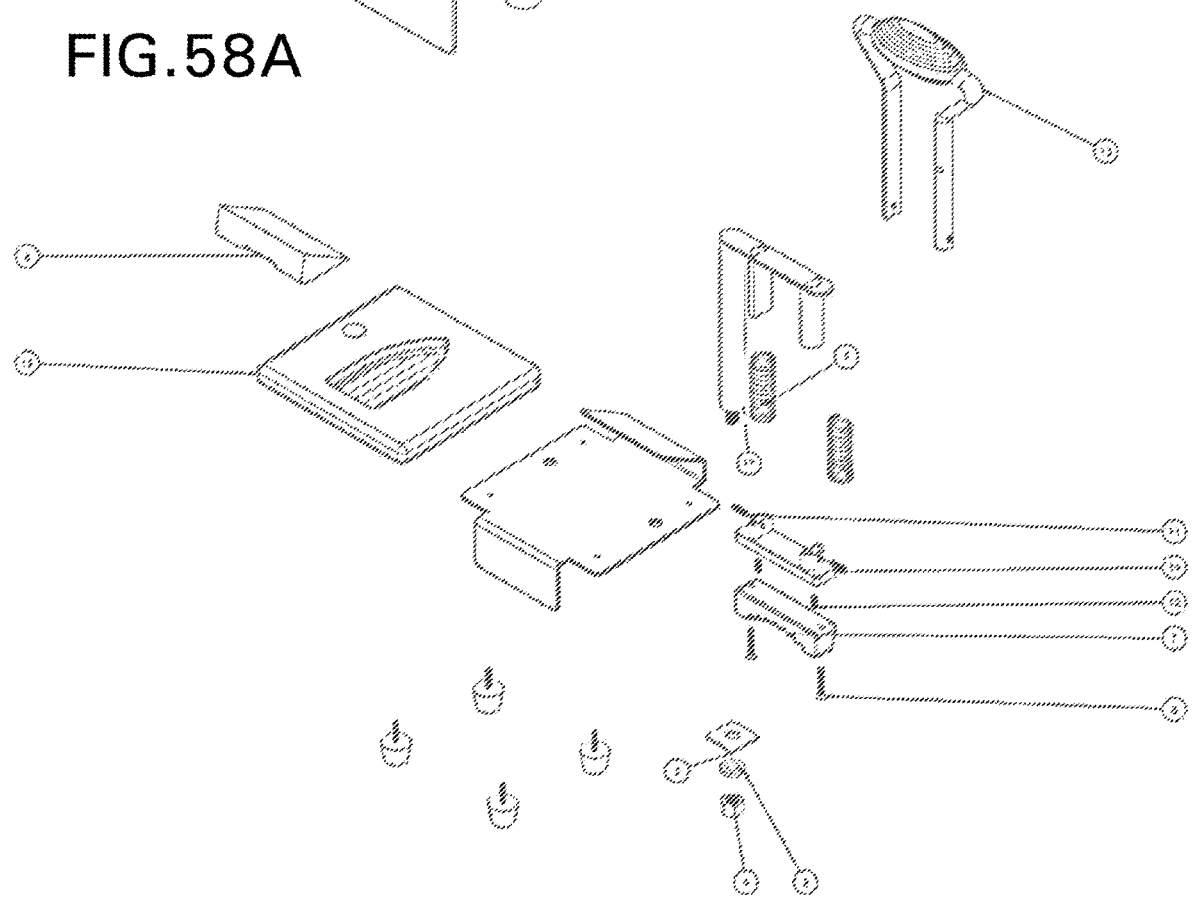
Figure 59A:
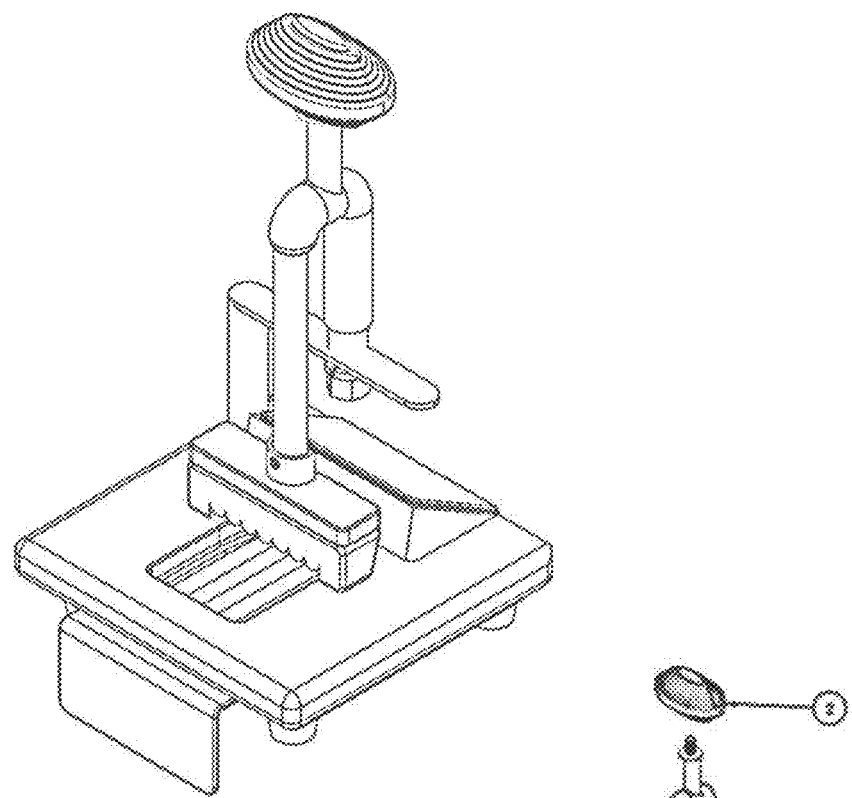
Figure 59B:
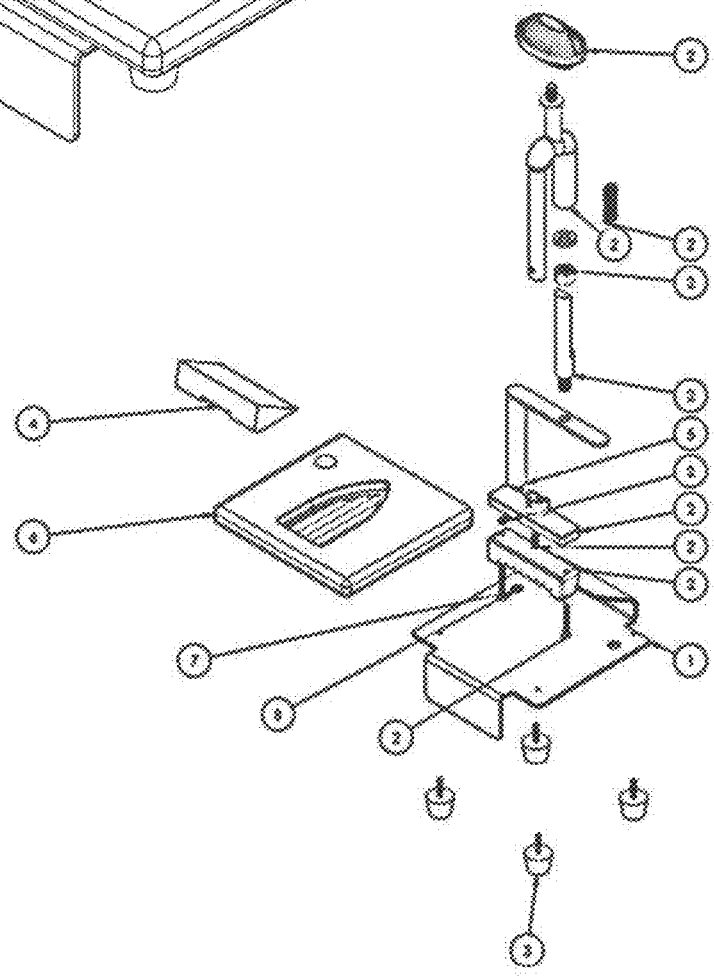
Figure 60A:
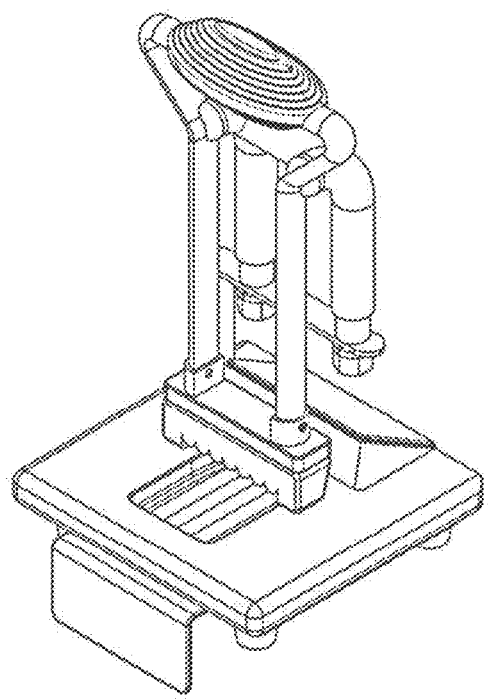
Figure 60B:
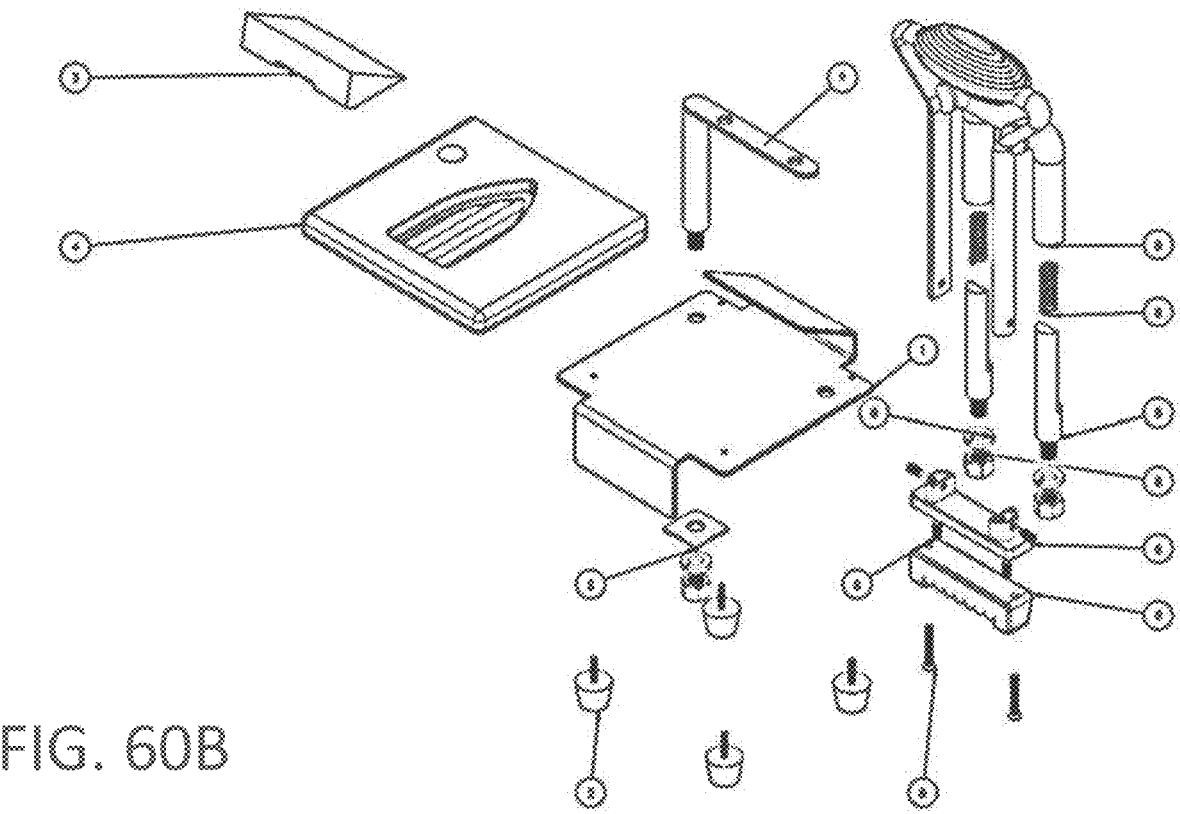
Figure 61A:
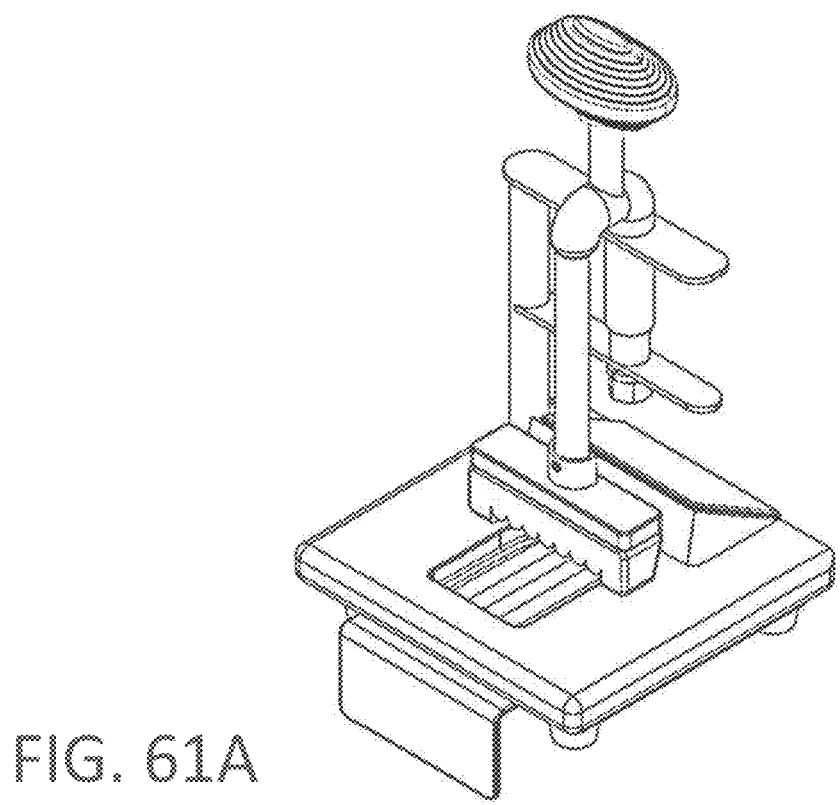
Figure 61B:
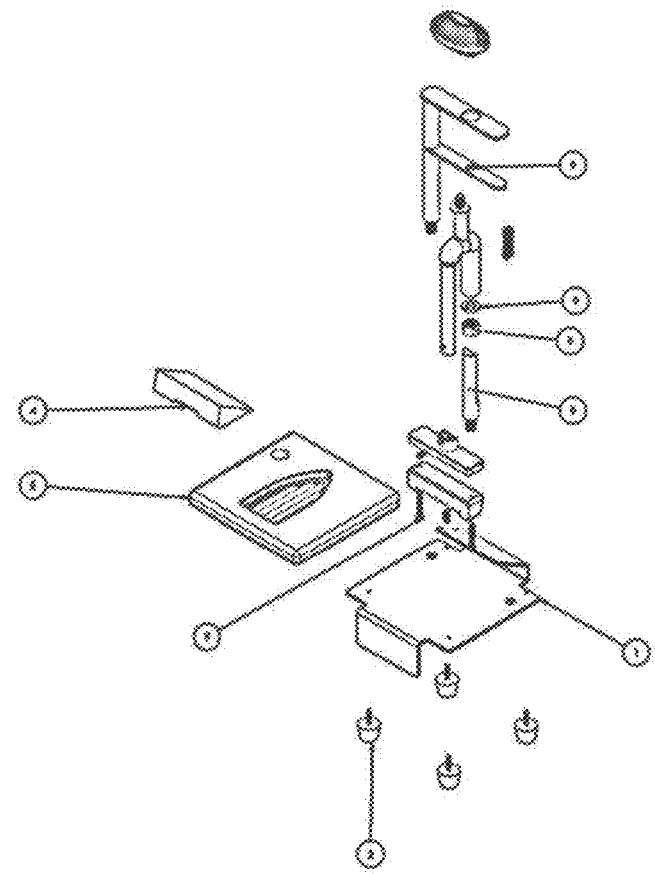
Figure 62A:
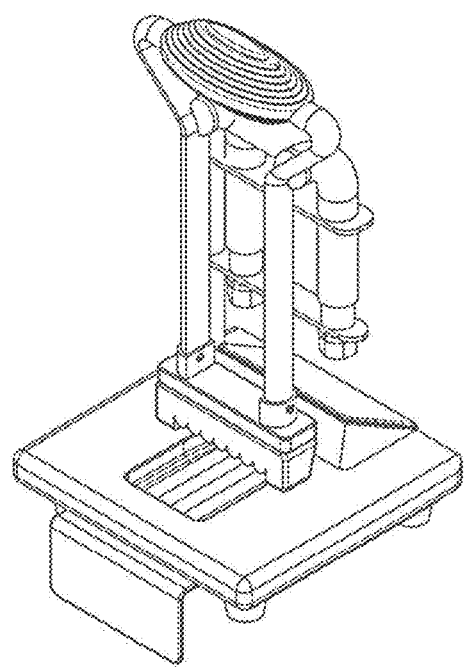
Figure 62B:
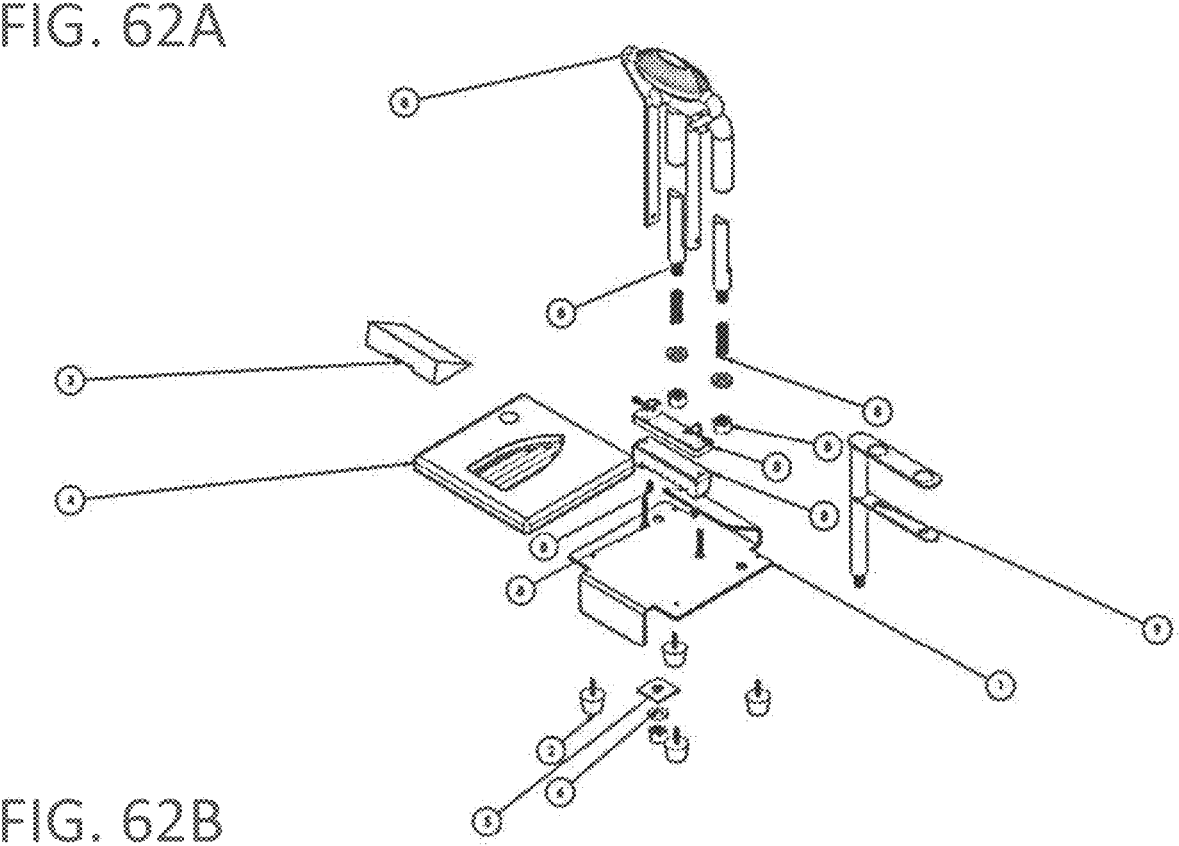
Figure 63A:
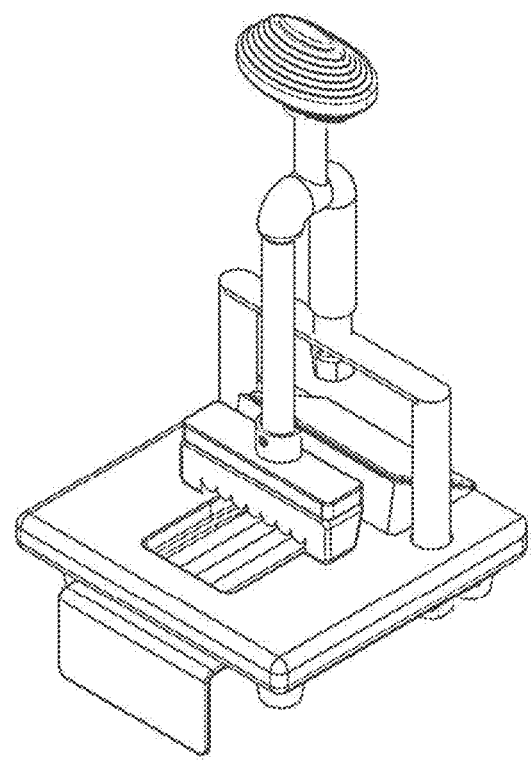
Figure 63B:
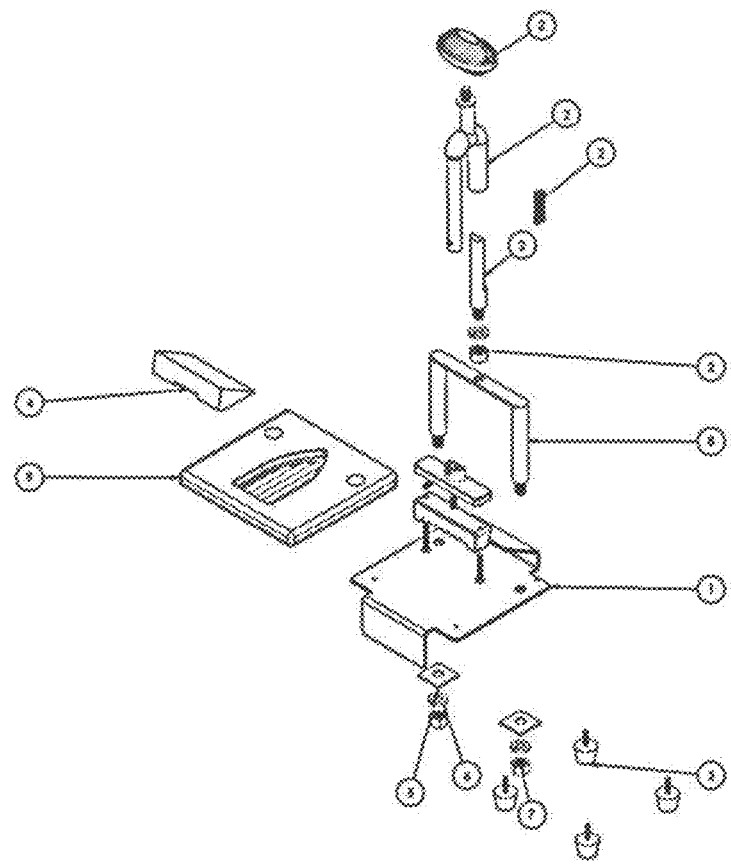
Figure 64A:
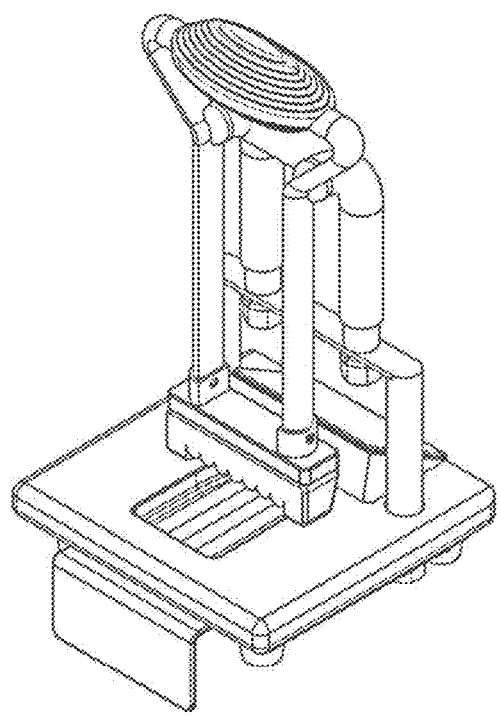
Figure 64B:
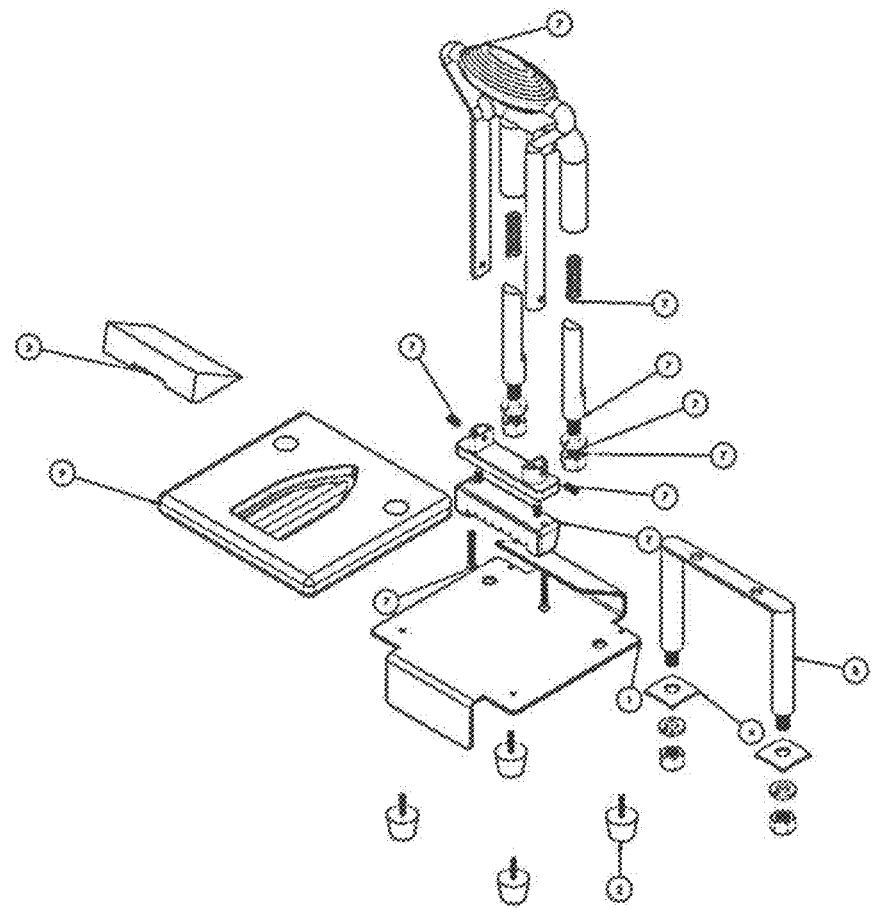
Figure 65A:
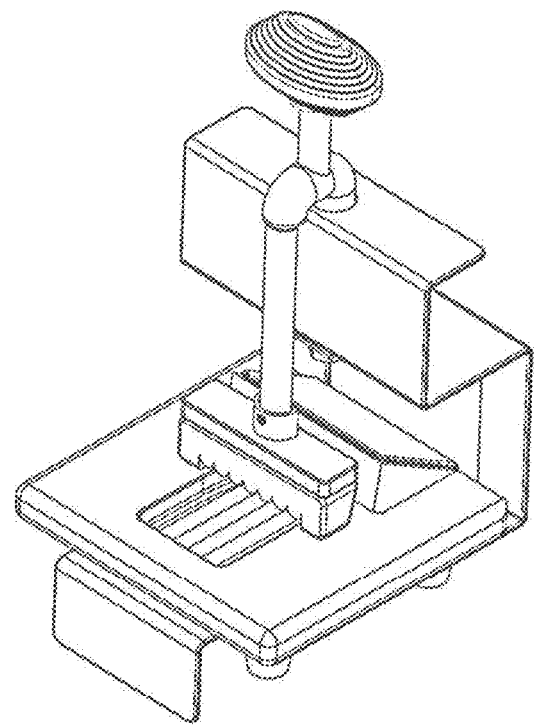
Figure 65B:
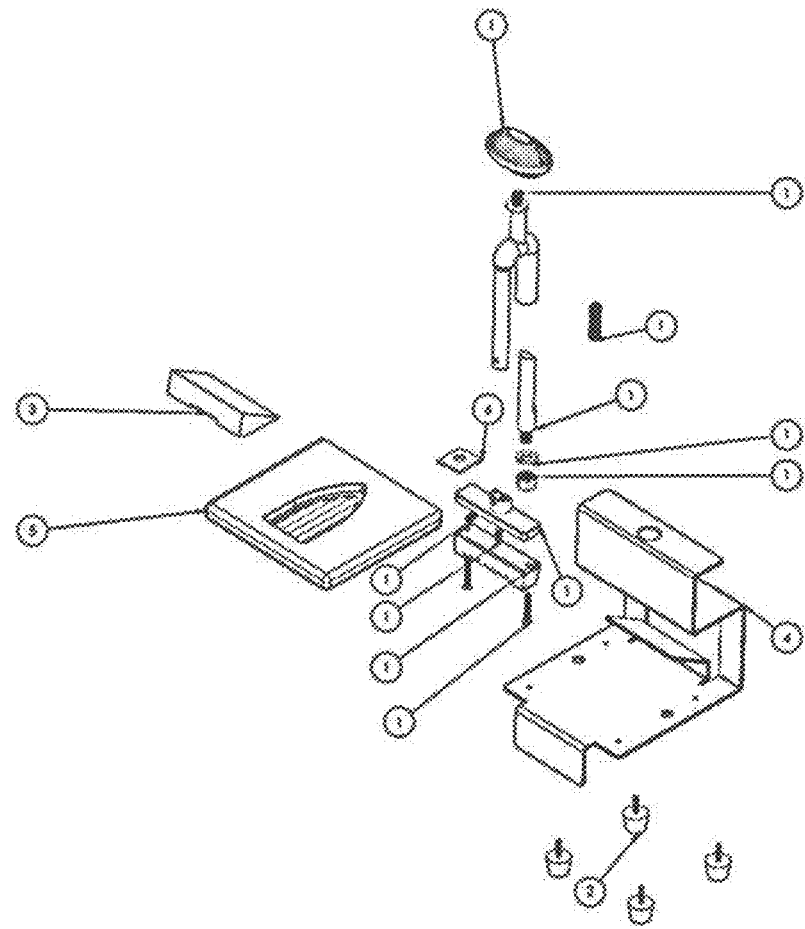
Figure 66A:
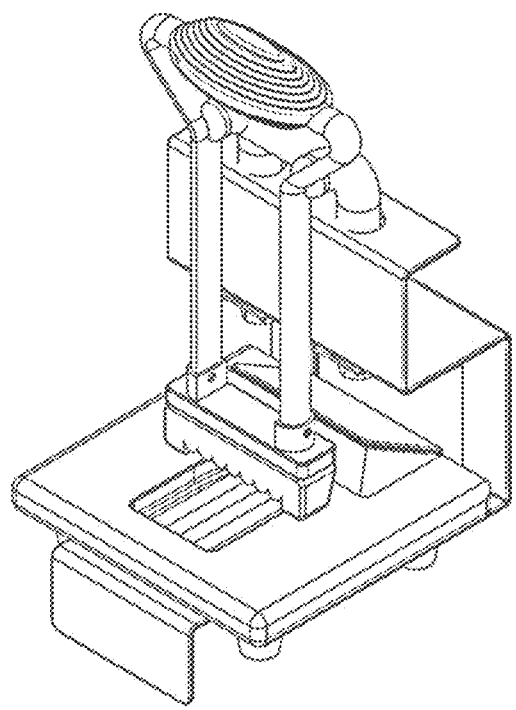
Figure 66B:
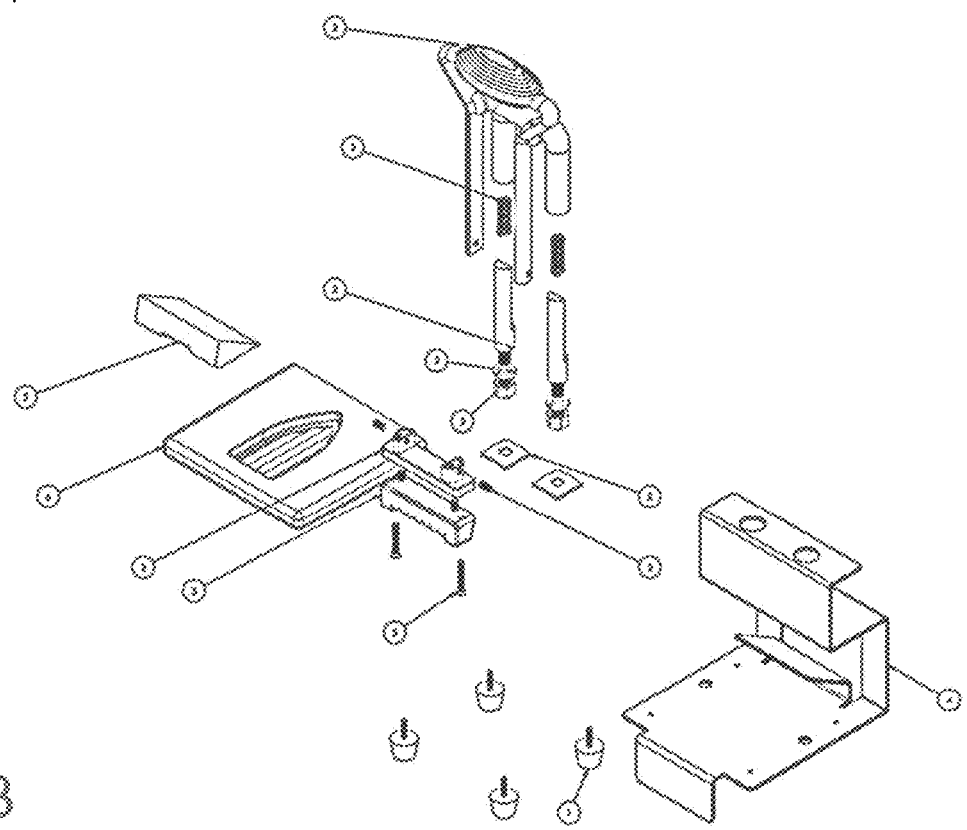

FIG. 40 shows perspective views of a plurality of exemplary embodiments of oyster opening blades configured to be used with standard portable handheld drills. Although the blades illustrated generally come to a point, a variety of blade shapes can be used, such as pointed-end, rounded-end, spade-shaped, chisel-shaped, and the like. Moreover, the blade may be made of or include a variety of materials, such as steel, ceramic, hard plastic, and the like. FIG. 40 shows embodiments having either a male or a female shank end, and have shanks of various sizes, that may be used with different types of drills, although other configurations may be used without departing from the scope of this disclosure. Two exemplary drills are illustrated in FIG. 41, although any similarly configured and capable handheld drills may be used.

FIGS. 42-66 show perspective views ("A") and exploded views ("B") of a plurality of exemplary embodiments that comprise the same or similar components contained in the embodiments illustrated in FIGS. 1-39, but in various different arrangements. It is noted that the reference numerals in the exploded views ("B") are not relevant in the context of this disclosure, and may be ignored. Although numerous exemplary embodiments are illustrated, it is understood that other embodiments are possible. Further, those of ordinary skill in the relevant art may create other embodiments in view of the present application. Of course, all such embodiments are deemed to be within the scope of the claimed invention provided they are covered by the claim language.

Although the invention has been described and illustrated in exemplary forms with a certain degree of particularity, it is noted that the description and illustrations have been made by way of example only. Numerous changes in the details of construction, combination, and arrangement of parts and steps may be made without deviating from the scope of the invention. Accordingly, such changes are understood to be inherent in the disclosure.

The invention is not limited except by the appended claims and the limitations explicitly recited therein. The scope of the claims should be construed as broadly as the prior art will permit. It should also be noted that all elements of all of the claims may be combined with each other in any possible combination, even if the combinations have not been expressly claimed.

What is claimed is:

1. An oyster clamp comprising:
a lower portion including:
 a base element having an indentation for receiving an oyster to be opened;
 a lip coupled to the base element configured to hang over and abut an edge of a work surface on which the oyster clamp is placed, thereby preventing the oyster clamp from sliding backwards when a force is applied to an oyster held in the oyster clamp;
 a plurality of stationary feet coupled to the underside of the base element to prevent marring the work surface and to inhibit the oyster clamp from sliding in any direction on the work surface, due to frictional forces between the feet and the work surface; and
an upper portion including:
 a backstop fixedly coupled to or extending from the base element to aid in positioning an oyster to be opened, and to prevent the oyster from exiting the back of the oyster clamp when in use, the backstop having an indentation for receiving the oyster;
 an oyster clamping element operatively coupled to the base element, the oyster clamping element having an indentation to control the position of the oyster when the oyster clamp is in use; and
 a handle operatively coupled to the oyster clamping element to cause the oyster clamping element to push the oyster against the base element when in use.

2. The oyster clamp of claim 1, further comprising a plurality of notches in a surface of the indentation in at least one of the base element, the backstop, and the oyster clamping element that controls the position of the oyster in the oyster clamp.

3. The oyster clamp of claim 1, further comprising:
a hinge and hinge pin coupled between the base element and the oyster clamping element, arranged so the oyster clamping element rotates about the hinge pin.

4. The oyster clamp of claim 1, further comprising:
a rack and pinion coupled between the base element and the oyster clamping element, arranged so the oyster clamping element presses vertically downward when a handle operatively coupled to the pinion is rotated about a central axis of the pinion.

5. The oyster clamp of claim 1, further comprising:
a plunger coupled between the base element and the oyster clamping element, arranged so the oyster clamping element presses vertically downward when a handle operatively coupled to the plunger is pressed downward.

6. The oyster clamp of claim 1, further comprising:
a tube coupled between the base element and the oyster clamping element, configured so the oyster clamping element is constrained to move vertically and is prevented from spinning around a vertical axis.

7. The oyster clamp of claim 1, further comprising:
a sleeve coupled between the base element and the oyster clamping element, arranged so a first assembly comprising the sleeve, the oyster clamping element, and a handle, is removable and interchangeable with a replacement assembly having a different oyster clamping element but otherwise identical to the first assembly.

8. The oyster clamp of claim 1, further comprising:
structural elements that provide stability to the oyster clamping element and to a handle operatively coupled to the oyster clamping element, the structural elements extending upward from above the center rear of the base element.

9. The oyster clamp of claim 1, further comprising:
structural elements that provide stability to the oyster clamping element and to a handle operatively coupled to the oyster clamping element, the structural elements extending upward from behind the base element.

10. The oyster clamp of claim 1, further comprising:
structural elements that provide stability to the oyster clamping element and to a handle operatively coupled to the oyster clamping element, the structural elements extending upward from the sides of the base element.

11. The oyster clamp of claim 1, further comprising:
structural elements that provide stability to the oyster clamping element and to a handle operatively coupled to the oyster clamping element, the structural elements comprising exactly one stem.

12. The oyster clamp of claim 1, further comprising:
structural elements that provide stability to the oyster clamping element and to a handle operatively coupled to the oyster clamping element, the structural elements comprising exactly two stems.

13. The oyster clamp of claim 1, further comprising:
a sheet of metal cut and bent as a frame;
a base element attached to the frame; and
a backstop disposed between the base element and the frame, and attached to at least one of the base element and the frame.

14. The oyster clamp of claim 13, wherein a bottom end of the frame forms the lip.

15. The oyster clamp of claim 13, further comprising a hinge;
wherein half of the hinge is one of:
screwed onto the top surface of the backstop, and
formed of a top end of the frame.

16. The oyster clamp of claim 15, further comprising:
a handle coupled to a metal plate, the metal plate having an edge cut and bent into another half of the hinge; and
the oyster clamping element coupled to the bottom of the metal plate;
a hinge pin coupled between the two halves of the hinge;
wherein the two halves of the hinge are pivotably coupled together by the hinge pin; and
wherein the handle rotates around the hinge pin to press the oyster clamping element against an oyster placed in the base element indentation against the backstop.

17. The oyster clamp of claim 13, further comprising:
a pushrod coupled at its top end to a handle, and at its bottom end to the oyster clamping element;
a spring: and
a collar;
wherein the top end of the frame is cut and bent into a rectangular prism-shaped structural support with holes in its top and bottom surfaces;
wherein the spring is disposed between the holes in the top and bottom surfaces of the structural support;
wherein the collar is disposed at the top of the spring;
wherein the pushrod is disposed passing through the holes, the collar, and the spring.

18. The oyster clamp of claim 1, further comprising:
structural elements that provide stability to the oyster clamping element and a handle operatively coupled to the oyster clamping element, the structural elements comprising exactly one stem.

19. The oyster clamp of claim 1, further comprising:
structural elements that provide stability to the oyster clamping element and a handle operatively coupled to the oyster clamping element, the structural elements comprising exactly two stems.

20. The oyster clamp of claim 1, wherein at least some parts of the oyster clamp are stronger and more durable than the corresponding parts of an identically configured second oyster clamp.

21. The oyster clamp of claim 1, wherein at least some parts of the oyster clamp are wider and more stable than the corresponding parts of an identically configured second oyster clamp.

22. The oyster clamp of claim 1, wherein the bottom of the oyster clamping element is arranged to slope downward toward the front of the oyster clamp such that, when the oyster clamping element is pushed down by operating the handle, a force is created against the oyster that has components that push the oyster in the direction of both the base element and the backstop.

23. The oyster clamp of claim 1, further comprising:
a shaft fixedly coupled to and extending vertically from the base element;
an elbow having a bottom end and a top end, the bottom end fixedly coupled to the shaft, and the top end comprising a tubular guide;
a piston having a bottom end and a top end, the piston slidably disposed within the tubular guide, the bottom end of the piston fixedly coupled to the oyster clamping element, the top end of the piston coupled to a cap, the piston having notches on one side between its top end and its bottom end as a rack;
a gear as a pinion having teeth that engage the rack on the piston;
a pivot assembly including the pinion, mounted to the elbow between the elbow's bottom end and its top end;
a handle mounted to the pivot assembly and operatively coupled to the pinion;
wherein, when the handle is pushed to rotate around a central axis of the pinion, the pinion gear teeth engage the rack and cause the piston to move up and down together with the oyster clamping element.

24. The oyster clamp of claim 1, further comprising:
a pair of shafts fixedly coupled to and extending vertically from the base element;
two springs each fixedly coupled to the top end of a respective shaft;
a pair of tubes having a bottom end and a top end, each tube slidingly disposed over a respective one of the shafts and springs, the bottom end of each tube fixedly coupled to an end of the oyster clamping element, and the top end of each tube coupled to an end of a handle.

25. The oyster clamp of claim 24, wherein the pair of tubes, the oyster clamping element, and the handle, when coupled together as a first floating assembly, can be lifted off of the rest of the oyster clamp and replaced with a second floating assembly having a different oyster clamping element.

26. The oyster clamp of claim 1, further comprising:
a shaft fixedly coupled to and extending vertically from the base element;
a tube having a bottom end and a top end, the tube slidingly disposed over the shaft, the bottom end of the tube fixedly coupled to the oyster clamping element, and the top end of the tube fixedly coupled to the handle;
wherein the shaft and the tube are configured to have complementary shapes that allow the tube to slide vertically over the shaft and prevent the tube from rotating around the shaft.

27. The oyster clamp of claim 26, wherein the tubes, the oyster clamping element, and the handle, when coupled together as a first floating assembly, can be lifted off of the rest of the oyster clamp and replaced with a second floating assembly having a different oyster clamping element but otherwise identical to the first floating assembly.

28. The oyster clamp of claim 1, further comprising:
a pair of shafts as supports fixedly coupled to and extending vertically from the base element;
a first brace element coupled horizontally between the top of the supports;
a second brace element coupled horizontally between the supports proximate the middle of the supports;
wherein each brace element includes a hole at its center;
a spring disposed between the holes;
a collar;
a pushrod passing through the holes, the collar, and the spring; and
a plate secured to a bottom end of the pushrod;
wherein the oyster clamping element is coupled to a bottom side of the plate; and
wherein a top end of the pushrod is coupled to the handle.

29. The oyster clamp of claim 1, wherein the feet comprise at least one of rubber, at least one suction cup, and adhesive.

30. A method of operating an oyster clamp, comprising:
placing an oyster clamp on a work surface, with a lip of the oyster clamp overhanging an edge of the work surface;
placing a bivalve shellfish into an indentation of the oyster clamp, with at least a portion of the seam between the valves facing away from the back of the oyster clamp;
operating a handle to cause an oyster clamping element operatively coupled to the handle to apply downward pressure on the top of the shellfish to hold the shellfish in the oyster clamp;
continuously operating the handle to apply downward pressure to the oyster clamping element while opening the shellfish with an oyster opening tool;
inserting the oyster opening tool in the seam between the two valves of the shellfish while using the handle to moderate the pressure of the oyster clamping element pressing on the top of the shellfish; and
when the shellfish is opened, causing the oyster clamping element to release the shellfish; and
removing the opened shellfish from the oyster clamp.

31. The method of claim 30, wherein the operating a handle is accomplished by rotating the handle around a hinge pin to swing an oyster clamping element affixed to the bottom end of the handle, causing the oyster clamping element to push down on the oyster placed in the cavity of the oyster clamp.

32. The method of claim 30, wherein the operating a handle is accomplished by rotating the handle of the oyster clamp to rotate a pinion gear with teeth engaging notches of a rack formed in a side of a piston that has the oyster clamping element affixed to the bottom end of the piston, causing the oyster clamping element to push down on the oyster placed in the cavity of the oyster clamp.

33. The method of claim 29, wherein the operating a handle is accomplished by pressing down on the handle of the oyster clamp to lower a piston that has the oyster clamping element affixed to the bottom end of the piston, causing the oyster clamping element to push down on the oyster placed in the cavity of the oyster clamp.

34. The method of claim 29, wherein the placing a bivalve into a cavity of the oyster clamp comprises:
placing the bivalve toward the rear of an indentation in the top surface of a base element of the oyster clamp;
pushing the bivalve against a backstop of the oyster clamp, and
holding the bivalve in place while operating the handle until the oyster clamping element presses on the top of the bivalve.

* * * * *